US012721332B2

(12) United States Patent
Chiattello et al.

(10) Patent No.: US 12,721,332 B2
(45) **Date of Patent: *Sep. 1, 2026**

(54) CHARGE CONTROLLED BIOCIDE APPARATUS AND METHOD OF USE THEREOF

(71) Applicants: Marion L. Chiattello, Cedar Falls, IA (US); Mark Oman, West Des Moines, IA (US)

(72) Inventors: Marion L. Chiattello, Cedar Falls, IA (US); Mark Oman, West Des Moines, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/663,414

(22) Filed: May 14, 2024

(65) Prior Publication Data

US 2024/0298629 A1 Sep. 12, 2024

Related U.S. Application Data

(63) Continuation-in-part of application No. 18/645,880, filed on Apr. 25, 2024, which is a continuation-in-part of application No. 18/641,922, filed on Apr. 22, 2024, which is a continuation-in-part of application No. 18/638,981, filed on Apr. 18, 2024, which is a continuation-in-part of application No. 18/637,668, filed on Apr. 17, 2024, which is a continuation-in-part of application No. 17/869,477, filed on Jul. 20, 2022, which is a continuation of application No. 15/662,119, filed on Jul. 27, 2017, now Pat. No. 11,426,343.

(60) Provisional application No. 63/633,967, filed on Apr. 15, 2024, provisional application No. 63/569,165, filed on Mar. 24, 2024, provisional application No. 63/567,553, filed on Mar. 20, 2024, provisional application No. 62/488,421, filed on Apr. 21, 2017, provisional application No. 62/368,008, filed on Jul. 28, 2016.

(51) Int. Cl.
*A01M 7/00* (2006.01)
*B05B 9/00* (2006.01)

(52) U.S. Cl.
CPC ............. *A01M 7/0092* (2013.01); *B05B 9/00* (2013.01)

(58) Field of Classification Search
CPC ......... A01M 7/0092; B05B 9/00; A01N 33/12
See application file for complete search history.

(56) References Cited

U.S. PATENT DOCUMENTS

| | | | |
|---|---|---|---|
| 8,450,378 | B2 | 5/2013 | Snyder et al. |
| 9,399,044 | B2 | 7/2016 | Cheng et al. |
| 9,682,100 | B2 | 6/2017 | Hedrick et al. |
| 10,485,824 | B2 | 11/2019 | Hedrick et al. |
| 11,026,418 | B2 | 6/2021 | Lan et al. |
| 11,564,892 | B2 | 1/2023 | Niemelä |
| 11,666,050 | B2 | 6/2023 | Purschwitz et al. |
| 2007/0185216 | A1 | 8/2007 | Snyder |
| 2008/0045491 | A1 | 2/2008 | Fitchmun |
| 2009/0018213 | A1 | 1/2009 | Snyder |
| 2010/0143632 | A1 | 6/2010 | Djenadi |
| 2014/0369953 | A1 | 12/2014 | Purschwitz et al. |
| 2015/0342984 | A1 | 12/2015 | Cheng et al. |
| 2016/0143275 | A1 | 5/2016 | Lan et al. |
| 2016/0213707 | A1 | 7/2016 | Hedrick et al. |
| 2017/0056513 | A1 | 3/2017 | Hedrick et al. |
| 2017/0266224 | A1 | 9/2017 | Hedrick et al. |
| 2023/0108533 | A1 | 4/2023 | Asgari et al. |
| 2023/0157297 | A1 | 5/2023 | Farha et al. |

FOREIGN PATENT DOCUMENTS

| | | |
|---|---|---|
| EP | 2 817 353 B1 | 1/2021 |

OTHER PUBLICATIONS

Amin, Cationic Charge Density PEI, Iran J Basic Med Sci p. 250, February (Year: 2013).*

Carmona, Removal of chloride ions, Reactive & Funct. Polym. p. 1218 May (Year: 2008).*

Gao, quaternized PEI, J. Biomate, Sci. Polymer Edn, p. 531 (Year: 2007).*

Katherine Gibney, Polymeric Antibacterial Agents: Cytotoxicity and Antimicrobial Properties of Amphiphilic Polymers, University of Michigan, Department of Chemistry, Honors Thesis, Apr. 28, 2009, 1-32.

Mini Thomas, Full Deacylation of Polyethylenimine Dramatically Boosts its Gene Delivery Efficiency and Specificity to Mouse Lung, PNAS, Apr. 19, 2005, vol. 102, No. 16, 5679-5684.

Steven C. Ricke, Formic Acid as an Antimicrobial for Poultry Production: A Review, Frontiers in Veterinary Science, Sep. 3, 2020, vol. 7, Article 563, 1-13.

* cited by examiner

*Primary Examiner* — Sarah Alawadi
*Assistant Examiner* — Thurman Wheeler
(74) *Attorney, Agent, or Firm* — Kevin H. Hazen; Hazen Patent Group, LLC

(57) ABSTRACT

The invention comprises a method and apparatus for dispensing a biocide, comprising:

a container and a biocide formulation in the container, the biocide formulation comprising: (1) the biocide and a solvent, the biocide comprising a protonated polymer comprising repeating charged units; (2) a total cationic charge density in a range of 0.005 to 0.95 meq/g, at least ten percent of the total cationic charge density from charges of non-quaternary amines of the protonated polymer; (3) an activity coefficient, $\gamma$, of a protonated site of the protonated polymer, of greater than 0.7; and (4) a counterion chloride concentration of less than 900 ppm.

19 Claims, 50 Drawing Sheets

900

252

253

$H_2N$ ... $NH_2$ (with repeat unit in brackets, subscript $n$)

910 + 920

$HY \rightleftharpoons H^+Y^-$

*linear PEI + formic acid → protonated linear PEI + formate counter ion* (eq. 1A)

FIG. 18

PEI + HCl + formic acid → protonated PEI + chloride and formate salts/counterions

$CH_3CH_2\ddot{N}H_2 + H{-}Cl \rightleftharpoons CH_3CH_2NH_2H^+ + Cl^-$

4650
4300
4312
4312
4312
Neg
4670 $Na^+$
Pos
Neg
Pos
$Na^+$ Neg
4660
$Cl^-$
$Cl^-$
$Na^+$
$Cl^-$
$Na^+$
$Cl^-$
$Na^+$
$Cl^-$
$Na^+$
$Cl^-$
$Na^+$
$Cl^-$
$Cl^-$
300
$H^+$
$H_2N$
N
H
H
N
H
N
$H^+$
$Cl^-$
H
N
$H^+$
N
H
H
N
$NH_2$

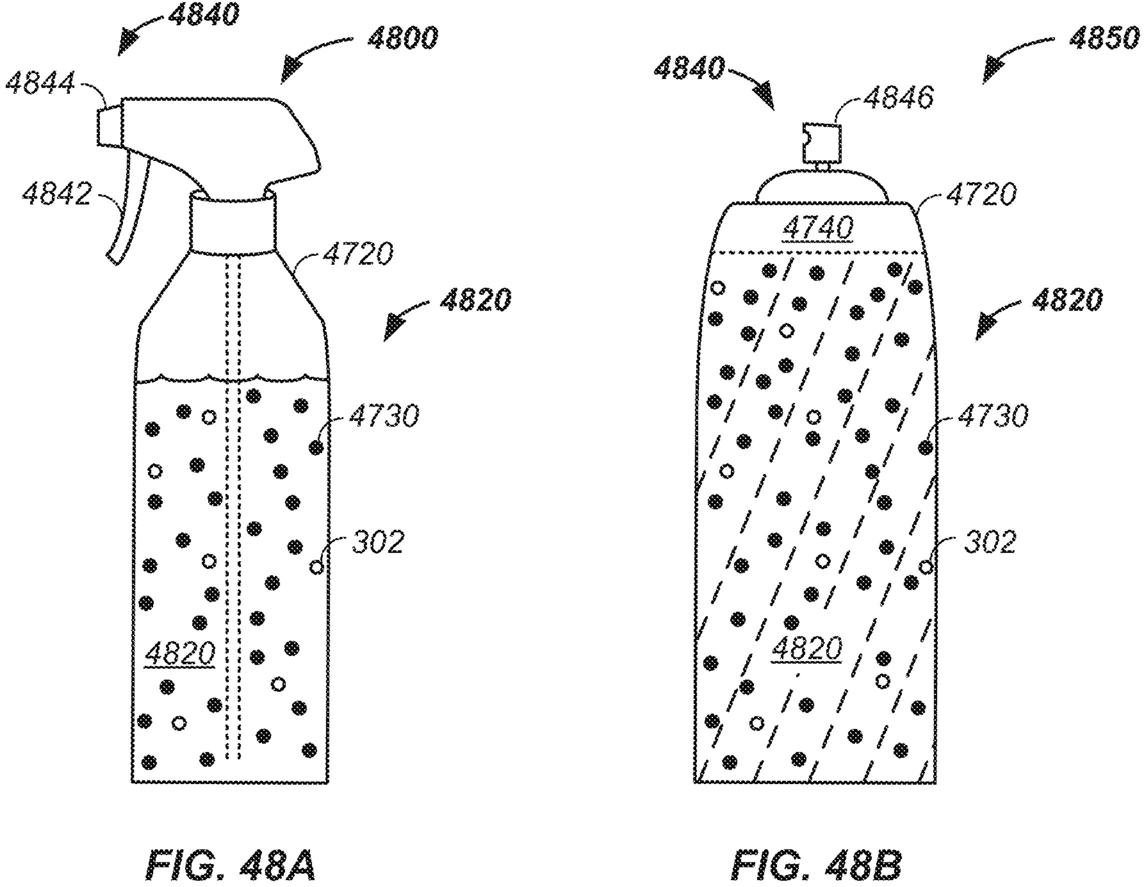
FIG. 48A
FIG. 48B
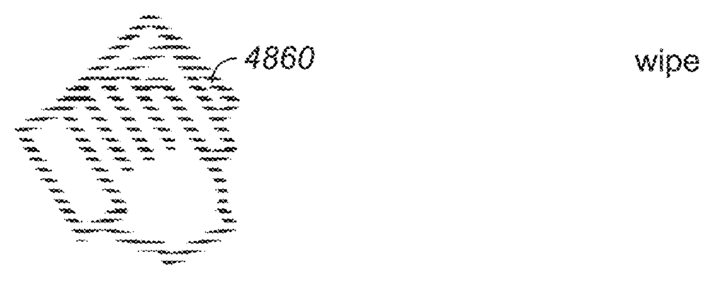
FIG. 48C

CHARGE CONTROLLED BIOCIDE APPARATUS AND METHOD OF USE THEREOF

CROSS-REFERENCES TO RELATED APPLICATIONS

This application:

- is a continuation-in-part of U.S. patent application Ser. No. 18/645,880 filed Apr. 25, 2024, which is a continuation-in-part of U.S. patent application Ser. No. 18/641,922 filed Apr. 22, 2024, which is a continuation-in-part of U.S. patent application Ser. No. 18/638,981 filed Apr. 18, 2024, which is a continuation-in-part of U.S. patent application Ser. No. 18/637,668 filed Apr. 17, 2024, which:
  - is a continuation-in-part of U.S. patent application Ser. No. 17/869,477 filed Jul. 20, 2022, which is a continuation of U.S. patent application Ser. No. 15/662,119 filed Jul. 27, 2017 (now U.S. Pat. No. 11,426,343), which:
    - claims benefit of U.S. provisional patent application No. 62/488,421 filed Apr. 21, 2017; and
    - claims benefit of U.S. provisional patent application No. 62/368,008 filed Jul. 27, 2016; and
  - claims benefit of U.S. provisional patent application No. 63/567,553 filed Mar. 20, 2024;
  - claims benefit of U.S. provisional patent application No. 63/569,165 filed Mar. 24, 2024; and
  - claims benefit of U.S. provisional patent application No. 63/633,967 filed Apr. 15, 2024.

BACKGROUND OF THE INVENTION

Field of the Invention

The invention relates generally to antimicrobial/antiviral solutions, films, coatings, and/or compositions.

Discussion of the Prior Art

Problem

There exists in the art a need for a forming and implementing antimicrobial/antiviral solutions, films, and/or coatings.

SUMMARY OF THE INVENTION

The invention comprises antimicrobial/antiviral solutions, films, and coating apparatus and method of use/formation thereof.

DESCRIPTION OF THE FIGURES

A more complete understanding of the present invention is derived by referring to the detailed description and claims when considered in connection with the Figures, wherein like reference numbers refer to similar items throughout the Figures.

FIG. 9 illustrates acidification of a polymer;

FIG. 10 illustrates alkalization of a polymer;

FIG. 18 illustrates polymer tuning with a weak acid;

FIG. 19A and FIG. 19B each illustrate polymer tuning with a weak acid and salt production;

FIG. 32 illustrates conjugate acid formation from a base;

FIG. 33A, FIG. 33B, FIG. 33C, and FIG. 33D illustrate progressively basic to acidic forms of polyethylenimine;

FIG. 34 illustrates branched polyethylenimine;

FIG. 48A, FIG. 48B, and FIG. 48C illustrate delivery of a biocide with a spray bottle, a spray canister, and a wipe, respectively;

Figure 1:
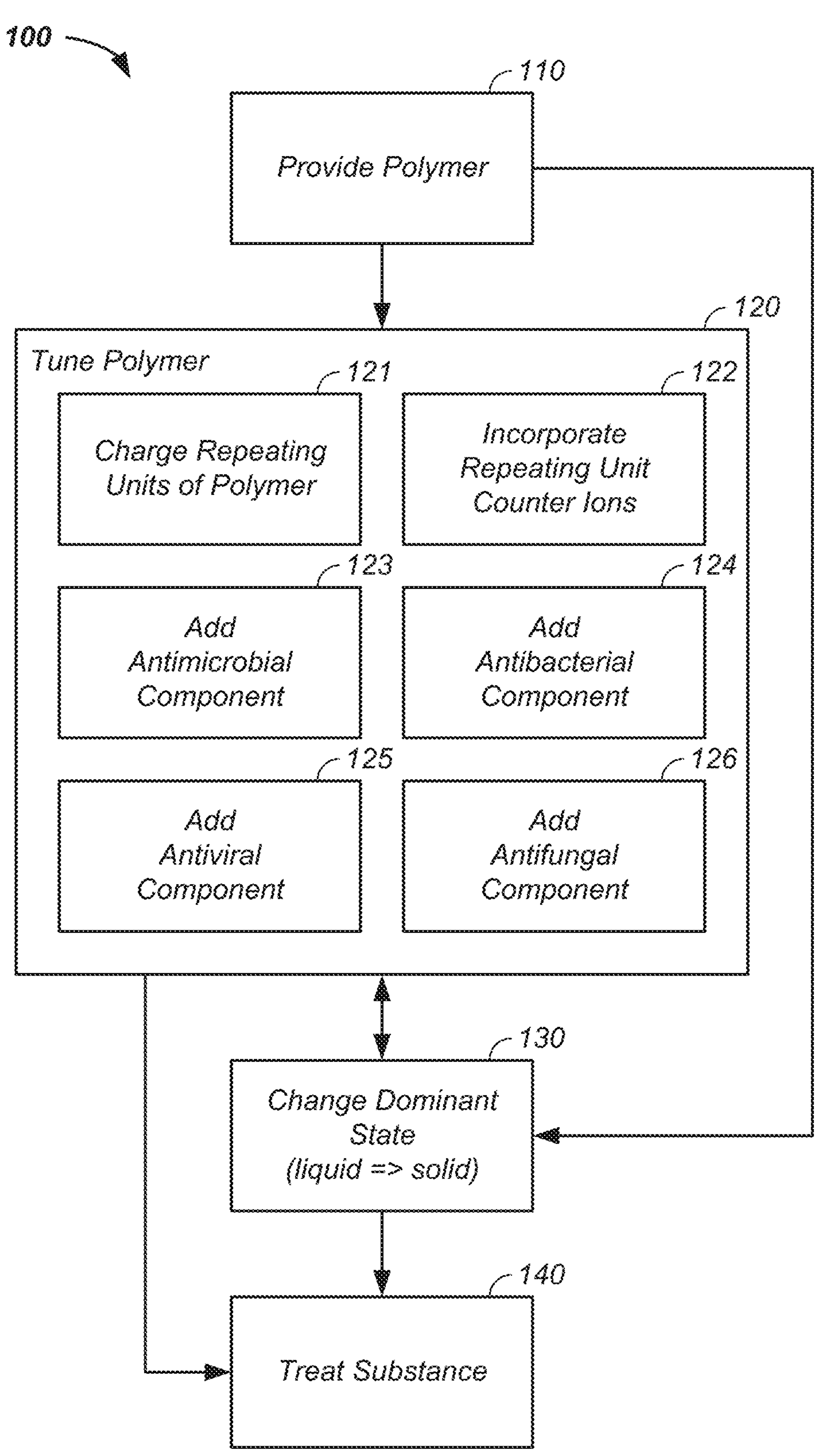
FIG. 1 illustrates a method of tuning a polymer as an antimicrobial agent.

Elements and steps in the figures are illustrated for simplicity and clarity and have not necessarily been rendered according to any particular sequence. For example, steps that are performed concurrently or in different order are illustrated in the figures to help improve understanding of embodiments of the present invention.

DETAILED DESCRIPTION OF THE INVENTION

The invention comprises a method and apparatus for dispensing a biocide, comprising: a container and a biocide formulation in the container, the biocide formulation comprising: (1) the biocide and a solvent, the biocide comprising a protonated polymer comprising repeating charged units; (2) a total cationic charge density in a range of 0.005 to 0.95 meq/g, at least ten percent of the total cationic charge density from charges of non-quaternary amines of the protonated polymer; (3) an activity coefficient, $\gamma$, of a protonated site of the protonated polymer, of greater than 0.7; and (4) a counterion chloride concentration of less than 900 ppm.

Herein, EPA refers to the United States Environmental Protection Agency and ISO stands for the International Organization for Standardization.

Overview

Generally, methods and processes that comprise the implementation of a new polymer-based antimicrobial technology that provides safe, durable, and/or readily removable antimicrobial films capable of inactivating bacteria, viruses, and/or fungi, in real-time with protection into the future, and are durable enough to pass both the EPA (O1-1A) and PAS2424 international durability tests are described herein. The PAS stands for a publicly available specification and the PAS2424 is from the British Standards Institution.

More specifically, parameters for forming and implementing various polymers, such as cationic polymers; techniques for protonating the cationic polymers to achieving maximum charge; and formulation with various counter ions are provided herein.

The high performance and safety of products created by this invention are derived from the inventive use of charged polymers, such as cationic polymers, and their concomitant counter ions, which is starkly different than the current use of toxic small molecule antimicrobial chemicals in the art.

Technology Attributes

Key attributes of the technology are:

1. Use of formulations/dispersions of polymers and/or small polymer particle dispersions, hereinafter referred to as cationic polymers for clarity of presentation and without loss of generality, are used as disinfectants, such as when at least partially suspended in the liquid state.
2. In a solid state the cationic polymers create a contact-active durable antimicrobial film that yields future protection against disease-causing pathogens, which is starkly different than legacy disinfectants.
3. Because the cationic polymer technology is not based on toxic germicidal chemicals, new products arise from the tuned polymers, described infra, that are safe for humans, animals, and/or the environment.
4. The cationic polymer technology is optionally implemented in antimicrobial films capable of inactivating: bacteria, viruses, and/or fungi as demonstrated in ISO 22196 testing resulting in reduction in microbial population by a factor of 10,000 or more (referred to herein as ">log-4 inactivation") against a wide range of bacteria and fungus in ten minutes.
5. Antimicrobial films incorporating the cationic polymer technology kill both enveloped and non-enveloped viruses.
6. The cationic polymers, such as described herein, show a continuous (additive) killing action against a large population of bacteria, with inactivating >log 7 population, on a 5-day old film, as tested with ISO 22196.
7. Antimicrobial films created with the cationic polymers described herein pass both the EPA 01-1A durability test and the PAS2424 international durability test against, bacteria, virus, and fungi. The protocol of EPA 01-1A is incorporated in its entirety herein as published at: https://www.epa.gov/sites/default/files/2015-09/documents/cloroxpcol_final.pdf.
8. Unlike germicidal chemical disinfectants that quickly dissipate, the polymeric antimicrobial films reported herein provide an ongoing continuous killing action, such as for days and/or weeks.
9. The methods and processes taught herein are flexible and adaptable allowing for the creative implementation of new products, all to the benefit of humankind.

Generally, ISO 22196 is a standard that pertains to the measurement of antibacterial activity on plastics and other non-porous surfaces, which specifies a test method to evaluate the antibacterial activity of such surfaces by measuring the ability of bacteria to survive and multiply on them. Stated again, if a material undergoes ISO 22196 testing and achieves log-4 inactivation, it means that it has demonstrated a strong ability to inhibit or kill bacteria, making it suitable for applications where maintaining a hygienic environment is essential, such as in healthcare facilities, food processing areas, or public spaces.

Antimicrobial Action

The antimicrobial cationic polymers films described herein provide antimicrobial action in at least one and optionally in all of several ways:

1. the polymer at least partially sterically blocks action of the bacteria/virus/fungus;
2. the cationic polymer attracts and then disrupts the anionic charge of a pathogens biological membrane;
3. counter ions chemically denature the membrane and can enter the pathogen's interior; and
4. the acidic nature of the disinfectant disrupts the natural pH of the pathogens' interior chemistry.

Background

There is an urgent worldwide need for a new antimicrobial technology that aids in mitigation of the transmission of infectious diseases.

There are two main reasons for not winning the war against disease-causing pathogens: First, despite the development of vaccines and antibiotics, the war on infectious diseases is being lost because the focus has been primarily on using medical interventions to combat disease-causing pathogens inside the body rather than helping to eradicate germs outside the body using disinfectants. This is in large part because current disinfectant technologies are limited. The disinfectants of today only kill pathogens while wet. Thus, they do not offer continuous, long-term protection. Further, to truly combat the transmission of infectious diseases, there is a need for residual coating disinfectants that can continuously and effectively inactivate disease-causing pathogens, as described herein, on surfaces, textiles, and skin/hands over an extended period, and do so with little or no toxicity. Second, presently insufficient emphasis is placed on disrupting the chain of infection. This is largely because existing technologies cannot break the chain. They only "disinfect". They do not "protect".

The "chain of infection" describes how diseases are transmitted from surfaces to hands, to the face, and then into the body. It is estimated that 80% of human infections occur from microbe-contaminated surfaces and that hands are the main pathway to pathogens to enter the body. One study showed that humans, on average, touch their face twenty-three times per hour. Today's hand sanitizers do not break the "chain of infection" and/or mode of transmission.

Legacy hand sanitizers are only effective while the disinfectant is drying. Once dried, they provide little protection. It is only a matter of time before hands become re-infected with disease-causing pathogens Understanding the chain of infection narrative is important because it helps prioritize various disinfectant applications, especially in the context of residual antimicrobial films that provide longer term protection.

A residual hand sanitizer, such as using the cationic polymers described herein, is a beneficial application because hands are the major object of transmission. When contaminated surfaces are touched the transmission is two-fold: first to the individual as he or she touches their face and second to other surfaces which in turn exposes others.

Perhaps the next most important application to offer residual protection is textile clothing. This is because individual's hand touches their clothing and then they continue to carry the disease-causing germs with them, which exposes others.

Protecting surfaces, is important but in general it is limited, because there are so many surfaces to be protected. Still, protecting surfaces is important, especially key surfaces such as in healthcare settings and/or in food preparation.

Since most viruses are transmitted as an aerosol spray, a truly anti-viral face mask could significantly mitigate the transmission of viruses. The polymeric anti-viral coatings described herein are optionally and preferably used in an aerosol spray and/or a coating to achieve this.

Small molecule germicidal chemical are not capable of creating durable residual antimicrobial films. However, the cationic polymers described herein are applicable to durable applications of residual antimicrobial films.

Regulators require that for a residual claim to be made, antimicrobial films must pass in the USA the EPA (01-1A) and internationally the PAS2424 durability protocols; the cationic polymer films described herein more than adequately meet the standards of these tests. Herein, the antiviral inactivity of a virus exceeds 10, 20, 30, 40, 50, 60, 70, 80, 90, 99, 99.9, and/or 99.99 fifty percent inactivity after a contact time of said virus with said antimicrobial film exceeding five minutes.

Applications

Stakeholders and the EPA are asking for disinfectants that leave a residual antimicrobial coating that "kill"/block disease causing pathogens into the future.

More specifically, the EPA is seeking new disinfectant technologies to offer essentially two things. First, a residual antimicrobial action against a wide spectrum of pathogens, but particularly against viruses; and second, a new technology not based on toxic biocides and that provides residual longer-term protection on surfaces and skin.

The methods and processes taught herein meet these standards as they are based on non-toxic polymeric coatings, are applicable to coating a range of surfaces, and leave residual antimicrobial coatings. These new products significantly reduce the transmission of infectious diseases, particularly in a world where viral pandemics are a reality.

For clarity of presentation and without loss of generality, some examples include of applications of the tuned polymers, described infra, are to: (1) consumer and health care products, (2) medical applications, (3) industrial applications, and (4) agricultural applications, as further described herein.

Consumer and Health Care Products:

1. A residual kill hand sanitizer is a preferred application for this new technology. Until now, the EPA and other regulators have not approved residual "killing" hand sanitizers due to safety and effectiveness.

Based on methods described herein, an extremely low toxicity, durable, and high killing action residual, polymer-based hand sanitizer has been produced. The viability of such a residual hand sanitizer was demonstrated with a >log-3 kill of bacteria and enveloped virus on artificial skin exposed to a 24 hour durability test as per the PAS2424 international durability protocol.

2. The tuned polymer is optionally used as a textile residual protective films on rinse additives, band-aids, and/or dryer sheets and/or is applied as an aerosol spray.
3. The tuned polymer is optionally used as a spray or wipe disinfectant that inactivates pathogens faster than traditional disinfectants and then forms a self-sanitizing antimicrobial coating on nonporous surfaces.

Medical Applications

Medical applications of the tuned polymer include, but are not limited to, antiviral face masks, medical device sterilant, medical device hoses, surgical handwash, wound dressings, and antimicrobial ointments, and/or reducing biofilms on implants. The highly durable and remarkably non-toxic coatings offered by this technology reduce biofilm accumulation on various implanted medical devices.

Industrial Applications

Industrial applications of the tuned polymer includes replacing/supplementing any existing toxic biocides, such as used in packaging and industrial fluids.

Agricultural Applications

Agricultural examples of applications of the tuned polymer optionally include animal skin care or antimicrobial protection in large feeding operations, which reduces healthcare acquired infections (HAI) that stem largely from bacteria and or individual illnesses due to viruses.

Generally, the continuous killing action of the antimicrobial polymeric films/compositions produced by the processes taught herein are a novel approach to acting on bacteria and also, over time, a surface can remain virtually bacteria-free, which reduces the potential for residual (self-generating) bacteria to mutate and become antibiotic-resistant.

Tuned Polymer

Generally, the polymers described herein are "tuned" in one or more ways as illustrated and described in FIGS. 1-20.

Referring now to FIG. 1, polymer tuning 100 is described. Generally, in a first process, a polymer is provided 110. In a second process, the polymer is tuned 120. The process of tuning a polymer is detailed infra; however, generally, repeating units of the polymer are charged 121 and/or repeating unit counter ions are incorporated 122 to, separately and/or in combination, yield an antimicrobial component 123, an antibacterial component 124, an antiviral component 125, and/or an antifungal component 126. In an optional third process, the physical state of the tuned polymer is changed 130, such as from a liquid, to a gel, to a solid or vice versa. In a fourth process, the resulting tuned polymer is optionally used to treat a substance 140 and/or to treat a material or condition. Optional and preferably methods of tuning the polymer are further described, infra. Optionally, a protein is substituted for a polymer in any embodiment herein. Optionally, any backbone chain is substituted for the polymer in any embodiment herein. For instance, any organic molecule having a chain of carbons at least 3, 5, 10, 15, 20, 100, 500, or 1000 carbons long is optionally used in place of the polymer as described herein. Optionally, a backbone molecule is used in place of the polymer 200. For instance, a chain of any combination of carbons, oxygens, and nitrogens of any length greater than 2, 5, 10, 20, or 50 atoms is used as a backbone where the backbone is optionally protonated, has counterions, and/or is tuned according to any of the approaches described herein for tuning a polymer.

Figure 2:
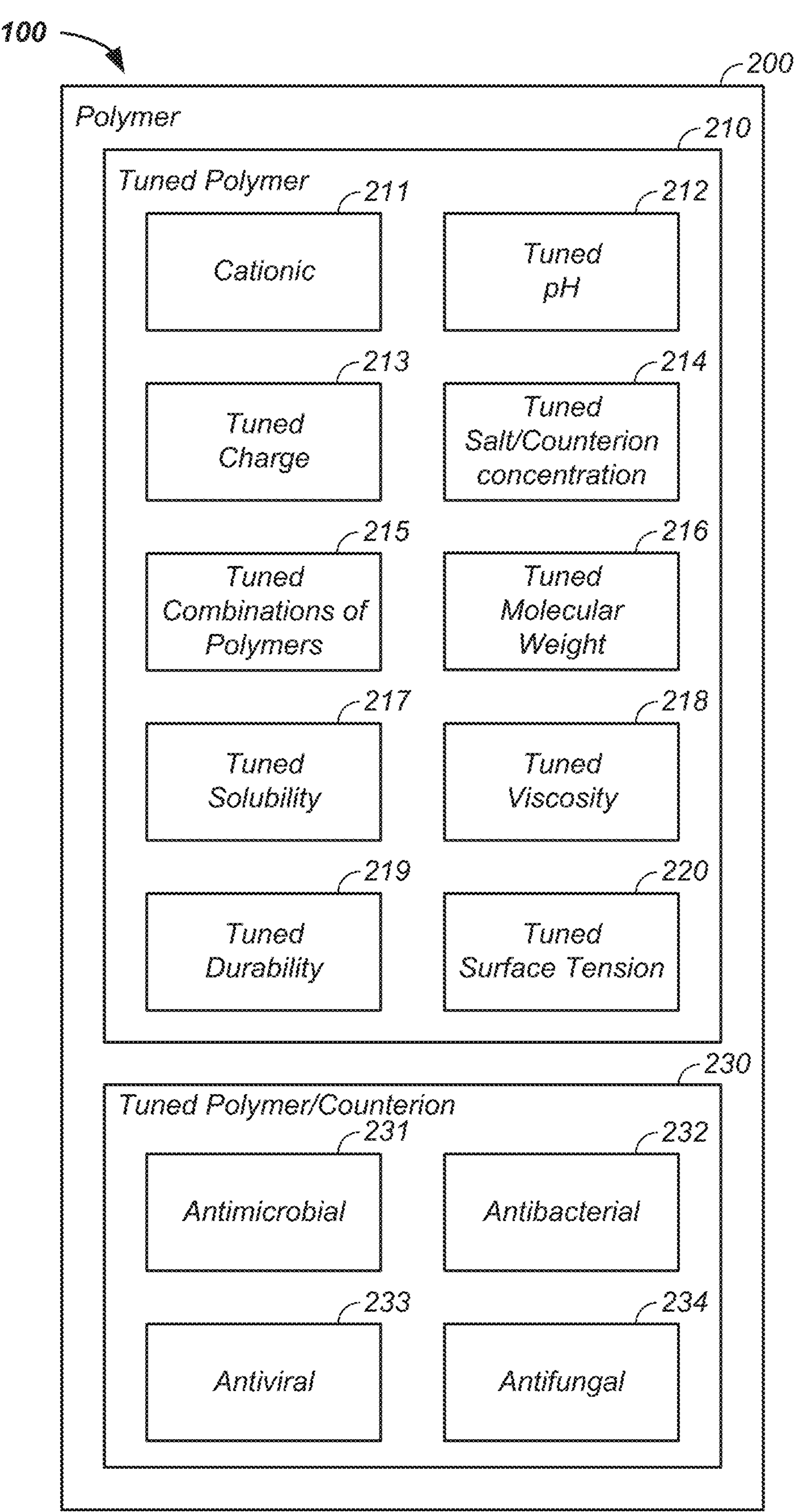
FIG. 2 illustrates tuned charged polymers and tuned counterions.

Referring now to FIG. 2, a polymer 200, such as provided in the polymer tuning 100 process, is further described.

Still referring to FIG. 2, in a first process, the polymer 200 is optionally tuned to form a tuned polymer 210 having a state of cationic, tuned pH, tuned charge, tuned salts/counterions, tuned combinations of polymers, tuned molecular weight, tuned solubility, tuned viscosity, tuned durability, and/or tuned surface tension, which are each further described, infra. Generally, any one or more of the tuning steps are optionally performed in any order and/or are performed simultaneously, as further described infra. For clarity of presentation and without loss of generality, a polymer with repeating cationic units is used as an example herein top describe the chemistry, apparatus, methods, and processes and in particular a specific polymer of polyethylenimine is used to illustrate any polymer with repeating units/monomers that are charged and/or are chargeable.

Still referring to FIG. 2, the tuned polymer 210 is optionally and preferably cationic 211 and/or has repeating cationic polymer units; however, the polymer 200 is optionally anionic and/or has repeating anionic polymer units; and/or has a functional group that is optionally subjected to a chemical reaction to form a cationic, anionic, and/or zwitterionic repeating group on repeating sections of the polymer 200.

Notably, while the polymer 200 is optionally and preferably tuned; optionally and preferably the formulation that contains the polymer is optionally tuned to any of the below described levels of the tuned polymer 210, such as in terms of viscosity, durability, surface tension, and/or in terms of effectiveness against any microbe, bacteria, virus, and/or fungus.

Still referring to FIG. 2, the polymer 200 is optionally and preferably pH tuned 212 to a desired pH, such as: in a range with a pH greater than 2, 3, 4, or 5; to a pH less than 14, 12, 10, 8, 7, or 6; in a pH range of 2-10, 3-9, 3-8, 3-7, 4-6; to a pH within any of ±0.25, 0.5, 0.75, 1.0, or 2 of any of 3, 4, 5, 6, or 7; and/or any combination of these ranges.

Still referring to FIG. 2, the polymer 200 is optionally and preferably tuned to a charge, such as in a range of $1*10^{-20}$ to $1*10^{-12}$ coulombs/molecule and more preferably in a range of $1*10^{-18}$ to $1*10^{-14}$ coulombs/molecule; coulombs abbreviated as C. Optionally and preferably, between 10 and 90 percent of the secondary amines of polyethylenimine 250 are positively charged or the same percentage of any protonatable group of the polymer 200. More preferably, greater than 15, 20, 25, or 30 percent of the nitrogens, or protonatable groups, are positively charged and/or less than 80, 70, 60, 50, or 40 percent of the protonatable groups are charged. Herein, a total cationic charge is a charge of all of the positively charged groups, which does not include anionic charge from any counterion and/or any anion on the polymer. Optionally and preferably, a total cationic charge used in a biocide treatment, such as in a unit of liquid dispensed and/or in a film formed is greater than 0.2, 0.4, 0.6, 0.8, 1, 1.2, 1.4, or 1.8 coulombs and/or is less than 100, 75, 50, 25, 10, or 5 coulombs, such as where a unit of fluid delivered is within 10, 25, or 50% of any of 0.1, 0.2, 0.5, 1, 2, 3, 5, or 10 mL. A preferred total cationic charge per polymer is optionally tuned, such as in a range of 1 to 5000, 5 to 3000, and/or 1000 to 2500 positively charged sites per polymer chain. Optionally, any of the charges per molecule are optionally reduced by 10, 20, 30, 40, 50, 60, 70, 80, 90, or more percent as the total chain lengths of polymer decreases from thousands to hundreds to tens. Charges, total charges, and effective charges are further described, infra.

Still referring to FIG. 2, the polymer 200 is optionally salt/counterion tuned 214 with one or more salt anions in solution; salt cations in solution, and/or counterions, which are optionally anionic or cationic; electrostatically and/or attracted via charge to charges, such as protons on monomers of the polymer 200, as further described infra.

Still referring to FIG. 2, the polymer 200 is optionally a tuned combination of polymers 215, such as a mix of molecular weights, polymer types, and/or types of counterions associated with each individual polymer or set of polymers. Further, the tuned combination of polymers 215 optionally contains a polymer or a group of polymers where one or both are antimicrobial, antibacterial, antiviral, a biocide, and/or antifungal.

Still referring to FIG. 2, the polymer 200 is optionally a tuned molecular weight 216. Longer chains have advantages like higher charge and/or complexing more than one object, such as a virus. Shorter chains have advantages, such as more precise charge. In general, the molecular weight of the polymer is greater than 100, 1000, 10,000, or 100,000 g/mol; less than 5,000,000, 1,000,000, or 500,000 g/mol; and/or within 5, 10, 25, or 50 percent of 100,000, 200,000, 300,000, 400,000, or 500,000 g/mol.

Still referring to FIG. 2, the polymer 200 is optionally solubility tuned 217, such as by adjusting pH of the solution, monomer size, monomer functional groups, length of the polymer 200, size of counterions, degree of salt, activity of the solution, and/or through use/application of any agent designed to complex the polymer 200 and/or attract the polymer 200 to a surface, such as the surface of a treated product, any of which may be expressed at solubility of the polymer 200 in g/L. Herein, the solution optionally and preferably contains greater then 0, 1, 2, 3, 5, 10, 15, 20, 25, 50, 75, or 95 percent water and/or any solvent such as ethanol. Still referring to FIG. 2, the polymer 200 and/or polymer formulation is optionally viscosity tuned 218, such as in a range of centipoise units. Optionally, centipoise is expressed in units of poise, $m^2/s$, Newton-second per square meter, and equivalents thereof. Optional ranges of viscosities of the polymer 200 and/or a formulation containing the polymer in centipoise is near water in a range of 1-5, that of blood or 15 centipoise, that of corn syrup or 50-100 centipoise, that of motor oil 150 to 500 centipoise, than of syrup or 1000-3000 centipoise, that of molasses to peanut butter or 5000 to 200,000 centipoise, or higher in a more solid state, such as lard to window putty or 1,000,000 to 100,000,000 centipoise, and/or within 10, 25, 50, 75, or 100% of any of these levels.

Still referring to FIG. 2, the polymer 200 and/or polymer formulation is optionally durability tuned 219 according to any metric, such as durability metrics in PAS2424 and/or in the more rigorous U.S. 01-1A tests, referenced supra. For instance, a durability test is to whether or not a treated substance still passes an EPA test, such as effectiveness against a microbe, bacteria, virus, and/or fungus after a series of web rub then dry cycles, such as 6 to 12 cycles, at a testing pressure, such as about 5, 10, 15, or 20 pounds of pressure plus or minus 25 or 50 percent.

Still referring to FIG. 2, the polymer 200 and/or polymer formulation is optionally surface tension tuned 220 to a range of 0.001 to 0.3 N/m; to greater than 0.01, 0.02, 0.03, 0.04 N/m; less than 0.3, 0.2, 0.1 N/m; and/or to within 10, 25, 50, 75, or 100% of 0.01, 0.02, 0.03, 0.04, 0.06, 0.08, or 1.0 N/m. For instance, a starch, slurry, paste, and/or binding agent is optionally used to increase the surface tension of the polymer 200.

Still referring to FIG. 2, in a second process, the polymer 200 is optionally tuned to form a tuned polymer counterion 230, where each of one or more counterions have antimicrobial 231, antibacterial 232, antiviral 233, and/or antifungal 234 properties. Specific properties found to have antimicrobial 231 effectiveness in association with a charged polymer are further detailed below. Generally, herein, an antimicrobial 231 is one or more of antibacterial 232, antiviral 233, and/or antifungal 234. Generally, a biocide is antimicrobial 231, antibacterial 232, antiviral 233, and/or antifungal 234.

Still referring to FIG. 2, the first process and second process are optionally tuned at the same time; in either order, and/or are tuned in sub-parts in any simultaneous and/or time ordered manner.

Figure 3A:
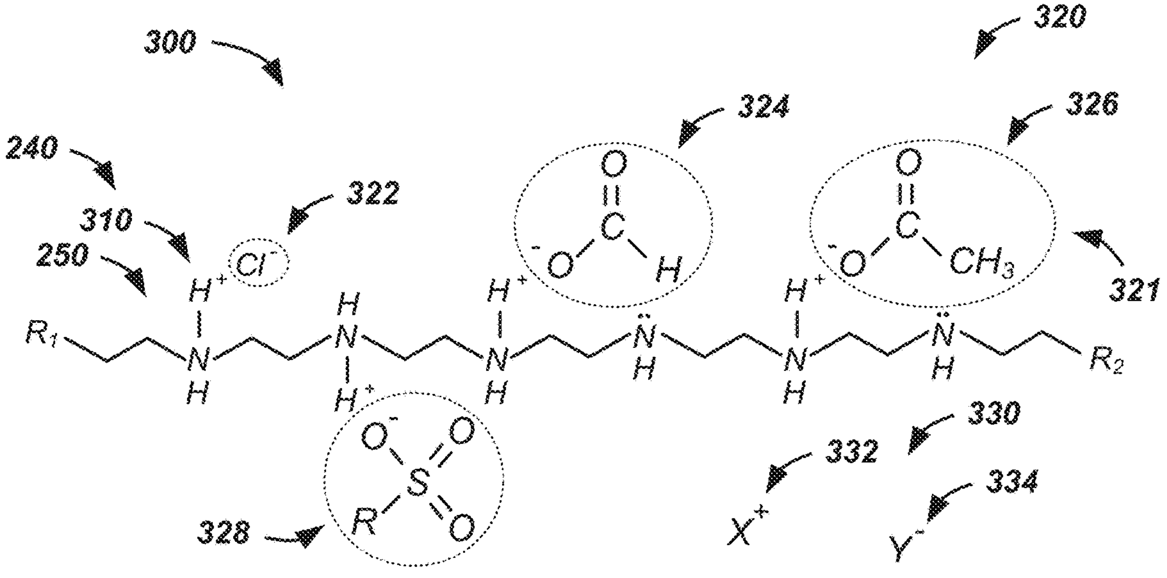
FIG. 3A and FIG. 3B each illustrate tuned cationic polymers.

Referring now to FIG. 3A, a tuned cationic polymer 300 is described, which is an example of a polymer 200. Again, for clarity of presentation and without loss of generality, linear polyethylenimine 250 (PEI) or polyaziridine, is used as an example of a polymer 200 and/or a protonated polymer 240. Further, polyethylenimine 250 is used as a general case of linear polyethylenimine and/or branched polyethylenimine, which are further described infra.

Still referring to FIG. 3A, the polyethylenimine 250 or protonated polymer 240 is illustrated with repeating monomers, which have a carbon-carbon-nitrogen backbone, which are representative of any repeating background and/or monomer, dimer, or trimer of the polymer 200. The nitrogen is optionally protonated 310, where protonation increases with decreasing pH and decreases with increasing pH. At a pH of 4, protonation of the polyethylenimine 250 is about 30±5 percent; however, protonation is variable with treatment of the polyethylenimine 250, as further described infra. Generally, any protonation 310 level of the polymer 200 is optionally used.

Figure 3B:
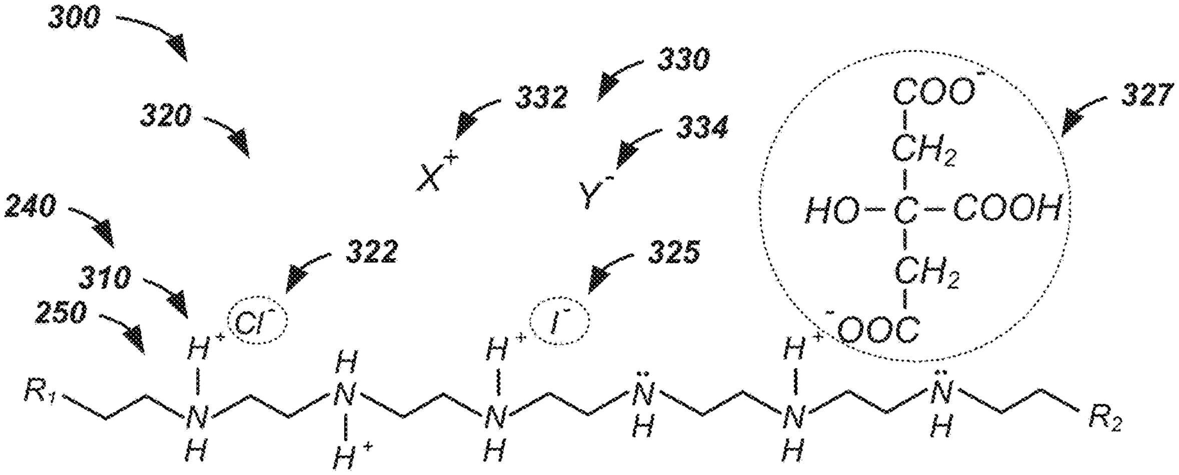

Still referring to FIG. 3A, the protonation 310 sites of the protonated polymer 240 are associated with counterions 320. For instance, when polyethylenimine 250 is manufactured, polyethylenimine 250 is provided in hydrochloric acid, so the far dominant conjugate base counterion is the chloride ion 322, such as at greater than 98, 99, 99.5, or 99.9 percent. Methods of exchanging the chloride counterion 322 with another counterion are described infra. Alternatively, polyethylenimine 250 is manufactured in a "free base" form, such as a solid with a pH greater than 9, 10, 11, 12, or 13, where protonation 310 is very low, such as less than 20, 10, 5, 3, 2, 1, or 0.1 percent. Another counterion is optionally formate 324, which has at least antibacterial and/or antiviral properties, such as in combination with the protonated polymer 240 such as polyethylenimine 250. Still another counterion is optionally acetate 326, which has at least antiviral properties, such as with the protonated nitrogen and/or a protonated amine, such as in the repeating monomer of the polymer 200. Formate 324 and acetate 326 are both examples of conjugate bases of carboxylic acids 321. Yet another exemplary counterion is sulfonate 328, which is at least antimicrobial in combination with polyethylenimine 250 and/or with a cationic polymer. Generally, any anion conjugate base is optionally used as the counterion 320, such as: iodide, $I^-$, bromide, $Br^-$, a form of citrate or citrate$^{2-}$, nitrate ion, $NO_3^-$, sulfate ion, $SO_4^{2-}$, nitrite, $NO_2^-$, hydrogen carbonate, $HCO_3^-$, hydroxide ion, $OH^-$, sulfide ion, and $S^{2-}$. Generally, any combination of 1, 2, 3, or more counterions are optionally and preferably associated with the polymer 200, such as at a charged site of the repeating monomers, such as at the protonated sites 310, and/or at functional groups that are chargeable with a reaction, such as a secondary amine in polyethylenimine 250. Further, the ratio of the 1, 2, 3, or more counterions are optionally controlled at any ratio. For instance, two different counterions are optionally controlled at a ratio of greater than 1:0, such as greater than 1:0.01, 1:0.05, 1:0.1, 1:0.2, 1:0.3, 1:0.4, or 1:0.5 and/or at a ratio of less than 0:1. Similarly three counterions are optionally held/produced at any ratio 0:1 to 0:1 to 0:1 for the relative concentrations of the three, or indeed n, counterions, where n is a positive integer greater than 1, 2, 3, 4, or 5. For instance, the ratio of three counterions is 0.1 to 0.3 to 0.6; 0.33 to 0.33 to 0.33; or any set of ratios. Further, any of the n counterions optionally and preferably are selected for one or more of the properties of being antimicrobial 231, antibacterial 232, antiviral 233, and/or antifungal 234. Referring now to FIG. 3B, the additional counterions 320 of iodide 325, $I^-$, and citrate 327 in an optional basic form of citrate$^{2-}$ are illustrated.

Still referring to FIG. 3A, the tuned polymer 210 is optionally dried into a film, is a semi-solid, and/or contains a level of salt, in solid and/or ionic form about the tuned polymer 210. As illustrated, a salt solution 330 about the tuned polymer 210 optionally contains a set of ions 332, a set of one or more cations, represented as $X^+$ 332, and/or a set of one or more anions, represented as $Y^-$ 334. Tuning the type and concentration of each member of the sets the cations 332 and anions 334 tunes the chemical activity coefficient, $\gamma$, such as according to any version of the Debye-Hückel equation. Tuning the activity coefficient to a value greater than 0, 0.1, 0.2, 0.3, 0.4, or 0.5; to less than 1, 0.9, 0.8, 0.7, or 0.6; and/or in a range of within 10, 20, or 30% of 0.4, 0.5, 0.6, or 0.7 alters the ability of the ability of the charges on the polymer repeating units and/or their associated counterions to kill, bind with, react with, hold onto, block, and/or hinder function of the antimicrobial 231, antibacterial 232, antiviral 233, and/or antifungal 234. Thus, control of salt about the polymer 200 and/or the at least partially protonated repeating units of the polymer 200 tunes the antimicrobial 231 and/or biocide function of the tuned polymer 210.

Figure 4:
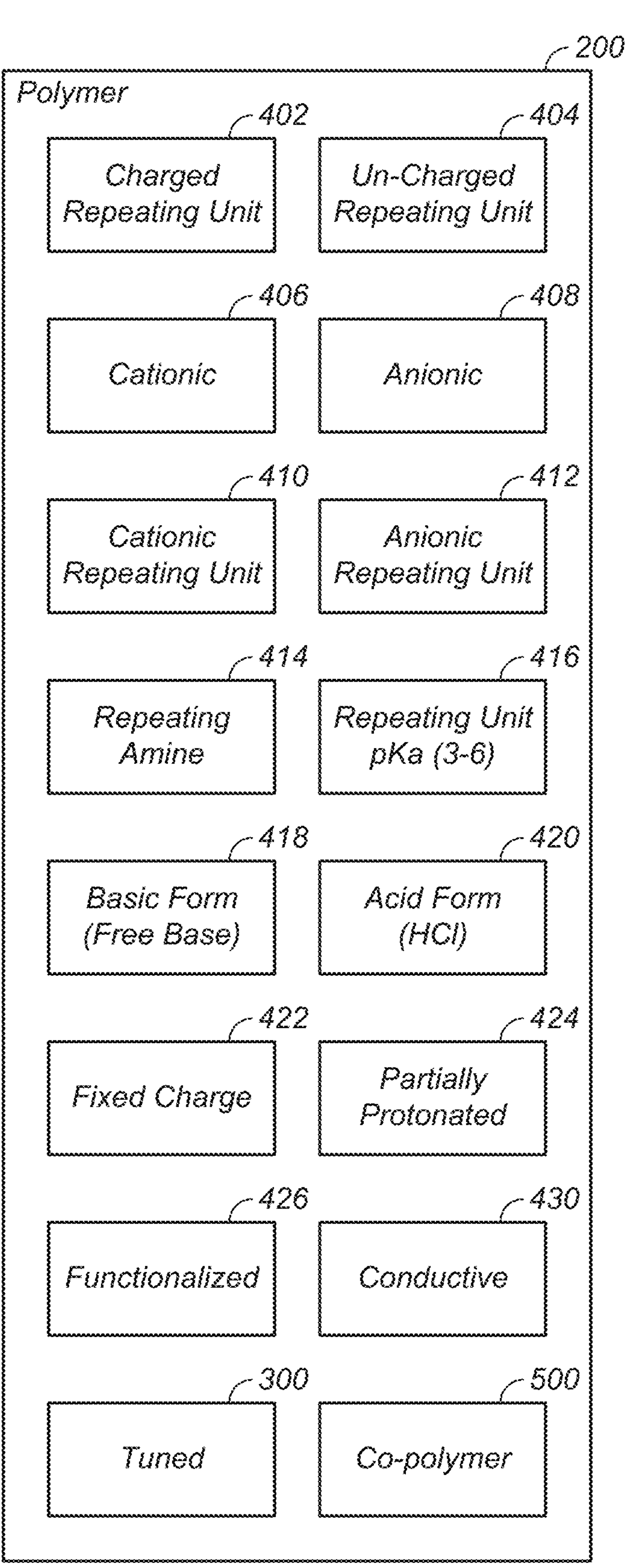
FIG. 4 illustrates polymer properties/states.

Referring now to FIG. 4, the polymer 200 is further described. Optionally and preferably, the polymer 200 is in a state comprising one or more of: a charged repeating unit 402; an uncharged repeating unit 404 and/or section; is cationic 406; is anionic 408; is a zwitterion; has a cationic repeating unit 410, has an anionic repeating unit 412; has a repeating amine 414; has a repeating chargeable monomer or polymer section; has a repeating unit with a pKa in a range of three to six 416; is in a basic form 418, such as at a pH>7; is in a PH neutral form; is in an acidic form 420, such as at a pH<7; has a fixed charge 422, such as per unit length of the polymer 200; and/or is partially protonated 424, such as on average every 1, 2, 3, 4, 5, 6, 7, 8, 9, 10, or more sets of repeating monomers.

Figure 5:
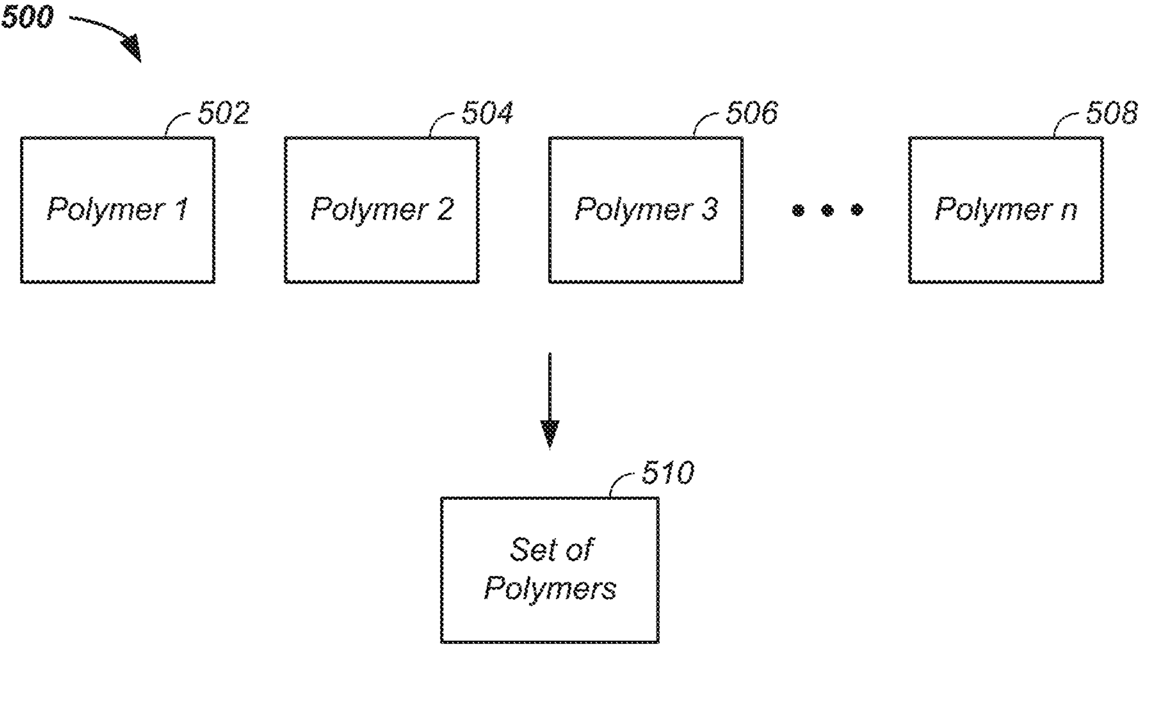
FIG. 5 illustrates a set of polymers.

Referring now to FIG. 5, the polymer 200 is optionally a group of polymers, such as a first polymer 502, a second polymer 504, a third polymer 506, or n polymers 508, where each of the n polymers differ by any state property, such as any of the polymer states described above. Combined, the polymers 200 in a formulation comprise a set of polymers 510. For example, some have long chains than others, some have higher charges than others, some are cationic, some have a first pKa while others have a second pKa, and/or others have first counterion types and others second counterion types.

Processes

Referring now to FIGS. 6-17, exemplary process for forming the tuned polymer 210 are described. The exemplary processes are optionally combined. Further, any one or more elements/steps of one of the processes is optionally used in combination with any one or more elements/steps of another one of the processes to form the tuned polymer 210.

Figure 6:
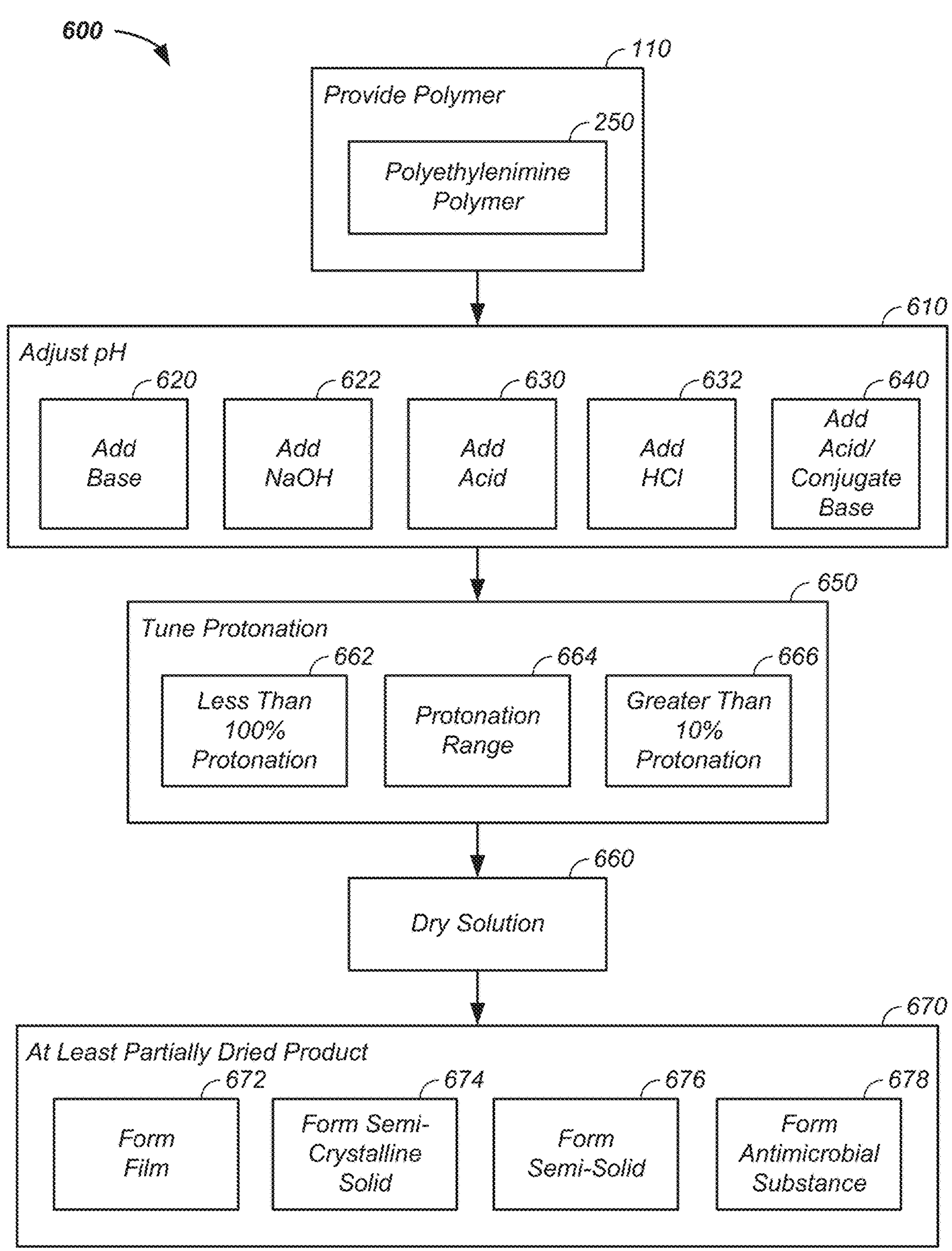
FIG. 6 illustrates polymer protonation tuning.

Referring now to FIG. 6, in a first general process 600, the tuned polymer 210 is formed by controlling/adjusting pH 610. As illustrated, in a first step the polymer is provided 110. Again, for clarity of presentation and without loss of generality, polyethylenimine 250 is used to illustrate any polymer 200. In another step, which is optionally performed in parallel with the first step, the pH is adjusted 610. For instance, the pH of the polymer 200 is adjusted, the pH of an aqueous solution containing the polymer is adjusted, and/or a pH of the polymer in any physical state, such as in a gel state, is pH adjusted. Generally, in one case a base is added 620, such as by addition of sodium hydroxide 622 in any form or concentration. Any base is optionally used in this case to reduce protonation of the polyethylenimine 250. In a second case, an acid is added 630, such as by addition of hydrochloric acid 632 in any form or concentration. Any acid is optionally used in this case to increase protonation of the polyethylenimine 250. In a third case, an acid/conjugated base 640 and/or linked pair of acid and conjugate base is used to adjust the pH 610. For instance, addition of formic acid to an acidic solution below the pKa of formic acid will increase the pH of the solution, deprotonate the polyethylenimine 250, and add a counterion of formate. Conversely, addition of formic acid to a basic solution above the pKa of formic acid will decrease the pH of the solution, protonate the polyethylenimine 250 and add a counterion of formate. Adjustment of pH to tune protonation of the polyethylenimine 250 is further described, infra. In a third step, resultant from the second step, protonation is tuned 650. For example, protonation of the polyethylenimine 250 is tuned to less than one hundred percent 662, to a protonation range 664, and/or to greater than ten percent protonation 666. Preferred protonation ranges are: greater than 0.1, 1, 5, 10, 15, 20, or 30 percent; less than 100, 99, 90, 80, 70, 60, or 50 percent; and/or in a range of ±0, 1, 5, 10, 15, 20, 25, or 50 percent of any of 30, 35, 40, 45, 50, 55, 60, 65, or 70 percent, where any combination of ranges described herein are optionally used, such as 35-45 percent and/or 30-40±5 percent on either end. A protonation range of 20-60 percent is the preferred state of the tuned protonation 650.

Still referring to FIG. 6, before, during, and/or after the steps of providing the polymer 110, adjusting pH 610, and/or tuning protonation 650, a step of drying 660 is optionally used. The drying step 650 forms an at least partially dried substance/product 670, such as a where a film is formed 672, a form or semi-crystalline solid is formed 674, a semi-solid 676/gel is formed, a wet film, a dry film, and/or an antimicrobial substance 678 is formed/concentrated. Generally, the drying step 660 increases the concentration of the polyethylenimine 250, the counterions 320, and/or the salt solution 330.

Figure 7:
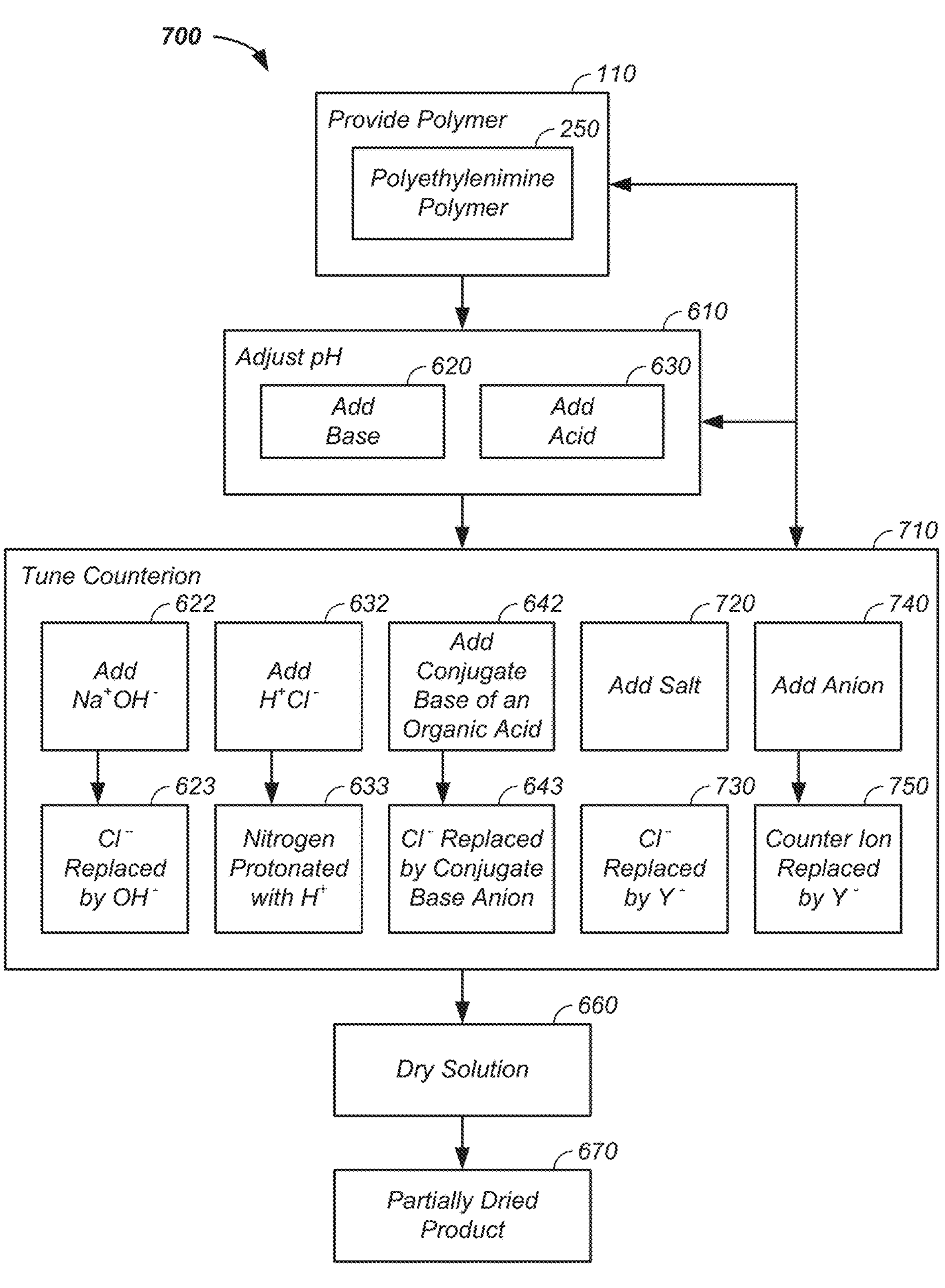
FIG. 7 illustrates polymer counterion tuning.

Referring now to FIG. 7, in a second general process, the tuned polymer 210 is formed by controlling and/or adjusting pH 610 to yield a tuned counterion solution 700/formulation. Generally, the steps of tuning the protonation 650, illustrated in FIG. 6, are optionally and preferably performed in combination with the steps of tuning the counterion solution 710. A process of tuning the counterion 710 optionally includes any process of controlling one or more counterion types, ions, and/or molecules associated with cations or charges on the repeating units of the polymer 200. Exemplary methods of tuning the counterion 710 comprise: (1) adding sodium hydroxide 622, in any concentration, for replacing chloride counterions with hydroxide counterions 623 on the polyethylenimine 250; (2) adding hydrochloric acid 632, in any concentration, to protonate the polyethylenimine 250, a secondary amine, and/or any protonatable functional group of the polymer 200; (3) adding a conjugate base of an organic acid 642 to replace the chloride counterion with the conjugate base anion 643, where more generally the conjugate base anion optionally displaces any counter anion associated with the polyethylenimine 250; (4) adding salt, such as where the chloride ion, the anion 334, $Y^-$, or indeed any counter anion is replaced with one or more added salt anions; (5) adding an anion 740 where the counterion associated with polyethylenimine 250 is replaced by the anion 334, $Y^-$, and/or (6) using any like substitution methods of anions, such as via an anion exchange column/method. Again, the resulting solution/compound/formulation is optionally dried 660 to form at least a partially dried product 670, as described supra. For clarity, in an example of adding sodium formate and/or formic acid, the added formate anion is used to replace a counterion associated with polyethylenimine 250, such as the chloride ion, such as when starting with a protonated form of polyethylenimine 250 in hydrochloric acid, as further described infra. Similarly, addition of sodium acetate and/or acetic acid adds the counterion of acetate to the polyethylenimine 250 and displaces counterions associated with polyethylenimine 250, where the overall process of tuning the counterion solution 700 tunes/controls the mean percentage of any 1, 2, 3, or more counterions associated with the polyethylenimine 250.

Still referring to FIG. 7 and referring again to FIG. 3, a carboxylic acid and/or a conjugate base of a carboxylic acid 321 is optionally used to displace the chloride ion, such as in step three of the previous paragraph, and/or more generally to supply a counterion. For instance, formic acid, a carboxylic acid, is used to provide formate (a conjugate base of formic acid) and/or a proton to any formulation herein.

Similarly, acetic acid, also a carboxylic acid, is used to provide acetate (a conjugate base of acetic acid) and/or a proton to any formulation herein. Additional carboxylic acids that are optionally used to supply counterions and/or other counterions isolated from carboxylic acid include any of: acetic acid (ethanoic acid); formic acid (methanoic acid); citric acid; propionic acid (propanoic acid); butyric acid (butanoic acid); benzoic acid; lactic acid; tartaric acid; malic acid; oxalic acid; succinic acid; palmitic acid; stearic acid; oleic acid; and/or linoleic acid.

Figure 8:
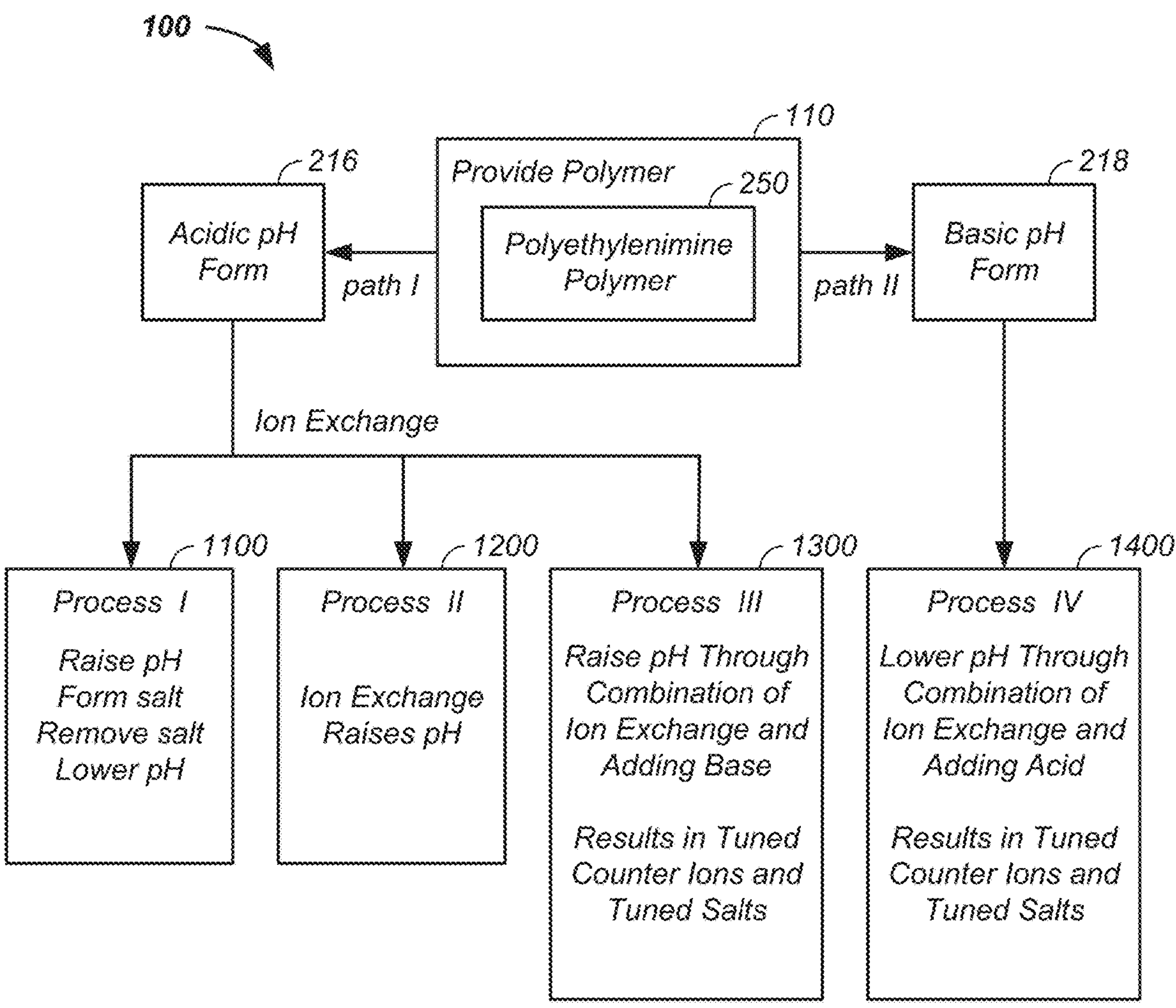
FIG. 8 illustrates polymer acidification/alkalization processes.

Referring now to FIGS. 8-11, for clarity of presentation and without loss of generality, four exemplary processes of tuning protonation of the polymer 650, tuning counterions 710 of the polymer 200, and/or tuning the salt solution 330 about the polymer 200 are described. Referring now to FIG. 8, a flowchart of the four exemplary process is provided, where an initial polymer 110, such as polyethylenimine 250, is pH adjusted 610 along a first path to form an acidic pH form 216 of the polyethylenimine 250 and/or along a second path to form a basic pH form 218 of the polyethylenimine 250. Three processes using the acidic pH form 216 are illustrated: (1) a first process of alkalization polymer tuning 1100 that raises pH of the polyethylenimine 250, forms a salt, removes the formed salt, and lowers the pH to tune the polyethylenimine 250; (2) a second process of alkalization polymer tuning 1200 that uses ion exchange to raise the pH about the polyethylenimine 250 to tune the polyethylenimine 250; and/or (3) a third process of alkalization polymer tuning 1300 that raises the pH about the polyethylenimine 250 through linear and/or sequential addition of a base and ion exchange, in either order of addition, to tune the polyethylenimine 250 and associated counterions. One process using the basic form 218 is illustrated: (4) a fourth acidification polymer tuning process 1400 of lowering the pH of the polyethylenimine 250 through a combination of adding acid and/or use of ion exchange to yield a tuned polyethylenimine 250 in terms of protonation, counterions, and/or salt solution. The fourth process 1400 optionally has sub-parts associated with each of processes I-III, albeit in reverse direction of pH adjustment. Each of the four processes are further described in the following examples. However, first generic processes of tuning with a conjugate base are illustrated in two subprocesses.

Figure 9:
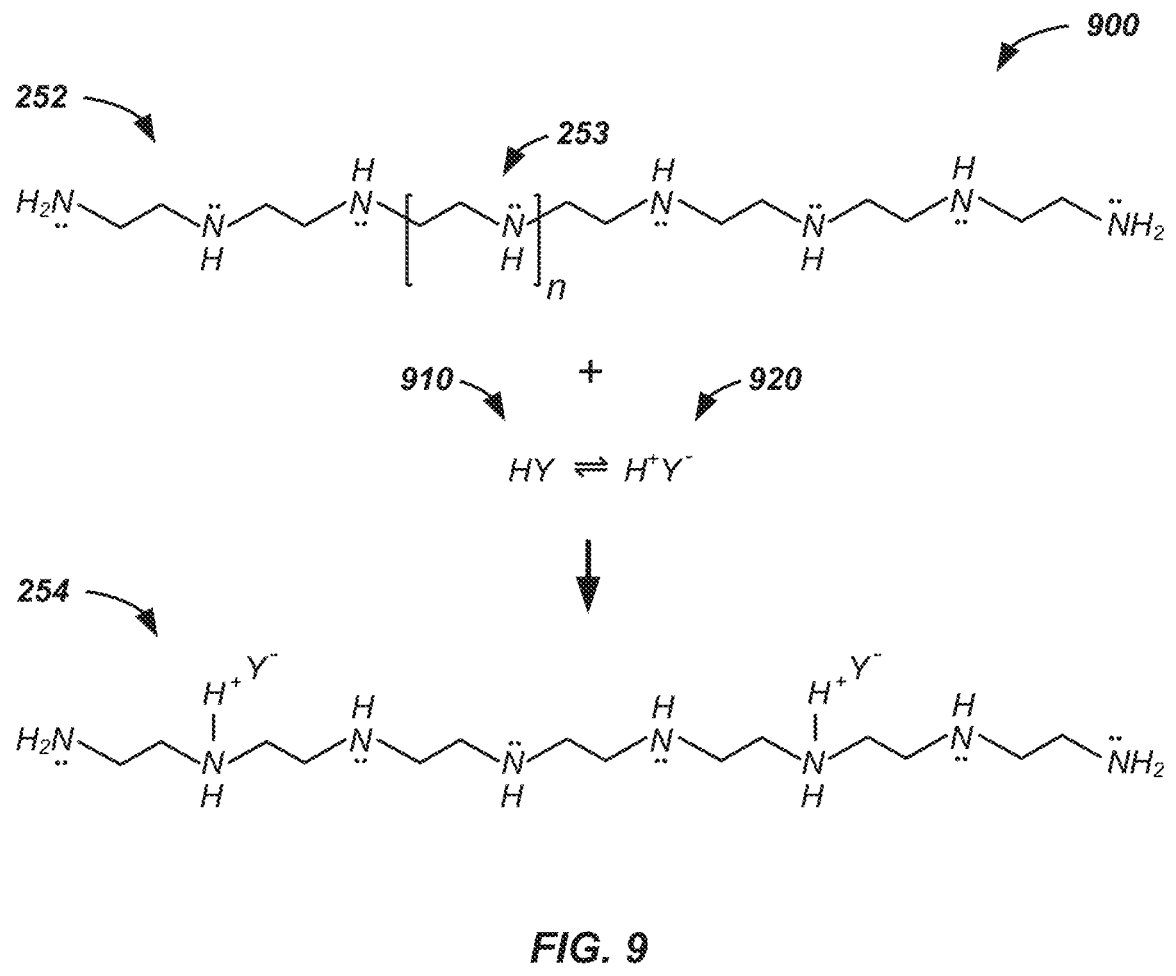

Referring now to FIG. 9, a first subprocess of using a conjugate base to acidify 900 the polymer 200, such as with repeating monomers 253, such as polyethylenimine 250, is illustrated. As illustrated, a basic form of polyethylenimine 252 is interacted (reacted and/or supplied) with an acid 910—conjugate base 920 pair or indeed with just the acid 910 or with just the conjugate base 920, where an equilibrium between the acid 910 and the conjugate base 920 suffices to continue to provide each of the acid 910 and/or the conjugate base in the reaction/counterion supply. Generally, the acid or $H^+$ protonates the polyethylenimine 250 to form a tuned protonation level of the polyethylenimine 254 and the salt anions, $Y^-$, provide the counterions 320. Notably, when a weak acid, such as formate, acetate, citrate, any monoprotic acid, and/or any dibasic acid, is used to acidify the polyethylenimine 250 to form a tuned protonation level of the polyethylenimine 254, little to no salt is formed. In the strict case of a pure weak acid with no impurities, no salt is formed. However, salt concentrations are typically held to less than 20, 10, 5, 4, 3, 2, 1, 0.5 or 0.1 percent with this approach, such as due to presence of impurities in the reagents/solvent(s), such as the presence of sodium carbonate in the water.

Figure 10:
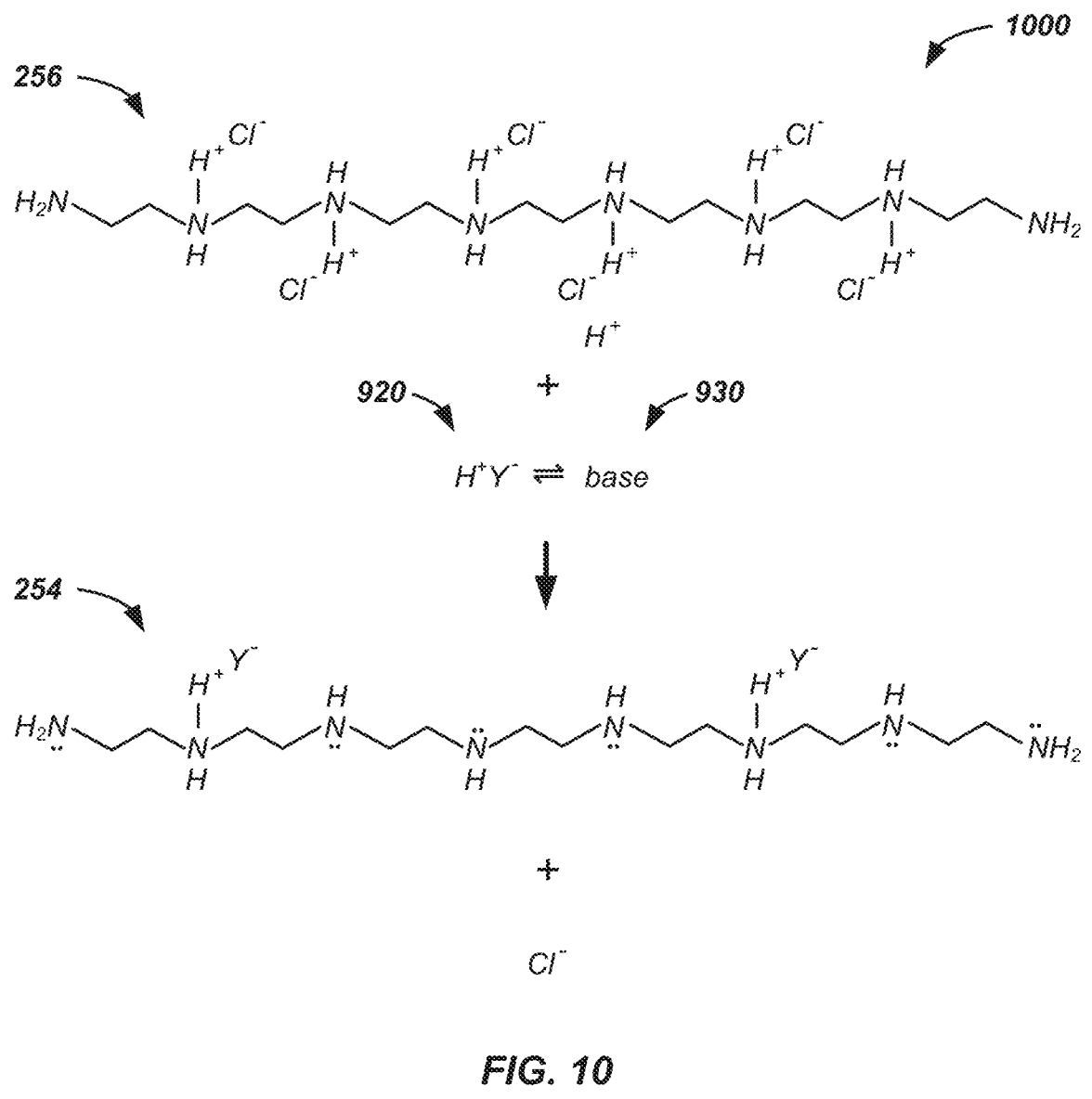

Referring now to FIG. 10, a second subprocess of using a conjugate base to alkalize 1000 the polymer 200, such as polyethylenimine 250, is illustrated. As illustrated, an acidic form of polyethylenimine 256 is interacted (reacted and/or supplied) with an acid 910—conjugate base 920 pair or indeed with just the acid 910 and/or with just the conjugate base 920, where an equilibrium between the acid 910 and the conjugate base 920 suffices to continue to provide each of the acid 910 and the conjugate base in the reaction/counterion supply. Generally, the conjugate base 920 deprotonates the acidic form of the polyethylenimine 256 to form a tuned protonation level of the polyethylenimine 254 and the salt anions, $Y^-$, provide the counterions 320. Notably, when a weak acid, such as formate, acetate, or citrate, is used alkalize the acidic form of the polyethylenimine 256 to form a tuned protonation level of the polyethylenimine 254, salt is formed. For example, when the acidic form of the polyethylenimine 256, such as formed with hydrochloric acid, has the counterion of chloride 322, is used/supplied, the original counterion ($Cl^-$) associated with the acidic form of the polyethylenimine 256 is displaced to form part of the salt solution 330. Thus, the first process has an advantage of limiting to eliminating production of the salt solution 330 about the tuned protonation level of the polyethylenimine 254 and/or the second process has an advantage of yielding salt and optionally a controlled amount of salt in the tuned protonation level of the polyethylenimine 254, which affects the antimicrobial 231 properties of the composition. Yet, it is noted that the resulting tuned cationic polymer 300 differs using the first process compared to using the second process without use of an additional optional salt control step, such as further described infra.

Example I (Process I)

Figure 11:
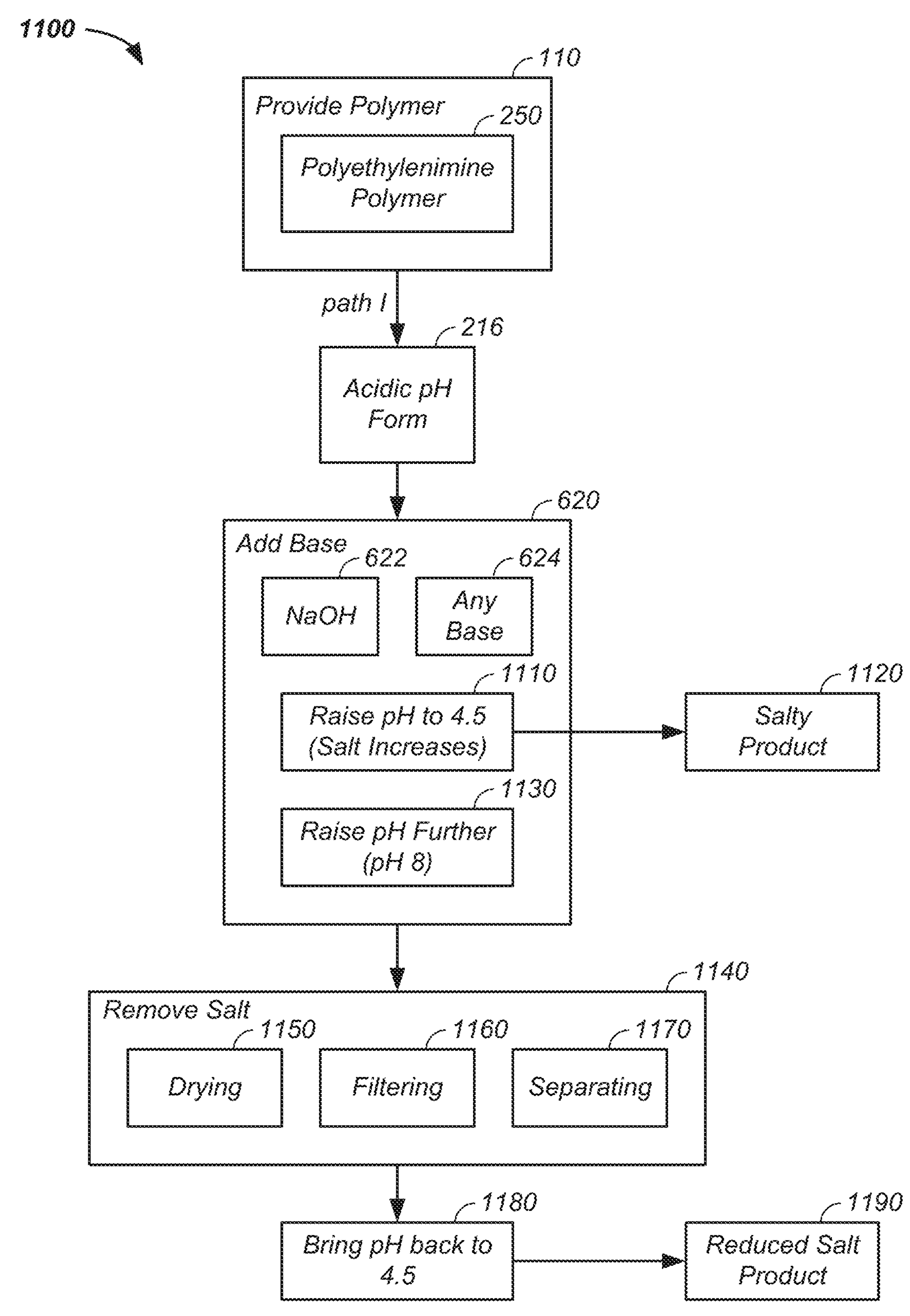
FIG. 11 illustrates a first alkalization polymer tuning process.

Referring now to FIG. 11, the first alkalization polymer tuning process 1100 is further described. As described, supra, generally the first alkalization polymer tuning process 1100 provides a polymer 110, such as polyethylenimine 250, such as in an acidic pH form 216; adds a base 620 to raise the pH, which yields a salt; in a subsequent and/or concurrent step removes at least a portion of the formed salt 1140; and adds an acid to bring the pH back down. Generally, the process of raising the pH, such as with sodium hydroxide 622, in any form or concentration, and/or adding any base 624, such as even a conjugate base, raises the pH of the formulation containing polyethylenimine 250 to a level where salt is formed, such as to a raised pH level of 4.5 1110, which yields a salty product 1120 containing polyethylenimine 250 or raises the pH even further 1130, such as to a pH greater than 4, 5, 6, 7, 8, or 9, which generates even more salt. Essentially, forming the salt, which precipitates, allows for an easy removal of the salt, whether in a precipitate form or in solution, through the process of removing the salt 1140.

Generally, the salt removal step 1140 optionally includes one or more of the steps of drying 1150, filtering 1160, and/or separating 1170 the salt with any salt removal technique, such as centrifugation, washing, rinsing, decanting, and the like. Once the salt is removed, the polyethylenimine 250 is brought back down in pH 1180, such as to a target pH of less than 6, 5.5, 5, 4.5, 4, 3.5, or 3 and/or to greater than 2, 3, or 4, which reprotonates the polyethylenimine 250—yielding the antimicrobial 231, antibacterial 232, antiviral 233, and/or antifungal 234 properties, described supra, associated with the more protonated form of polyethylenimine 250 at the lower pH and with a reduced salt concentration 1190/chemical activity allowing better interaction with bacteria and especially viruses, in any form.

Example II (Process II)

Figure 12:
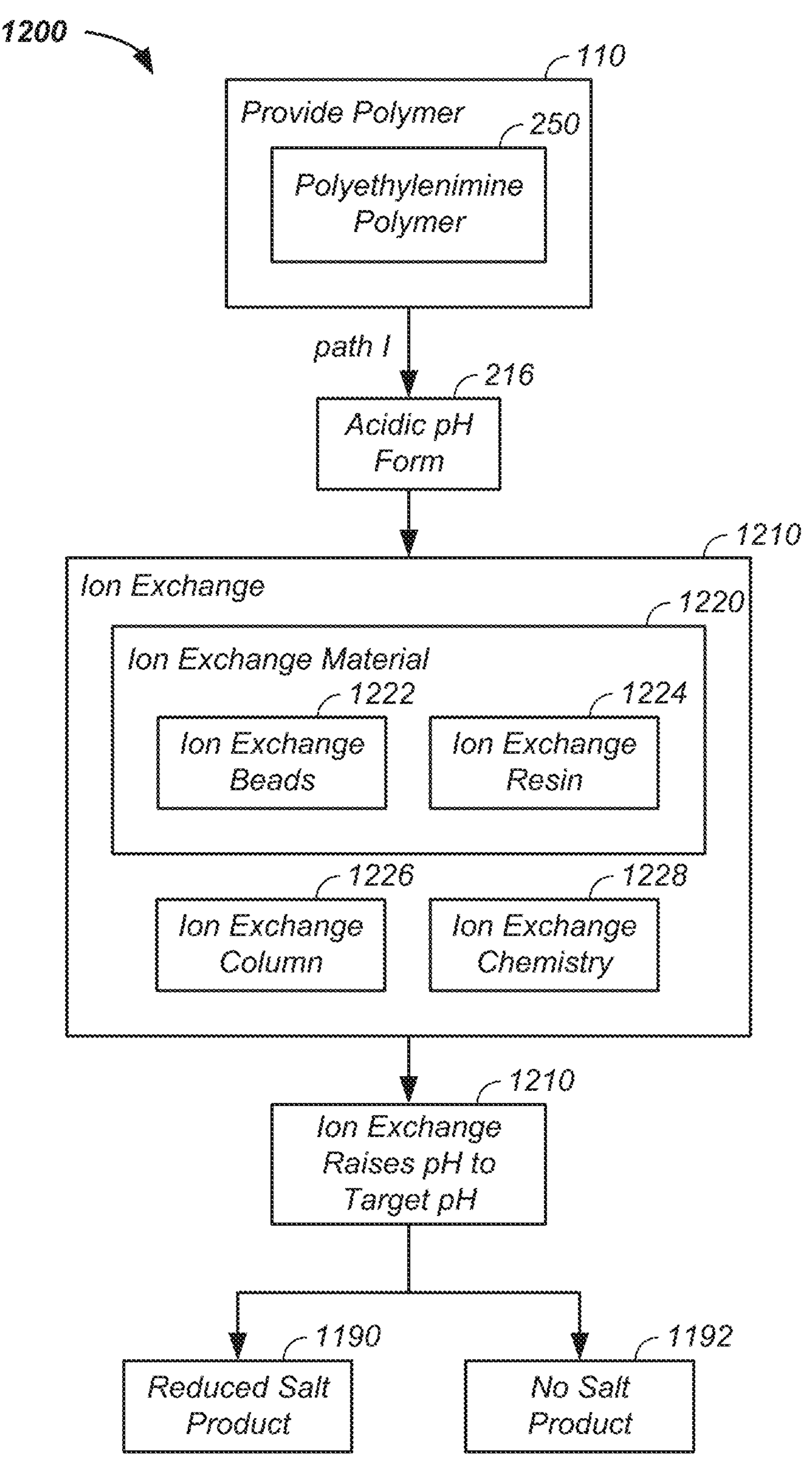
FIG. 12 illustrates a second alkalization polymer tuning process.

Referring now to FIG. 12, the second alkalization polymer tuning process 1200 is further described. In the second alkalization polymer tuning process 1200, the polymer is provided 110, such as the polyethylenimine 250, in a solution, such as in acidic pH form 216 and ion exchange 1210 is used to increase the pH of the polyethylenimine 250 formulation. For example, an ion exchange material 1220, such as ion exchange beads 1222 and/or an in exchange resin 1224 is used in an ion exchange column 1226, a container, and/or in ion exchange chemistry 1228 to exchange ions/counterions in/on the polyethylenimine 250 for anions on the anion exchange material. Optionally and preferably, anions on the ion exchange material 1220 are exchanged for counterions associated with positively charged sites on the polymer 200, such as for chloride anions functioning as counterions to protonated secondary amines of the polyethylenimine 250. Optionally and preferably, greater than 1, 2, 5, 10, 15, 20, 25, 30, 40, 50, 60, 70, 80, 90, 95, or 99 percent of counterions/counter-anions, such as chloride anions functioning as counterions to the polymer 200 are adsorbed onto and/or are bound to the ion exchange material 1220. Optionally and preferably, the percentage of counterions to protonated sites on the polymer, such as the percentage of chloride ions, is reduced to less than 99, 95, 90, 80, 70, 60, 50, 40, 30, 20, 10, or 5 percent of a total number of counterions, such as at a fixed point in time. The ion exchange material 1220 is optionally used to provide any anion to the polymer solution, such formate, acetate, iodide, and/or any anion described herein. In one optional and preferably case, the ion exchange material 1220 exchanges hydroxide anion, $OH^-$, for the chloride anions. The hydroxide anions and protons of the acidic solution combine to form water, which raises the pH of the solution, such as to a pH greater than 2, 3, 4, 5, or any pH described herein. Essentially, the ion exchange process 1210 achieves a task of raising the pH of the polyethylenimine 250 to a tuned pH level. During the process of raising the pH, the salt concentration of the polymer and/or a concentration of anions/counterions in the solution containing the polymer 200 is reduced, is not increased, and/or is raised by less than 10, 5, 2, 1, or 0.1 percent. Optionally, the ion exchange process 1210 yields a target pH based on pKas and/or binding/exchange coefficients of the exchange material. For instance, a formate exchange naturally bring the pH to within a pH unit or two of a pKa of formate of 3.75 or for acetate of 4.75. Combinations of conjugate bases are optionally used in the ion exchange process, as further described infra. Notably, commercially available polyethylenimine 250 is in either a fully protonated form with a pH of about 1 with greater than 90, 95, or 99% of the counterions to the protonated amines being chloride anions or is available in a fully deprotonated state with no charges amines at a pH greater than about 12. Commercially available polyethylenimine with a pH of less than six is not available in any form except where greater than 99% of the counterions, to protonated amines of the polyethylenimine, are chloride.

Example III (Process III)

Figure 13:
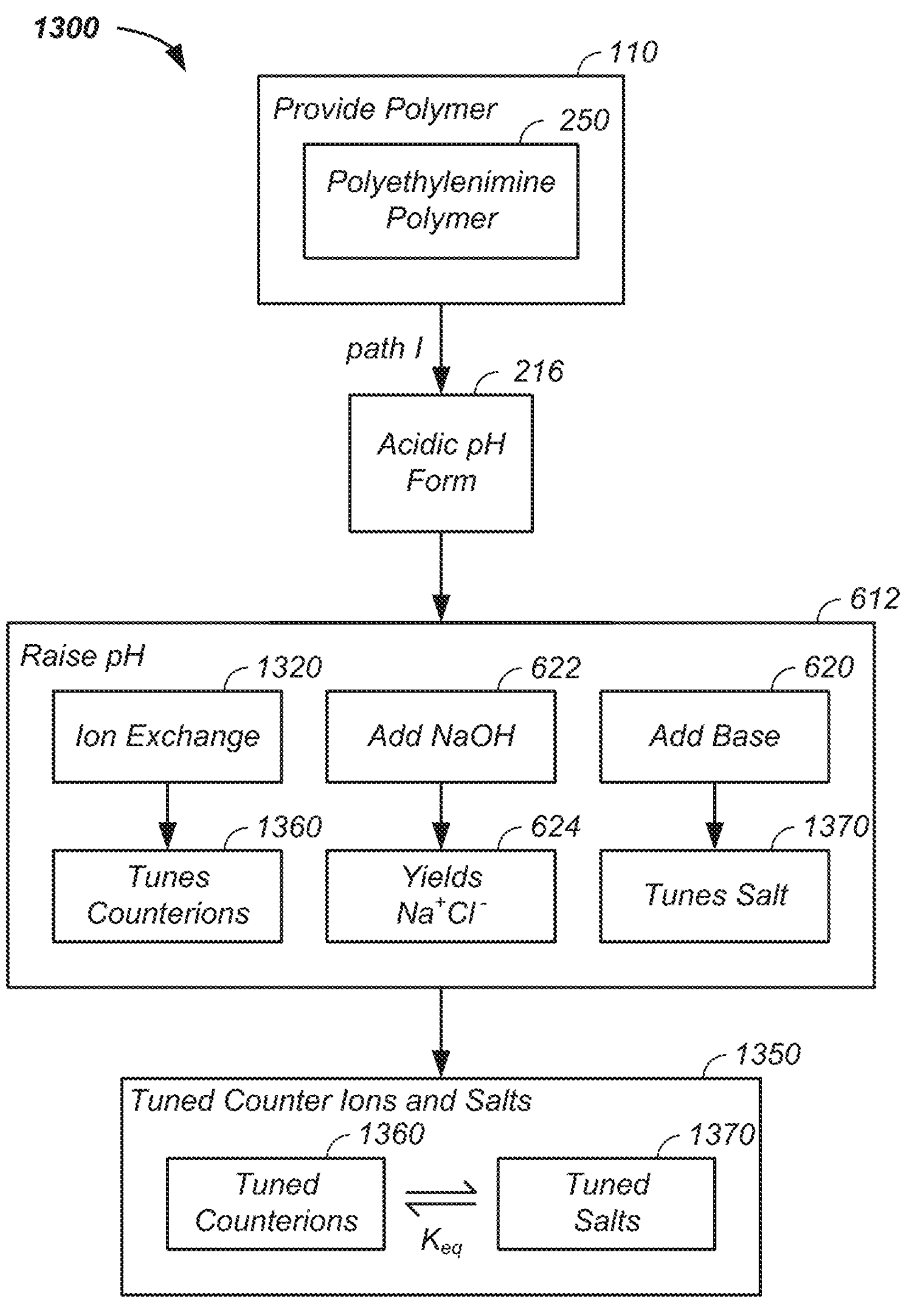
FIG. 13 illustrates a third alkalization polymer tuning process.

Referring now to FIG. 13, the third alkalization polymer tuning process 1300 is further described. Generally, the third alkalization polymer tuning process 1300 combines elements of the first alkalization polymer tuning process 1100 and the second alkalization polymer tuning process 1200 to use both ion exchange 1320 and addition of a base 620 to raise the pH 612 to a tuned pH/protonation level of the polyethylenimine 250. More specifically, the third alkalization polymer tuning process 1300 provides a polymer 110, such as the polyethylenimine 250 in an acidic form 216 and raises the pH 612 of the formulation, such as through one and preferably two or more of: (1) ion exchange 1320, which tunes the counter ions 1360; (2) addition of sodium hydroxide 622, which yields sodium hydroxide ions 624; and/or (3) adding a base 620, which tunes the salt 1370/counterions. For example, if formic acid/formate is added to raise the pH 612, the formate anion 324 is generated in the aqueous salt solution in the formulation about the polyethylenimine 250 and/or the formate anion 324 is provided as the counterion to the polyethylenimine 250, such as replacing, with an equilibrium coefficient, the chloride ion 322. Similarly, any acid/conjugate base molecule or acid/base pair is optionally used in place of and/or in combination with the formic acid: formate acid/base pair, which allows tuning of at least one of: (1) the salt type and/or salt concentration in the formulation about the polyethylenimine 250 and/or (2) the type and/or concentration of the counterions associated with the protonated sites 310 of the polyethylenimine 250.

Example IV (Process IV)

Figure 14:
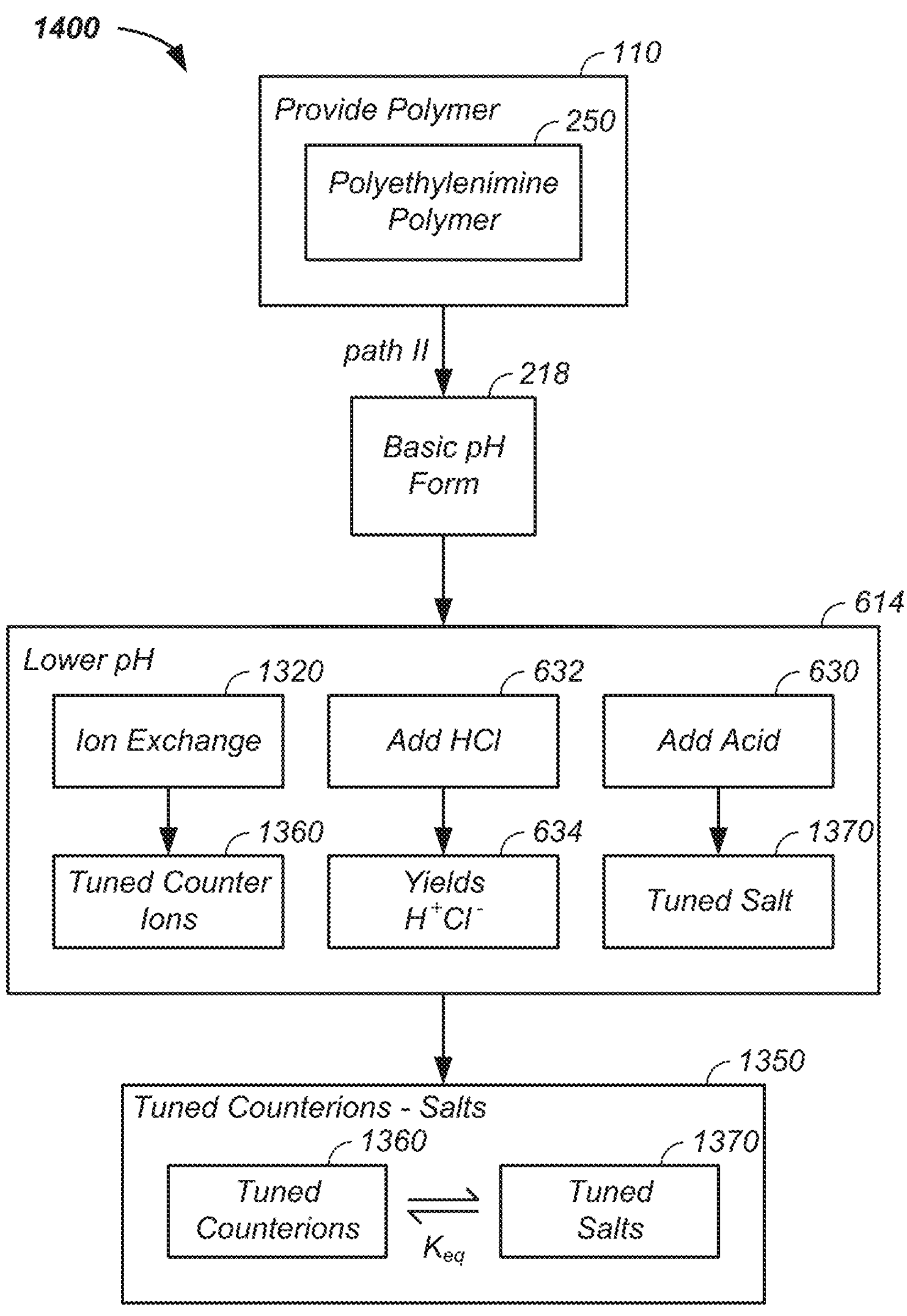
FIG. 14 illustrates a first acidification polymer tuning process.

Referring now to FIG. 14, the acidification polymer tuning process 1400 is further described. The acidification polymer tuning process 1400 is essentially any combination of the first alkalization polymer tuning process 1100, the second alkalization polymer tuning process 1200, and the third alkalization polymer tuning process 1300, where the pH is lowered rather than raised. For clarity of presentation and without loss of generality, only one of the inverse pH adjustment processes is here illustrated in FIG. 14. Generally, the acidification polymer tuning process 1400 provides a polymer 110, such as polyethylenimine 250, in the basic pH form 218; the pH is lowered 614; and the counterions and/or salts in solution are tuned 1350 in serial and/or parallel steps. In the lowering pH step 614, one and preferably two or more pH lowering processes are used, such as: (1) using ion exchange 1320 to tune the counterions 1360; (2) adding hydrochloric acid 632 to yield $H^+$ and $Cl^-$ in the formulation; and/or (3) adding acid 630 to tune the salt 1370 formed in solution. Again, in a manner related to that described in the third alkalization polymer tuning process 1300, addition of an acid-conjugate base pair, such as a formic acid-formate pair, tunes the counterion 320, such as associated with the protonated sites 310 of the polyethylenimine 250. Further, the pKa of the acid-conjugate base pair buffers the formulation. For instance, addition of the formic acid-formate acid/base pair results in lowering of the pH 614 while providing a buffer capacity, related to the amount of the acid/base pair added, about the pKa of the formic acid-formate pka of 3.75. Similarly, addition of the acetic acid-acetate acid/base pair buffers the pH of the formulation of the polyethylenimine 250 about the pKa of 4.75 for the acetic acid-acetate acid/base pair. Notably, the tuned counterions-salts 1350 are an equilibrium of tuned counterions 1360 with tuned salts 1370, as further described infra. Generally, the acidification polymer tuning process 1400: (1) lowers the pH with ion exchange and/or addition of an acid; (2) optionally provides the proton for the protonation 310 via the use of a weak acid-conjugate base acid/base pair, such as the use of formic acid; (3) tunes availability of the type and/or concentration of the counterion 320 via choice of the weak acid/base pairs or choice of strong acid type; (4) is optionally used in a process of creating no or limited salt, such as described in the process of using a conjugate base to acidify 900 the polymer 200, as described supra; (5) provides a buffer related to the pKas of the added acids; and/or (6) optionally and preferably removes a filtering step associated with removing excess salt in the formulation, such as resulting from either use of the initial fully acidic form of polyethylenimine 256 and/or the second subprocess of using a conjugate base to alkalize 1000 the polymer 200, which yields a salt, as described supra.

Referring again to FIG. 14 and generally referring to the salt solution 330 and the counterions 320 associated with the polymer 200, the salts in the salt solution 330 are in equilibrium with the counterions 320 associated with the polymer 200 in terms of position. That is, a first counterion and a first salt in solution optionally swap positions, such as relative to a protonation site 310 of the cationic 211 polymer. However, the first counterion type and the second counterion type have preferred locations. For instance, chemically the formate 324 will tend to displace the chloride ion 322 as the counterion. Further, since the polyethylenimine 250 preferably has thousands of protonated sites 310, the probability is great that the counterion type with the greater attraction to the protonated site 310 will be associated with the polymer 200. This probability of knowing which anion type is the counterion 320 and which anion type is in the salt solution 330 only increases with chain length of the polymer 200, such as the polyethylenimine 250. Generally, one can quantify the counterion 320 to salt solution 330 mean likelihood as being greater than 1, 2, 5, 10, 20, 25, 50, 75, 80, or 90 percent a counterion or vise-versa, such as by applying the relevant position equilibrium.

Example V (Process V)

Referring now to FIG. 15 and referring again to FIG. 9, a conjugate base polymer tuning process 1500 is illustrated. Generally, two or more stock solutions are optionally mixed to form the tuned polymer 210, which is particularly beneficial when starting with the basic form of polyethylenimine 252 or any polymer 200. Generally, a polymer is provided 110, such as polyethylenimine 250 in the basic pH form 218 and the pH is lowered 614, such as with an ion exchange conjugate acid/base pair 1320, which tunes the counterions 1360 and tunes the salt 1370. An example is provided for clarity of presentation and without loss of generality. If the basic form of polyethylenimine 252, such as in a first stock solution, is mixed with an acid/base pair or simply an acid, such as formic acid, in a second stock solution the basic form of polyethylenimine 252 is provided with an proton, from the acid, to yield a tuned protonation level of the polyethylenimine 254 and the counterion 320 is provided as the conjugate base. In a more specific example, if the basic form of polyethylenimine 252, such as in a first stock solution, is mixed with a second stock solution of formic acid, the formic acid concentration quantitatively yields an amount of the protonation sites 310 and yields the counterion 320 of formate 324 at a quantitative level, such as according to the interaction illustrated in the first subprocess of using a conjugate base to acidify 900 the polymer 200 illustrated in FIG. 9. Notably, this allows for direct quantitative measurement and/or comparison of the efficacy of differing counterions 320 associated with the polymer 200. For instance, a first formulation is made with a controlled amount of protonation 310 and a controlled amount of the counterion formate 324, which is tested against a bacteria or virus, such as using a government regulated process, as described supra. Similarly, a second formulation is made with a controlled amount of protonation 310 and a controlled amount of the counterion acetate 326, which is tested against a bacteria or virus, such as using a government regulated process, as described supra. Hence, each protonation level 310 and each controlled amount of counterion 320 is thus optionally and preferably controlled and quantitatively tested, as further described infra. Further, combinations of counterions 320 are optionally tested. For instance, in a first test a controlled amount of formate is added and tested yielding a first efficacy measure and in a second test, 100 ppm iodide anion is added, tested, and a second efficacy is measured, yielding, by difference, the effectiveness of the iodide anion. Further, the conjugate base polymer tuning process 1500 described herein logically combines with and/or is used as a step in any of the first general process 600, the second general process yielding a tuned counterion solution 700/formulation, the first alkalization polymer tuning process 1100, the second alkalization polymer tuning process 1200, the third alkalization polymer tuning process 1300, and/or the acidification polymer tuning process 1400, such as where a change in pH step is used, a counterion 320 is introduced, and/or a salt solution 330 is controlled.

Figure 15:
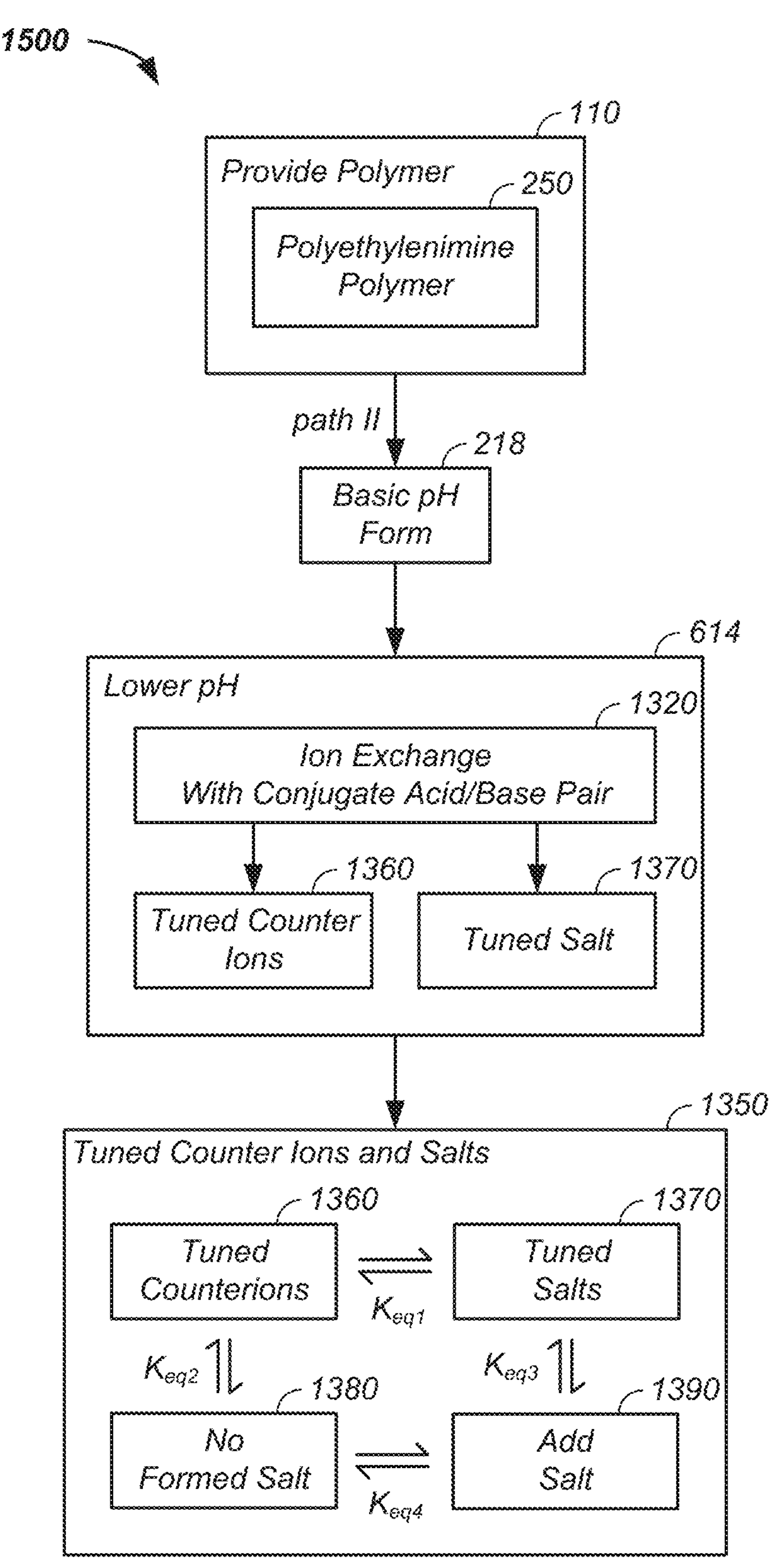
FIG. 15 illustrates a conjugate base polymer tuning process.

Still referring to FIG. 15, the tuned counterions 1360, the tuned salts 1370, no formed salt state 1380, and/or the added salt state 1390 are all in equilibrium with each other. However, the chemical properties of the ions, the activity of the solution, relative concentrations, and/or the probabilities associated with a large number of protonated sites 310 allows for calculation and/or probability determinations of which ions, such as the counterions 320, are associated with the polyethylenimine 250, as described supra.

Example VI (Preprocessing)

Figure 16:
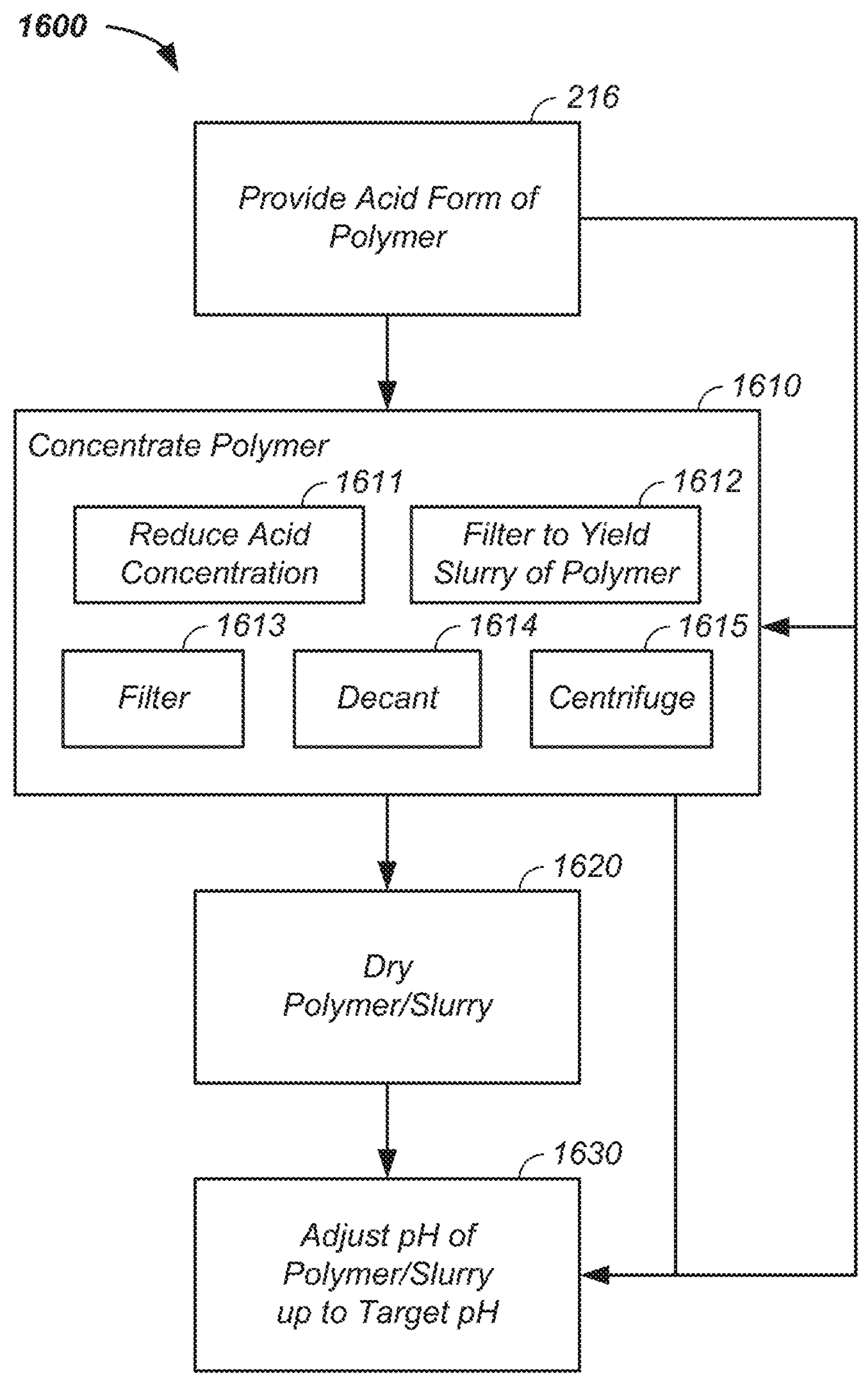
FIG. 16 illustrates a polymer slurry acid reduction process.

Referring now to FIG. 16, a polymer slurry acid reduction process 1600 is illustrated. Essential, the polymer slurry acid reduction process 1600 is optionally used in conjunction with any of the above described methods; however, a preferred use of the polymer slurry acid reduction process 1600 is to concentration the polymer 200 and/or reduce the overall acid molarity, which results in less salt production, where too much salt may interfere with efficacy of the tuned polymer 210 in terms of being antimicrobial 231, antibacterial 232, antiviral 233, and/or antifungal 234. Generally, an acidic form of the polymer is provided 216, such as the acidic form of polyethylenimine 256. The acidic form of polyethylenimine 256 is concentrated or simply the polymer is concentrated 1610, such as by one or more of: reducing the acid concentration 1611, filtering the acidic form of polyethylenimine 256 in hydrochloric acid to yield a slurry of polymer 1612, filtering 1613, decanting 1614, centrifuging 1615, or any process that reduces the overall molarity of the hydrochloric acid in any intermediate or final formulation of the tuned polymer 210. Essentially, removal of a portion of the hydrochloric acid results in a reduction of the amount of the chloride ion 322 and hence the reduction of the salt sodium chloride when the above described processes are implemented, where some of the processes exchange the chloride counterion 322 for another ion and/or alter the pH to form sodium chloride salt, such as by addition of a base, such as sodium hydroxide where the sodium cation combines with the chloride anion to form sodium chloride in any physical state, such as in solution and/or as a precipitate. As illustrated, the resulting polymer/slurry is optionally dried 1620, as described supra, and/or is pH adjusted up to a target pH 1630, as described supra. Stated again, the filtering step 1613 and/or the step of concentrating the polymer 1610 reduces the total base molarity needed adjust the pH, so less salt is generated with the use of the polymer slurry acid reduction process 1600, especially when raising the pH of the formulation from a very acidic pH, such as less than 3, 2, 1.7, 1.6, 1.5, or 1.

Example VI (Preprocessing)

Figure 17:
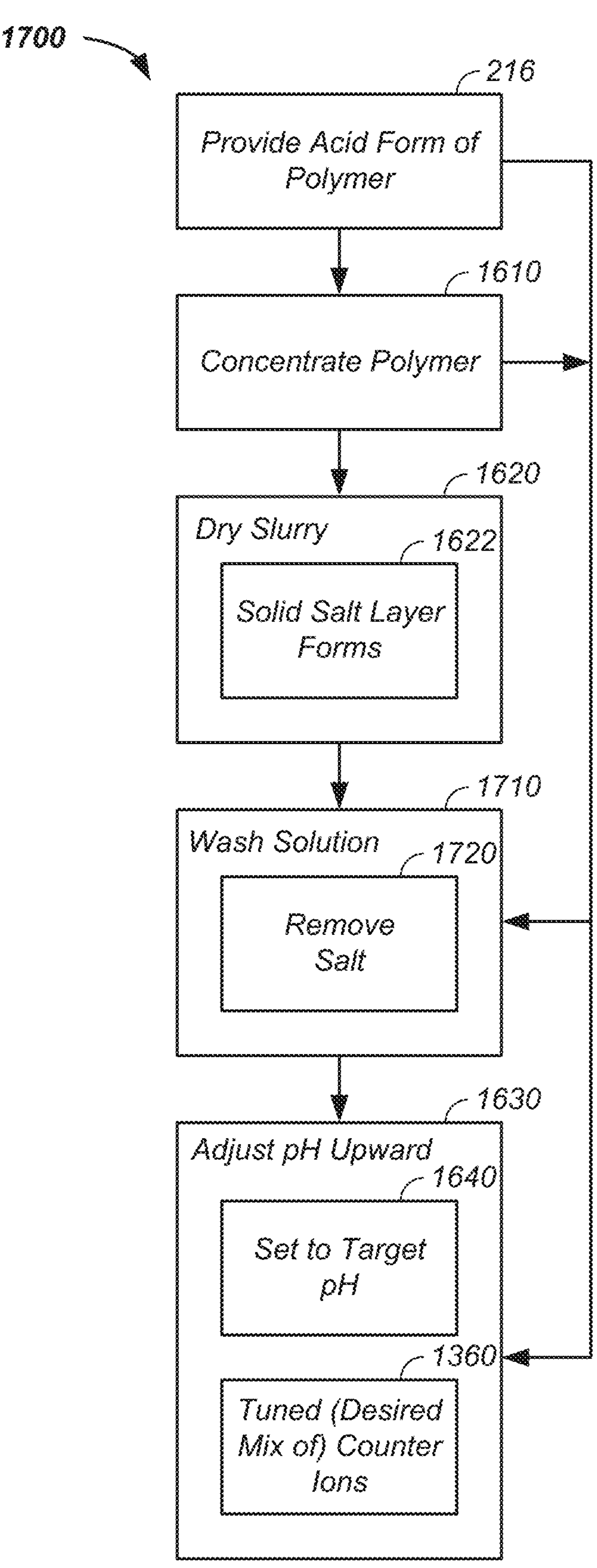
FIG. 17 illustrates a polymer-salt pair salt reduction process.
Figure 20:
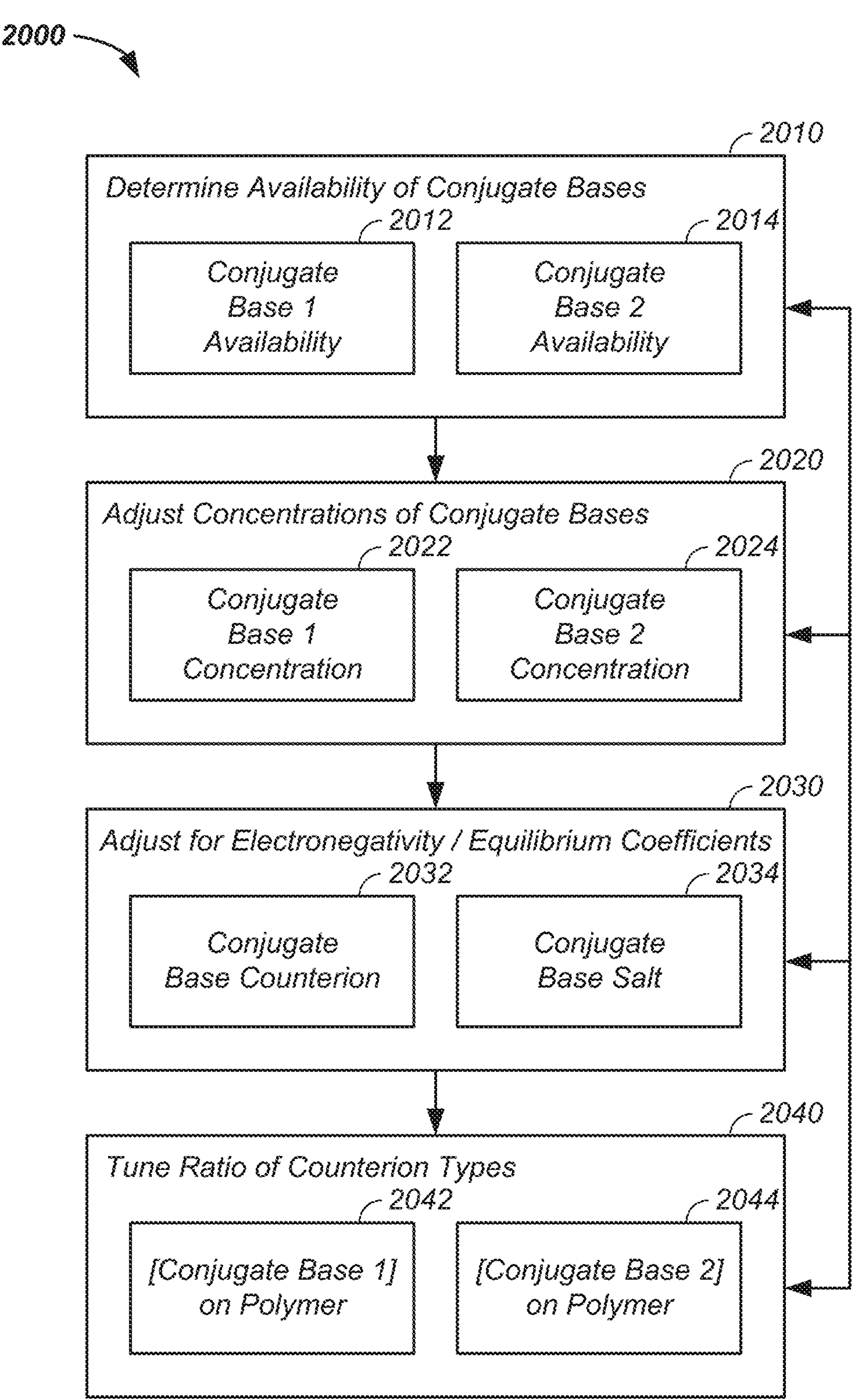
FIG. 20, illustrates relative concentration of conjugate base tuning.

Referring now to FIG. 17, a polymer-salt pair salt reduction process 1700 is illustrated. Generally, the polymer-salt pair salt reduction process 1700 optionally uses any one of more steps of the polymer slurry acid reduction process 1600, described infra, such as the step of concentrating the polymer 1610 and/or drying the slurry 1620, which may result in formation of a solid salt layer 1622. With or without formation of the salt layer 1622, the initial acidic form of the polymer 216, such as the acidic form of polyethylenimine 256, is optionally washed 1710, such as with an aqueous solution, to remove/reduce salt 1720. Again, optionally the pH is adjusted upward 1630 at the same or later time to set the pH to a target pH 1640 and/or to yield a tuned (desired mix/type/concentration) of counter ions 1360, as described throughout. Again, the polymer-salt pair salt reduction process 1700 is used with any method described herein to remove formed salt.

Polymer Tuning

Referring now to FIGS. 18-28, details on counterion tuning are provided for clarity of presentation and without loss of generality by way of the examples provided, infra.

Example I

Figure 18:
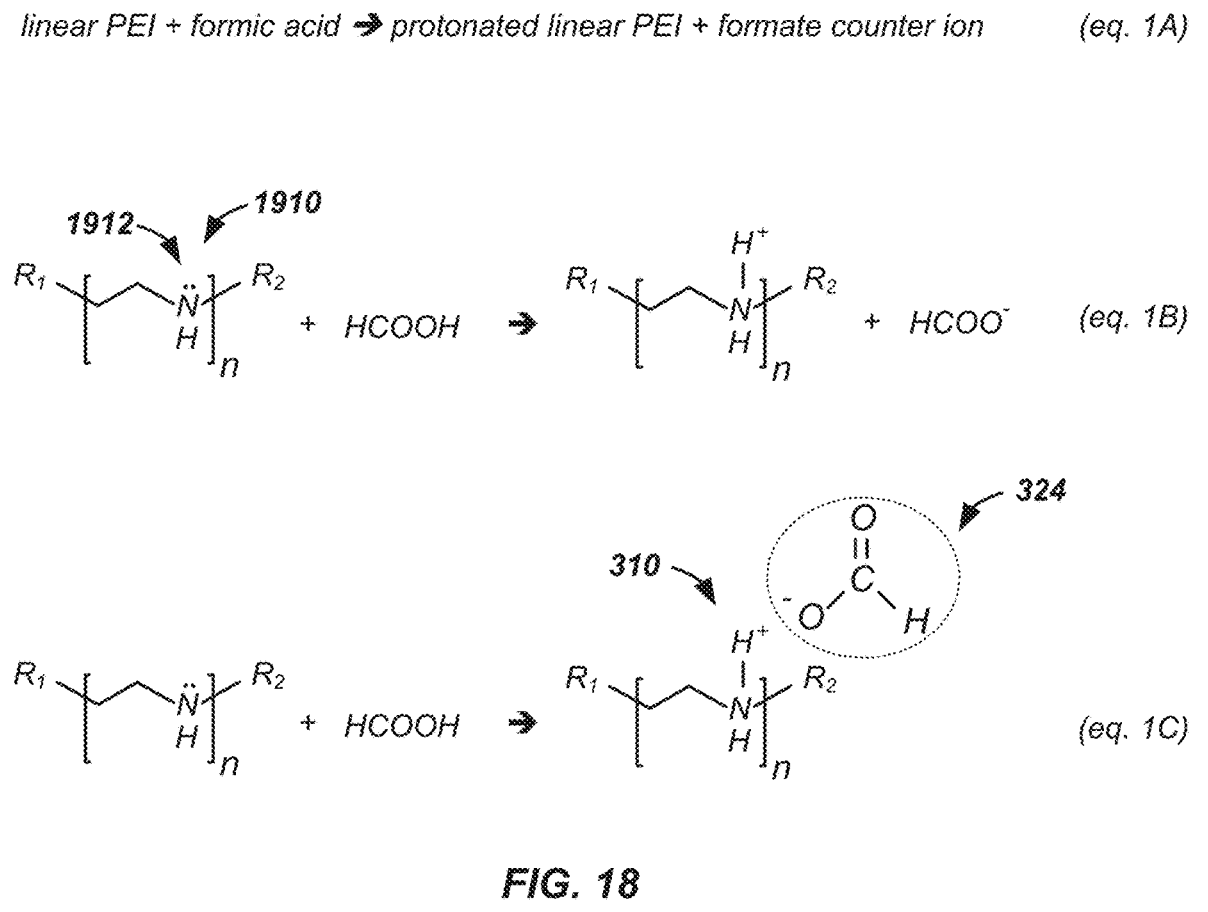

Referring now to FIG. 18, a polymer tuning with a weak acid process 1800 is illustrated. In this example, any strong or weak acid is optionally substituted for the illustrated process of adding the counter ion formate 324 to the polymer 200 or as illustrated to the polyethylenimine 250. Referring now to equation 1, in FIG. 18, the reaction of:

$$\text{linear } PEI + \text{formic acid} \rightarrow \text{protonated linear } PEI + \text{formate ion} \quad \text{(eq. 1)}$$

is repeated with chemical illustrations in equations 1B and equation 1C. Generally, the formate counter ion 324 from the formic acid equilibrium with formate is added to a proton on the secondary amine 1912 of the repeating unit 1910 and/or a proton from the formic acid protonates 310 the secondary amine 1912 to form a cationic polymer repeating unit.

Example I

Figures 19A, 19B:
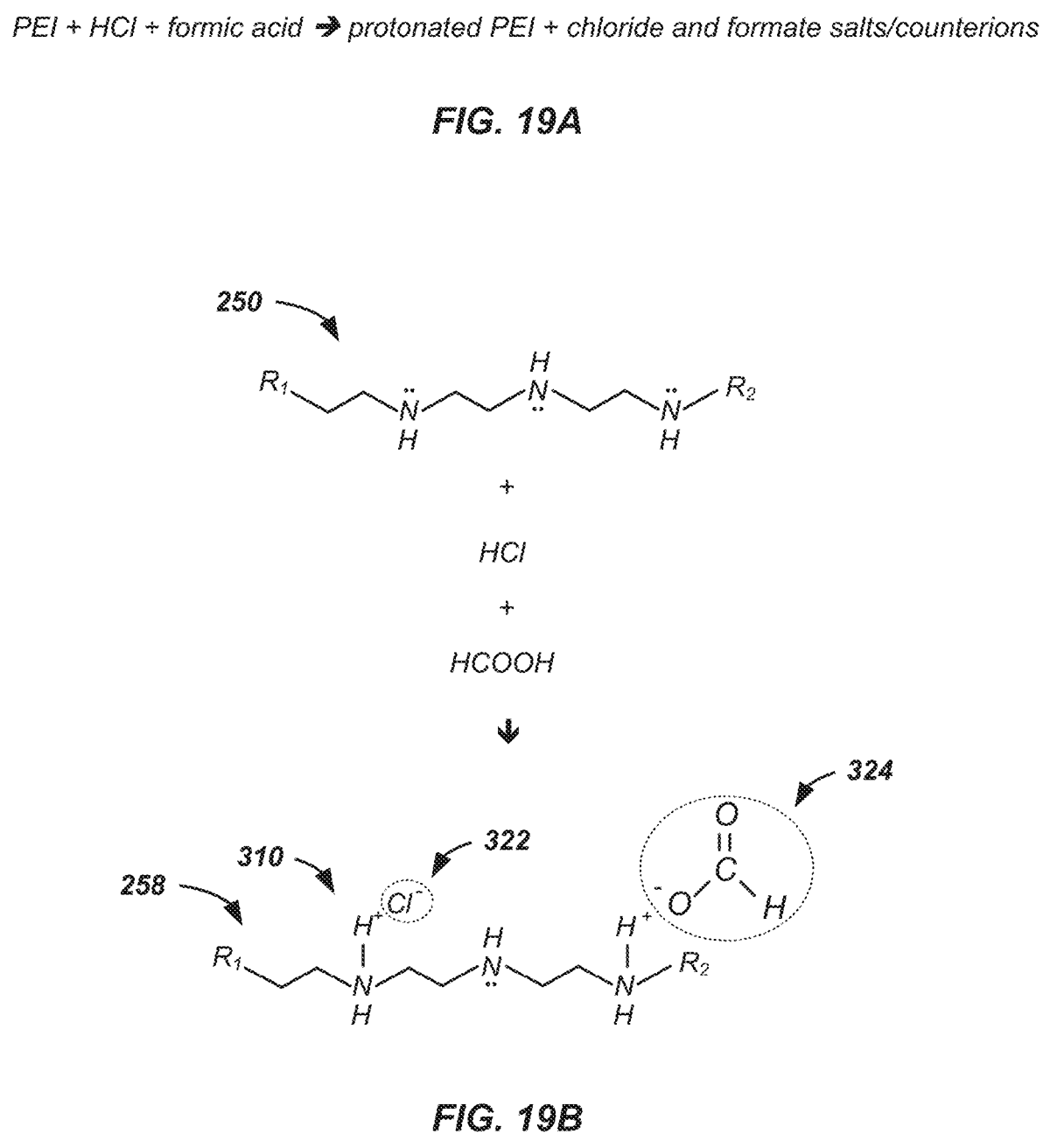

Referring now to FIG. 19, a polymer tuning with a weak acid and salt production process 1900 is illustrated. Generally, the weak acid and salt production process 1900 is the polymer tuning with a weak acid process 1800 with the addition of another acid, such as a strong acid, such as hydrochloric acid at any concentration or state. Again in this example, any strong or weak acid is optionally substituted for either of the illustrated processes of adding hydrochloric acid and the counter ion formate 324 to the polymer 200 or as illustrated to the polyethylenimine 250. Referring now to equation 2, in FIG. 19, the reaction of:

$$PEI + \text{HCl} + \text{formic acid} \rightarrow \text{protonated } PEI + \text{chloride ion} + \text{formate ion} \quad \text{(eq. 2)}$$

yields: (1) two protonation sites 310 on the protonated PEI having a non-chloride counterion, one proton on average from the hydrochloric acid and one from the formic acid and (2) two counterions 320, a chloride anion 322 and a formate anion 324 from the two acids, respectively. Generally, the chloride ion 322 and the formate counter ion 324 from the formic acid-formate equilibrium is added as being loosely bound to the protons on the secondary amines 1912 of the repeating unit 1910 and/or protons from the polyethylenimine 250 and/or formic acid protonates 310 the secondary amine 1912 to form a cationic polymer repeating unit. Herein, the result of a protonated polymer having non-chloride counterions 258 is distinct from a protonated polymer having only chloride counterions, both in chemical structure and application efficacy.

Tuning Counterion Availability

Referring now to FIG. 20 and FIGS. 21-28, relative concentration of conjugate base tuning 2000 is illustrated. Generally, a process of relative concentration of conjugate base tuning 2000 includes one or more of the steps of: (1) determining availability of the conjugate bases 2010/anions/counterions, such as the availability of a first conjugate base 2012, a second conjugate base 2014, or n conjugate bases, where n is a positive integer greater than 0, 1, 2, 3, 4, or 5; (2) adjusting concentration of the conjugate bases, such as a first conjugate base concentration 2022, a second conjugate base concentration 2024, or n conjugate base concentrations, where n is a positive integer greater than 0, 1, 2, 3, 4, or 5; and/or (3) optionally adjusting for electronegativity and/or equilibrium coefficients 2030, such as determining/using an equilibrium between a conjugate base associated with the polymer 2032 and the conjugate base being a salt in solution 2034 and/or the affect of electronegativity on an activity coefficient for the protonated site 310/counterion 320, which combined and/or separately allow for tuning a ratio of counterion types 2040, such as a concentration of first conjugate base on the polymer association 2042, a concentration of a second conjugate base on the polymer association 2044; or concentrations of n conjugate bases on the polymer associations, where n is a positive integer greater than 0, 1, 2, 3, 4, or 5. For clarity of presentation and without loss of generality, several examples are provided, infra, to further illustrate the process of relative concentration of conjugate base tuning 2000.

Example I

Figure 21:
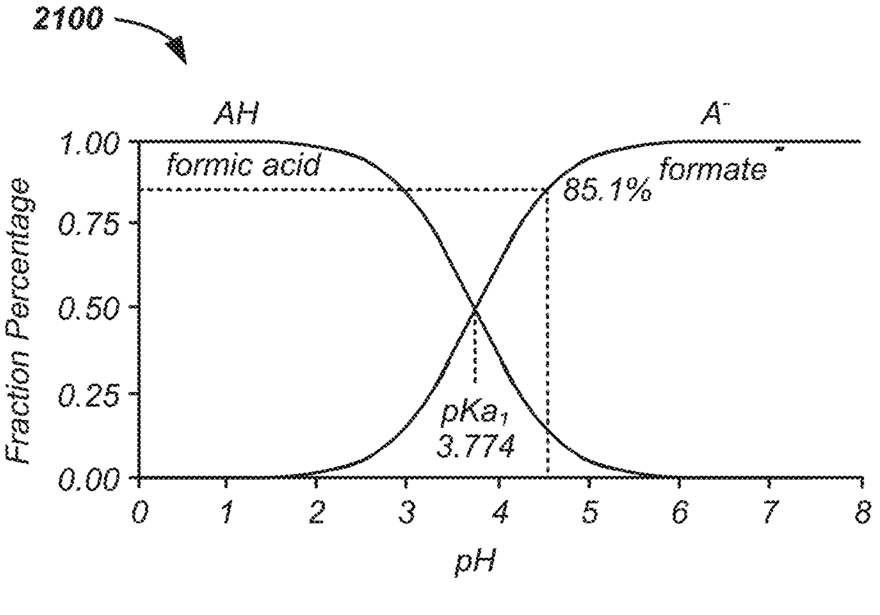
FIG. 21 illustrates first conjugate base availability determination.

Referring now to FIG. 21, a process of determining a first conjugate base availability 2100 is illustrated. Generally, the amount of any counterion 320 associated with the polymer 200 in a formulation of the tuned polymer 210 is optionally and preferably controlled. For clarity of presentation and without loss of generality, control of the counterion formate 324 is illustrated, which again is optionally repeated for any counterion and/or two or more counterions 320. Optionally, the counterion concentrations and/or availabilities are optionally independently quantitatively controlled, such as through implementation of any one or more of the processes described herein. In the case of formate 324, formate has a pKa of 3.774. Based upon the pKa, the fraction percentage of any form or any monoprotic, diprotic, and/or triprotic acid is calculable. In FIG. 21, the fraction percentage of formic acid and formate are illustrated as a function of pH. As indicated, if a fraction percentage of formate of 85.1 percent is desired, then the pH is adjusted to pH 4.5. Conversely, the pH is selected and the fraction percent of the conjugate base(s) are known. Hence, using any of the processes described herein, the formate concentration is 85.1 percent of the total molarity of the formic acid-formate acid/base pair at pH 4.5. Notably, the overall formate and/or conjugate base concentration is optionally raised or lowered to alter the total amount/concentration of formate 324/conjugate base available as a counterion 320 in a formulation of the tuned polymer 210, as further described in the following example.

Example II

Figure 22:
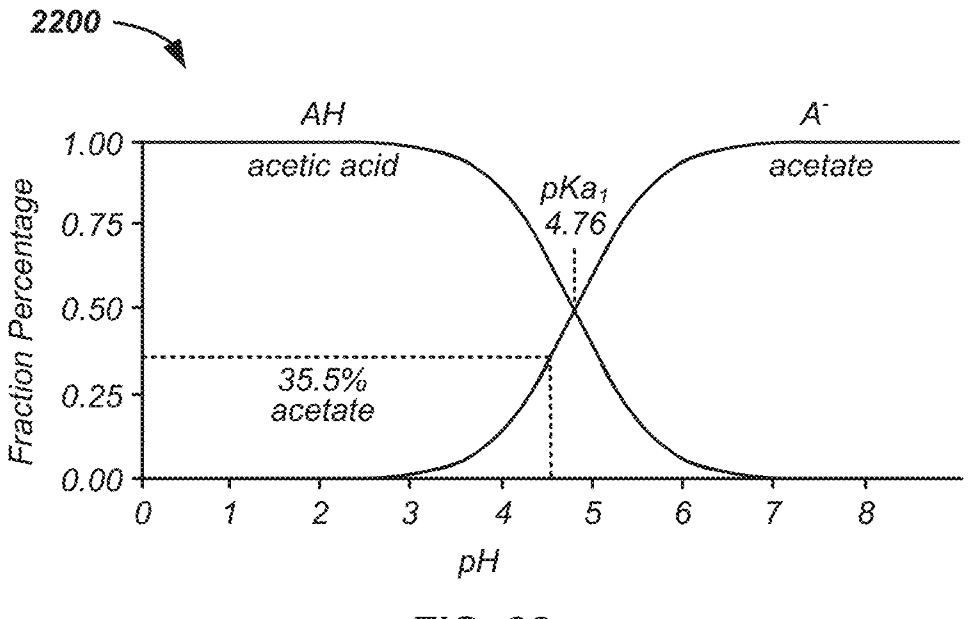
FIG. 22 illustrates second conjugate base availability determination.

Referring now to FIG. 22, second conjugate base availability determination 2200 is illustrated. In this example, availability of acetate 326 is determined just as described for the determination of formate 324 in the prior example, only using a pKa of acetate of 4.76. While formate 324 had an availability of 85.1 percent at pH 4.5, as described in the preceding paragraph, acetate 326 only has an availability of 35.5 percent at the same pH of 4.5. Thus, if both formate 324 and acetate 326 were added in equal molar values, the ratio of formate-to-acetate is 85.1:35.5 at pH 4.5, or a ratio of 2.4:1. However, the total mass/concentration of each counterion is optionally varied/controlled, as further described in the following example.

Example III

Figure 23:
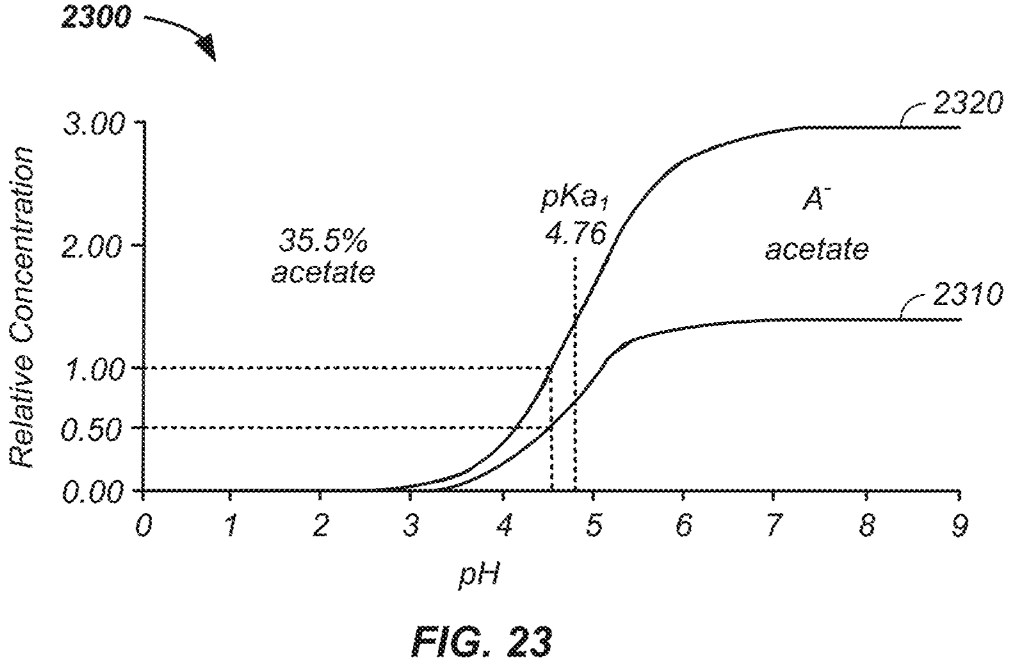
FIG. 23 illustrates adjusting conjugate base concentration.

Referring now to FIG. 23, adjusting a conjugate base concentration 2300 is illustrated. Generally, any counterion 320 concentration is raised/lowered by altering the total mass in a formulation of the polymer 200. In this illustrative example, acetate 326 is illustrated at a first acetate concentration 2310 and at a second acetate concentration 2320 that is two times the first concentration. Thus, by increasing the acetate concentration, the ratio of formate-to-acetate is controlled, as illustrated in the next example. Stated another way, while the fraction of acetate to total acetate+acetic acid is still 35.5 percent at pH 4.5, as illustrated in the prior example, the amount of acetate available is controllably altered by changing the total mass of acetate+acetic acid in the formulation and/or in a formulation step. For instance, doubling or halving the total mass of acetate+acetic acid, the amount of acetate double or halves, respectively.

Example IV

Figure 24:
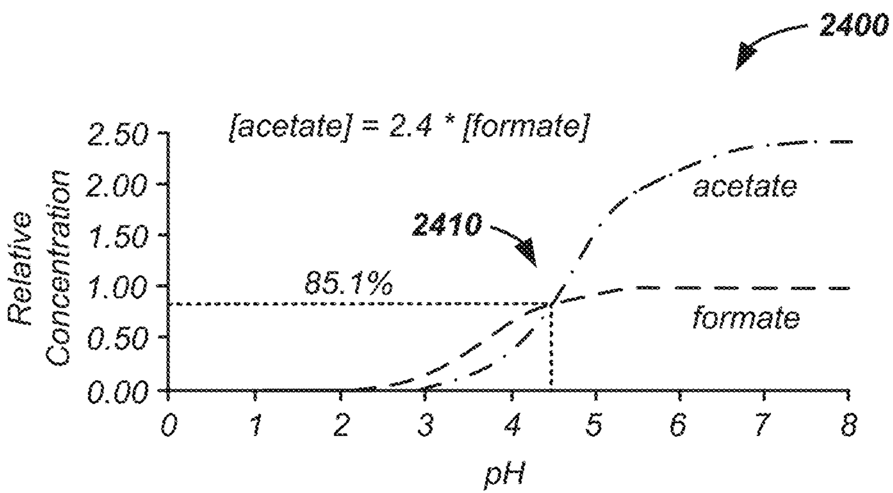
FIG. 24 illustrates relative tuning of two conjugate bases.

Referring now to FIG. 24, relative tuning of two conjugate bases 2400 is illustrated. Particularly, by adding 2.4 times as much acetic acid-acetate to a formulation as formic acid-formate, the acetate concentration is made equal to the formate concentration (35.5*2.4=85.1). Thus, the relative concentration ratio of formate-to-acetate is made to be one-to-one (1:1). Thus, the formate concentration is raised or lowered to alter the total amount of formate 324 available as a counterion 320 in a formulation of the tuned polymer 210. Similarly, the concentration of any conjugate base or first counterion is optionally and preferably tunable to any level, such as greater than 0, 0.1, 0.5, 1, 5, 10, 20, 30, 40, or 50 percent of the counterions 320 and/or a second counterion; less than 100, 90, 80, 70, 60, or 50 percent of the counterions 320 and/or a second counterion; and/or within ±1, 2, 5, 10, 25 or 50 percent of a fractional percentage of a given counterion to all counterions and/or to a second counterion of 10, 20, 30, 40, 50, 60, 70, 80, or 90 percent, as is further illustrated in the next example.

Example V

Figure 25A:
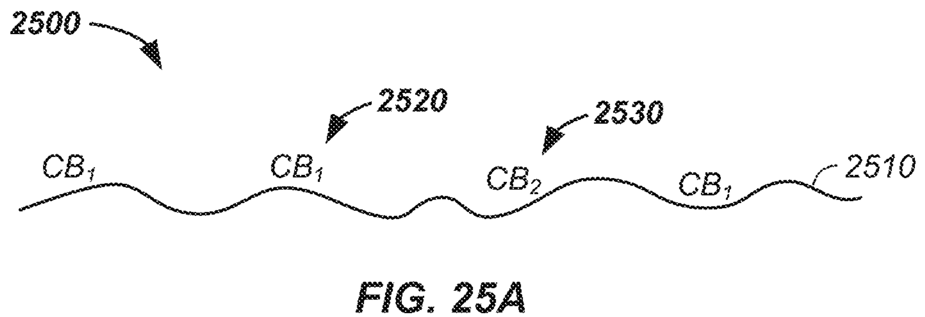
FIG. 25A and FIG. 25B illustrate two counterion ratios.
Figure 25B:
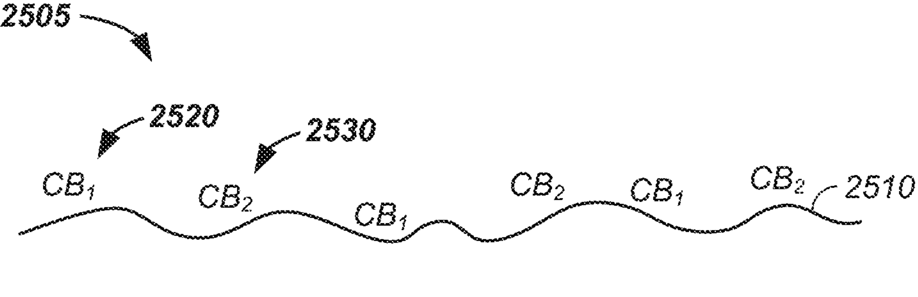

Referring now to FIG. 25A, a first counterion ratio 2500 on the polymer 200 with a backbone 2510 of atoms and/or monomers 253 is illustrated with a first conjugate base 2520 ($CB_1$)-to-a second conjugate base 2530 ($CB_2$) ratio. As illustrated the first conjugate base-to-second conjugate base ratio is three to one, 3:1. Referring now to FIG. 25B, a second counterion ratio 2505 on the polymer 200 is illustrated after tuning the conjugate base ratios/counterion ratios, as described supra. Particularly, as illustrated the first conjugate base-to-second conjugate base ratio is now tuned to one to one, 1:1, where any tuning ratio is optionally formulated, as described supra.

Figure 26:
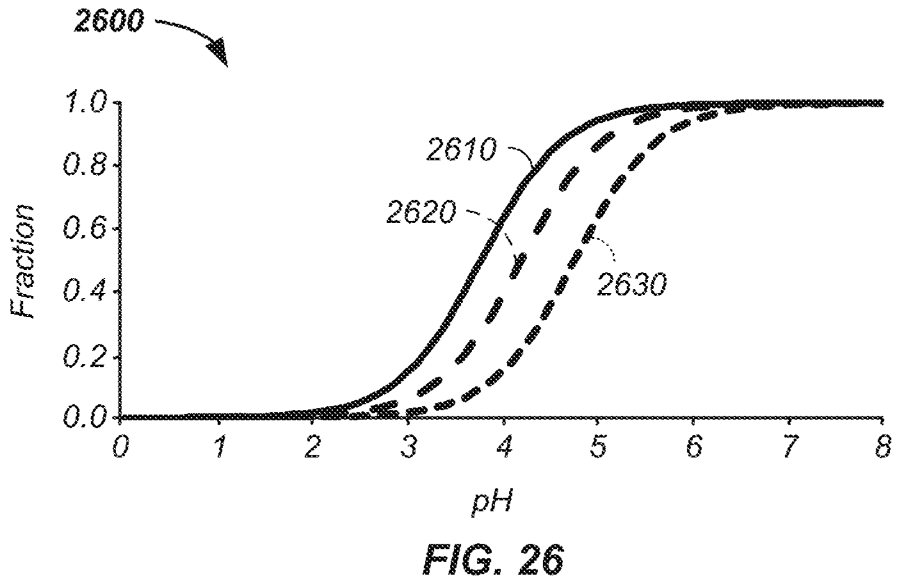
FIG. 26 illustrates relative concentration of conjugate base tuning with three counterion types.
Figure 27:
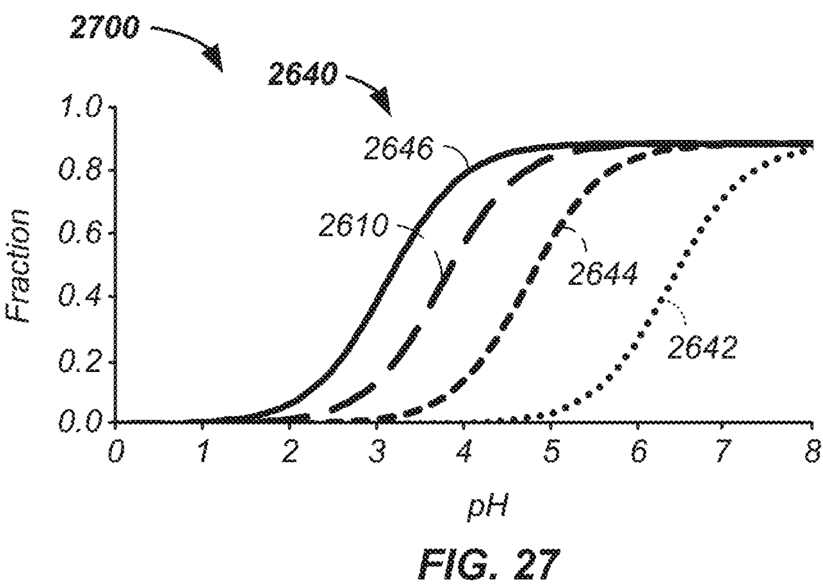
FIG. 27 illustrates relative concentration of conjugate base tuning with polyanionic compounds.

Referring now to FIG. 26, relative concentration of conjugate base tuning with three counterion types 2600 is illustrated. Here, formate fractions 2610, benzoate fractions 2620, and acetate fractions 2630 are illustrated as a function of pH, in a manner similar to that illustrated in FIGS. 21 and 22. The processes described in relation to FIGS. 20-25 are optionally repeated for three or more base pairs, such as illustrated for formate 324, benzoate, and acetate 326 herein. Thus, ratios of three base pairs are optionally controlled with a ratio of zero-to-one for the first conjugate base to zero-to-one for the second conjugate base to zero-to-one for the third conjugate base (0 to 1:0 to 1:0 to 1) at any analog step interval such as within ±0.05 of 0.1, 0.2, 0.25, or 0.5. Referring now to FIG. 27, the same process optionally uses a polyprotic acid 2700 with multiple conjugate bases, such as illustrated for the fractions of citrated 2640, such as citrate$^{3-}$ 2642, citrate$^{2-}$ 2644, and citrate$^{1-}$ 2646 with or without mixing with another conjugate base, such as the illustrated formate fraction 2610.

Figure 28:
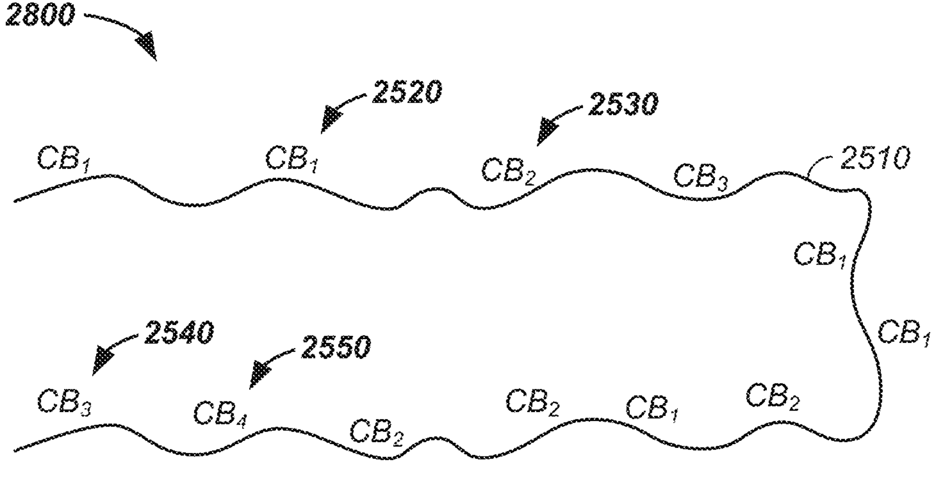
FIG. 28 illustrates relative tuning of multiple conjugate bases/counterions.

Referring now to FIG. 28, relative tuning of multiple conjugate bases/counterions 2800 is illustrated. As illustrated, the polymer 200 is associated with the first conjugate base 2520 ($CB_1$), the second conjugate base 2530, a third conjugate base 2540, and a fourth conjugate base 2550 at a ratio of five to four to two to one (5:4:2:1), where any ratios of conjugate bases are optionally and preferably formulated.

The inventors note that de-salting/tuning counterion availability decreases toxicity to humans, vertebrates, and invertebrates. Particularly, when polyethylenimine 250 is protonated with traditional means of combining with concentrated hydrochloric acid, essentially all of the counterions to the formed protonated sites are chloride. Notably, the Environmental Protection Agency states that the National Aquatic Life Criteria for chloride is 860 mg/L for an acute exposure and 230 mg/L for a chronic exposure. Even with removal of all excess hydrochloric acid from formed protonated polyethylenimine, the concentration of chloride counterions, for a pH 4.5/twenty-eight percent protonated polyethylenimine, is 1120 mg/L (1120 ppm). Generally, the chloride counterion concentration, with manufacturing with hydrochloric acid, exceeds the Environmental Protection Agency requirements for any protonated polyethylenimine in a pH range of 1 to 9. Thus, replacing chloride counterions with other, less toxic, counterions is optionally and preferably performed to meet the U.S. Environmental Protection Agency standards. Any of the methods described herein are optionally and preferably implemented to meet the U.S. Environmental Protection Agency standards.

Antibacterial, Antiviral, And Antifungal Testing

The inventors have determined that formate/formic acid, acetate/acetic acid, citrate/citric acid, and iodide/iodine each have antibacterial properties in combination with linear PEI, where the PEI is in solution and/or a solid film. Linear PEI with both chloride and formate counterions yielded 99.9999 percent activation using the EPA 01-1A test protocol for durability testing for both MRSA and *E. coli* on a glass substrate and in separate testing on stainless steel substrate with contact times of 10 minutes. Similarly, combinations of formate, acetate, and iodide with chloride yielded percent inactivation ranging from 99.4 to 99.99 using ISO 22196 and JIS 1902 test protocols for MRSA, *E. coli*, and fungi on substrates of (separately tested) plastic, textile, and glass with contact times of 1 minute to 10 minutes and were even effective against c. Diff with percent inactivation of 98 and 99.4 percent with contact times of 8 and 24 hours, respectively. Representative antibacterial test results are provided in Tables 1(A-D), infra.

TABLE 1A

Linear PEI, Chloride, and Formate Antibacterial Film Testing

| Non-durability Testing | Substrate | Contact Time | Chloride and Formate | Test Protocol | Percent Inactivation |
|---|---|---|---|---|---|
| Gram-positive MRSA | Plastic | 2 min | X | IS0 22196 | 99.99 |
| Gram-negative *E. coli* | Plastic | 2 min | X | IS0 22196 | 99.99 |
| Gram-negative *E. coli* | Textile | 10 min | X | JIS 1902 | 99.4 |
| *C. diff* | Glass | 24 hours | X | IS0 22196 | 99.4 |
| Gram-negative *E. coli*. | Stainless | 5 min | X | PAS 2424 | 99.99 |
| Gram-negative *P. Aeruginosa* | Stainless | 5 min | X | PAS 2424 | 99.93 |
| Gram-positive MRSA | Stainless | 5 min | X | PAS 2424 | 99.92 |
| Gram-negative *E. hire* | Stainless | 5 min | X | PAS 2424 | 99.94 |
| Gram-negative *E. coli*. | Stainless | 5 min | X | PAS 2424 | 99.99 |
| Gram-negative *E. coli*. | Glass | 10 min | X | 01-1A | 99.999 |
| Gram-negative *P. aeruginosa* | Glass | 10 min | X | 01-1A | 99.999 |
| Gram-positive MRSA | Glass | 10 min | X | 01-1A | 99.999 |
| Gram-negative *E. hire* | Glass | 10 min | X | 01-1A | 99.999 |

TABLE 1B

Linear PEI, Chloride, and Acetate Antibacterial Film Testing

| Non-durability Testing | Substrate | Contact Time | Chloride and Acetate | Test Protocol | Percent Inactivation |
|---|---|---|---|---|---|
| Gram-positive MRSA | Glass | 2 min | X | IS0 22196 | 99.99 |
| *C. diff* | Glass | 8 hours | X | IS0 22196 | 98 |
| Gram-negative *E. coli*. | Glass | 10 min | X | 01-1A | 99.99 |
| Gram-negative *P. aeruginosa* | Glass | 10 min | X | 01-1A | 99.99 |
| Gram-positive MRSA | Glass | 10 min | X | 01-1A | 99.99 |

TABLE 1C

Linear PEI, Chloride, and Iodide Antibacterial Film Testing

| Non-durability Testing | Substrate | Contact Time | Chloride and Iodide | Test Protocol | Percent Inactivation |
|---|---|---|---|---|---|
| Gram-positive MRSA | Plastic | 1 min | X | IS0 22196 | 99.87 |
| Gram-negative *E. coli* | Plastic | 1 min | X | IS0 22196 | 99.79 |
| Gram-negative *E. coli* | Textile | 10 min | X | JIS 1902 | 99.4 |

TABLE 1D

Linear PEI, Chloride, and Formate Antibacterial Film Testing

| Durability Testing | Substrate | Contact Time | Chloride and Formate | Test Protocol | Percent Inactivation |
|---|---|---|---|---|---|
| Gram-positive MRSA | Glass | 10 min | X | 01-1A | 99.9999 |
| Gram-negative *E. coli* | Glass | 10 min | X | 01-1A | 99.9999 |
| Gram-positive MRSA | Stainless | 10 min | X | 01-1A | 99.9999 |
| Gram-negative *E. coli* | Stainless | 10 min | X | 01-1A | 99.9999 |

The inventors have determined that formate/formic acid, acetate/acetic acid, citrate/citric acid, and iodide/iodine each have antiviral properties in combination with linear PEI. Using government approved testing and/or internal tests paralleling government approved tests, linear PEI with chloride and formate counterions yielded 99.6 to 99.9 percent inactivation of enveloped viruses; linear PEI with chloride and acetate counterions yielded 99.95 to 99.99 inactivation of enveloped and non-enveloped viruses; and linear PEI with chloride and iodide counterions yielded 89.7 percent inactivation of the very difficult non-enveloped polio virus, where the tests were performed on a variety of substrates with contact times ranging from 5 to 10 minutes. Representative antiviral test results are provided in Tables 2(A-C), infra.

TABLE 2A

Linear PEI, Chloride, and Formate Antiviral Testing

| Durability Testing | Substrate | Contact Time | Chloride and Formate | Test Protocol | Percent Inactivation |
|---|---|---|---|---|---|
| Vaccinia enveloped Virus | Plastic | 5 min | X | IS0 22702 | 99.96 |
| Beta Corona enveloped Virus | Stainless | 5 min | X | IS0 22702 | 99.9 |
| Polio Non-enveloped Virus | Plastic | 10 min | X | EN 14476 | 99.6 |
| Vaccinia enveloped virus | Stainless | 10 min | X | PAS 2424 | 99.96 |
| Beta Corona enveloped virus | Artificial Skin | 10 min | X | PAS 2424 | 99.9 |

TABLE 2B

Linear PEI, Chloride, and Acetate Antiviral Testing

| Durability Testing | Substrate | Contact Time | Chloride and Acetate | Test Protocol | Percent Inactivation |
|---|---|---|---|---|---|
| MS2 Surrogate for Non-enveloped Virus | Glass | 5 min | X | IS0 22702 | 99.99 |
| Enveloped H1N1 | Spray test | 5 min | X | EXI .2.10.26.17 | 99.95 |
| Non-enveloped Rhinovirus | Spray test | 5 min | X | EXI .2.10.26.17 | 99.95 |

TABLE 2C

Linear PEI, Chloride, and Iodide Antiviral Testing

| Durability Testing | Substrate | Contact Time | Chloride and Iodide | Test Protocol | Percent Inactivation |
|---|---|---|---|---|---|
| Non-enveloped Polio | Textile | 10 min | X | IS0 22702 | 89.7 |
| Polio Non-enveloped virus | Stainless | 10 min | X | PAS 2424 | 89 |

The inventors have determined that formate/formic acid, acetate/acetic acid, citrate/citric acid, and iodide/iodine each have antifungal properties in combination with linear PEI. Using government approved testing, linear PEI with chloride and formate counterions yielded 99.6 to 99.9 percent inactivation of fungus. Referring now to FIG. 3A, representative antifungal test results are provided.

TABLE 3A

Linear PEI, Chloride, and Formate Antifungal Film Testing

| Non-durability Testing | Substrate | Contact Time | Chloride and Formate | Test Protocol | Percent Inactivation |
|---|---|---|---|---|---|
| Fungi | Textile | 2 min | X | JIS 1902 | 99.6 |
| Fungi | Glass | 5 min | X | IS0 22196 | 99.99 |
| Fungus *Candida auris* | Stainless | 5 min | X | PAS 2424 | 99.94 |

Chemical Backbone 2510

Referring now to FIGS. 29 to 36, the backbone 2510 is further described. Herein, the polymer 200 is used as an example of a chemical backbone 2510 of a charged chemical structure 2910. Stated again, the polymers 200 described herein are used to carry a plurality of charges, such as cationic charges, along a chemical backbone 2510. However, the chemical backbone 2510, of which the polymer 200 is an example, is optionally any sequence of covalently bonded atoms, such as described infra.

Figure 29:
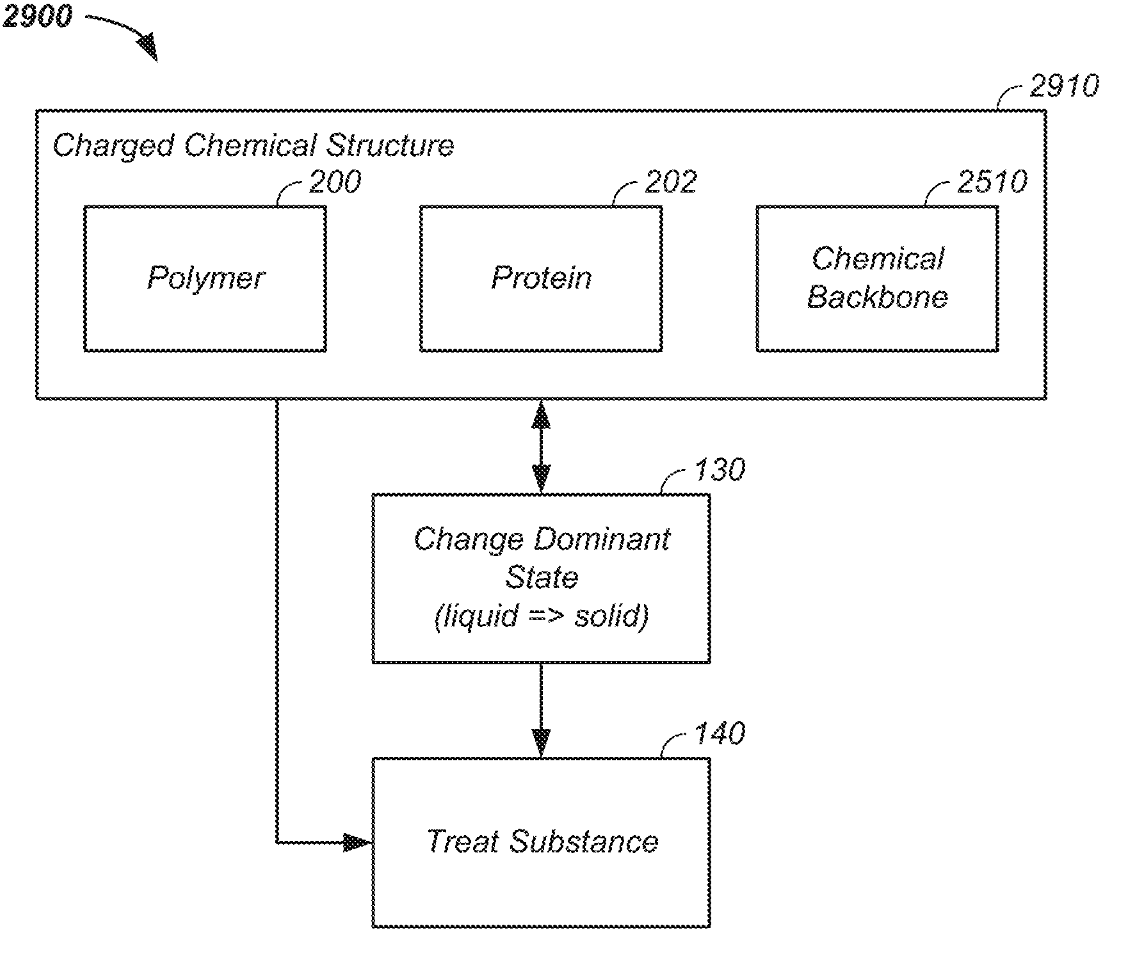
FIG. 29 illustrates charged chemical backbone structures.

Referring now to FIG. 29, a process of treating a substance with a charged chemical structure 2900 is illustrated. For clarity of presentation and without loss of generality, a polymer 200 is used herein to represent the charged chemical structure 2910. However, the charged chemical structure is optionally a protein 202 or more generically any chemical backbone 2510. Generally, the chemical backbone 2510 is a series of covalently bonded atoms, amino acids, monomers, and/or functional groups that optionally and preferably carry multiple charges, as further described in FIGS. 30-36. As with the polymer tuning process 100 illustrated in FIG. 1, the protein 202 and/or the chemical backbone 2510 are optionally and preferably tuned, such as by any process described herein for tuning the polymer 200. As with the polymer 200, the now multi-charged/polycationic protein and/or multi-charged/polycationic chemical backbone are optionally and preferably used to treat a substance 140, such as after an optional change in dominant state 130, where the treatment yields antimicrobial 231, antibacterial 232, antiviral 233, and/or antifungal 234 properties. For clarity of presentation and without loss of generality, whenever a polymer 200, such as a tuned polymer 210 and/or a polyethylenimine 250 is referred to, reference to the more generic chemical backbone 2510 is optionally and preferably inferred.

Figures 30A, 30B, 30C, 30D:
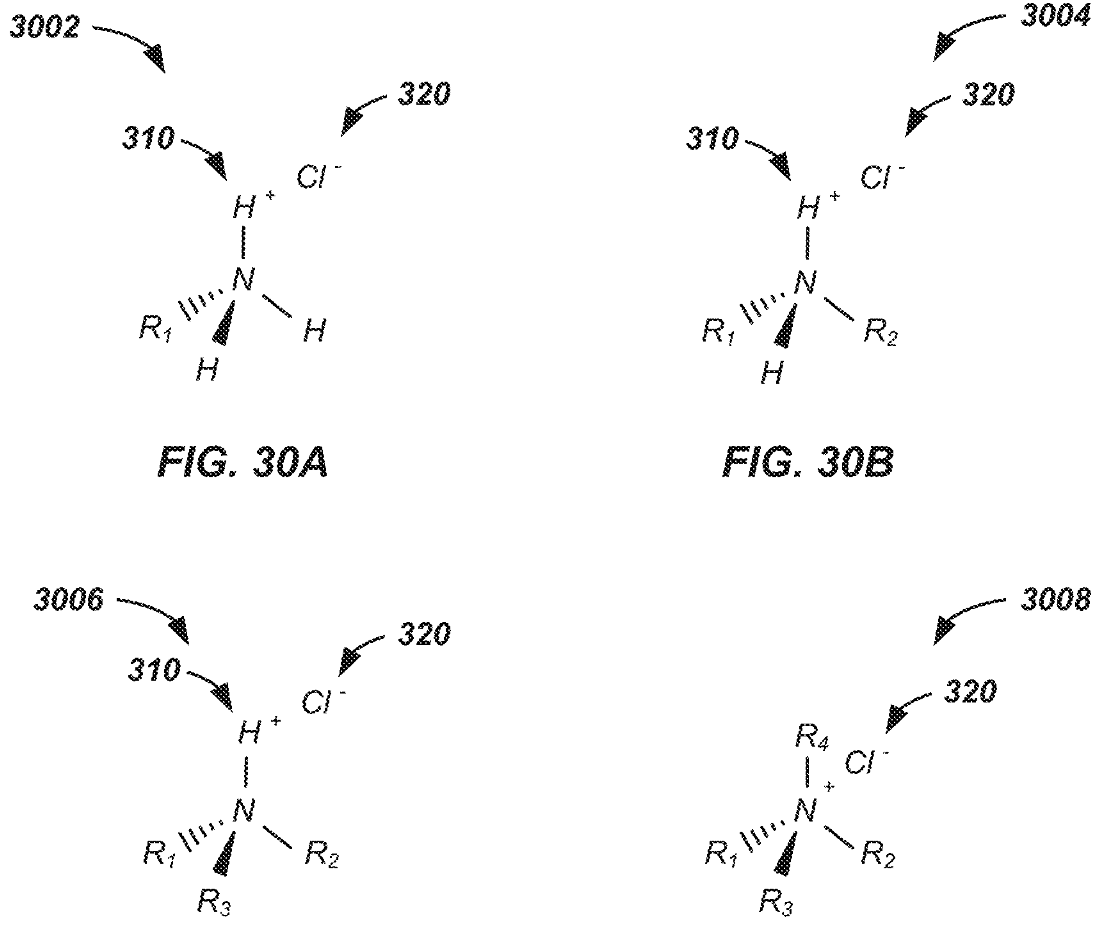
FIG. 30A illustrates a primary amine.
FIG. 30B illustrates a secondary amine.
FIG. 30C illustrates a tertiary amine.
FIG. 30D illustrates a quaternary amine.

Referring now to FIGS. 30(A-D), the charged chemical backbone 2510 optionally and preferably contains charged sites, such as a charged nitrogen. For clarity of presentation, four amine types are illustrated. Referring now to FIG. 30A, a primary amine 3002 is illustrated, where, in a positively charged state, a nitrogen is bonded to three hydrogens and one additional molecular fragment, referred to here as a first molecular fragment, $R_1$. Often, the first molecular fragment terminates in a carbon bound to the nitrogen, where the carbon is of any hybridization. In the positively charged state, the primary amine 3002 is illustrated as protonated 310 and is illustrated with a counterion 320. Referring now to FIG. 30B, a secondary amine 3004 is illustrated, where, in a positively charged state, the nitrogen is bonded to two hydrogens and two additional molecular fragments, referred to here as a first molecular fragment, $R_1$, and a second molecular fragment, $R_2$. Again, the second molecular fragment and/or is any molecular fragment and optionally terminates in a carbon bound to the nitrogen. Referring now to FIG. 30C, a tertiary amine 3006 is illustrated, where, in a positively charged state, the nitrogen is bonded to a single hydrogen and three additional molecular fragments, referred to here as a first molecular fragment, $R_1$; a second molecular fragment, $R_2$; and a third molecular fragment, $R_3$. Referring now to FIG. 30D, a quaternary amine 3008 is illustrated, where the nitrogen is bonded to four molecular fragments, designated $R_1$, $R_2$, $R_3$, and $R_4$.

Still referring to FIGS. 30(A-D), the polymers illustrated herein, such as the polyethylenimine 250, linear polyethylenimine 3300, and/or the branched polyethylenimine 3400 contain primary amines 3002, secondary amines 3004, and/or tertiary amines 3006, optionally and preferably in the absence of quaternary amines 3004, which are relatively toxic in comparison. Quaternary ammonium compounds, or quats, are a group of positively charged ions that are often used as disinfectants, surfactants, and fabric softeners. While quaternary ammonium compounds are generally considered safe for use in household and industrial settings, concentrations are environmentally limited as the quaternary ammonium compounds may be toxic at high concentrations, with long exposure times, and/or if ingested. Herein, any one or more quaternary ammonium compounds/molecules are optionally used in combination with any of the polymers 200, the polyethylenimine 250, and/or the multi-charged chemical backbones 2510 described herein.

Figure 31A:
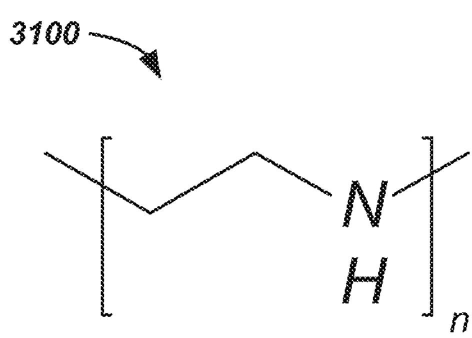
FIG. 31A and FIG. 31B illustrate deprotonated and protonated repeating units, respectively.
Figure 31C:
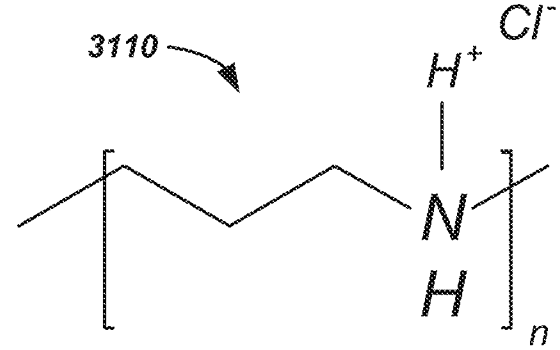
FIG. 31C illustrates a polypropylenimine.
Figure 31B:
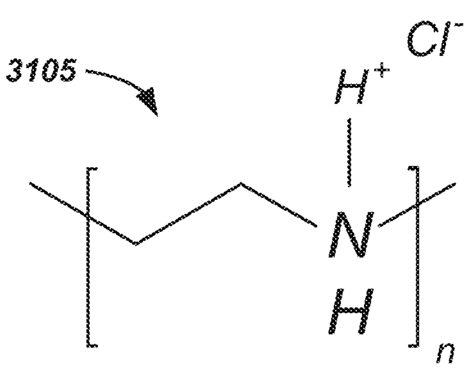
Figure 31D:
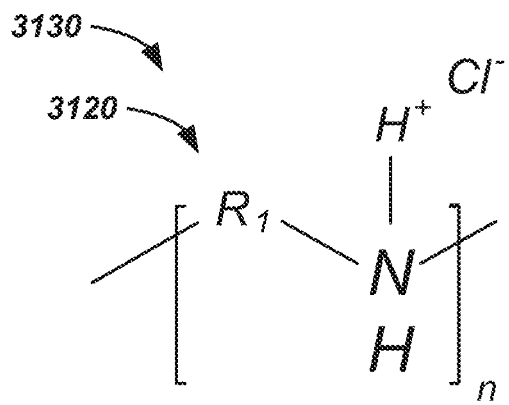
FIG. 31D illustrates a generalized amine polymer.
Figure 31E:
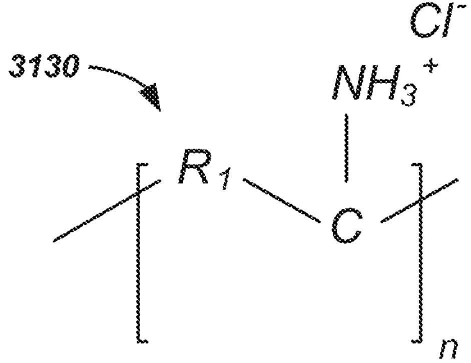
FIG. 31E illustrates a nitrogen containing repeating backbone monomer of a polymer.

Referring now to FIG. 31A and FIG. 31B, an exemplary repeating group, such as found in the polymer 200, the polyethylenimine 250, and in some cases the chemical backbone 2510 is illustrated. Referring still to FIG. 31A and referring again to FIG. 2, the illustrated repeating monomer 253 is the repeating unit of polyethylenimine 250 in a basic form 3100. Referring now to FIG. 31B, the repeating unit of polyethylenimine 250 in an acidic form 3105 is illustrated. In polyethylenimine 250, the repeating unit includes a chain of covalently bonded atoms in a repeating sequence of carbon-carbon-nitrogen. Again, in FIG. 31B, the acidic form of the nitrogen is protonated and has a counterion and is referred to as a protonated amine and more specifically a protonated secondary amine. However, the repeating monomer is optionally of any structure. Instead of the repeating carbon-carbon-nitrogen group of the polyethylenimine illustrated in FIG. 31B, a repeating carbon-carbon-carbon-nitrogen group of polypropylenimine 3110 is illustrated in FIG. 31C. Even more generally, the repeating group is optionally of any structure bonded to the nitrogen referred to here as $R_1$-nitrogen, or simply a repeating unit of a nitrogen containing backbone 3120. For instance, the polyethylenimine polymer has a repeating carbon-carbon-nitrogen backbone, the polypropylenimine polymer has a repeating carbon-carbon-carbon-nitrogen backbone, and more generally the polymer 200 has a repeating nitrogen containing backbone, such as $R_1$-nitrogen, or $R_1$-nitrogen-$R_2$, where $R_1$ and $R_2$ are each independently any organic molecular fragment, such as of any length of carbons, and/or of any length of carbons covalently bonded to and/or interspersed with any other atoms, such as carbon-oxygen-carbon-carbon-carbon-, which is bonded to the nitrogen. Optionally, the nitrogen is not in the backbone structure, but is rather attached to the backbone structure of the repeating group, such as an —$NH_2$ or —$NH_3$ group attached to a carbon in the backbone structure. Optionally, the nitrogen is indirectly covalently bonded to the backbone structure. Herein, where the nitrogen, which is optionally protonated, is attached in any manner to the backbone structure of the repeating unit, the combined nitrogen containing fragment and the backbone fragment of the polymer is referred to as a nitrogen containing repeating backbone monomer 3130/fragment of the polymer.

Figure 32:
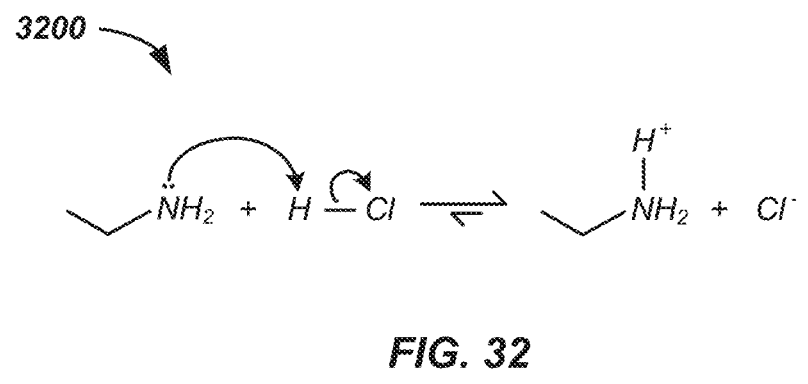

Referring now to FIG. 32, acidification of a base 3200 is illustrated. More specifically, an example is provided showing the relationship between the basic repeating unit of polyethylenimine 250 and a protonated repeating unit of the polyethylenimine 250. Generally, the base, which is a proton acceptor and/or an electron donor, interacts with an acid, such as hydrochloric acid, which is a proton donor and/or an electron acceptor to form a conjugate acid of the base and a counterion.

Figures 33A, 33B, 33C, 33D:
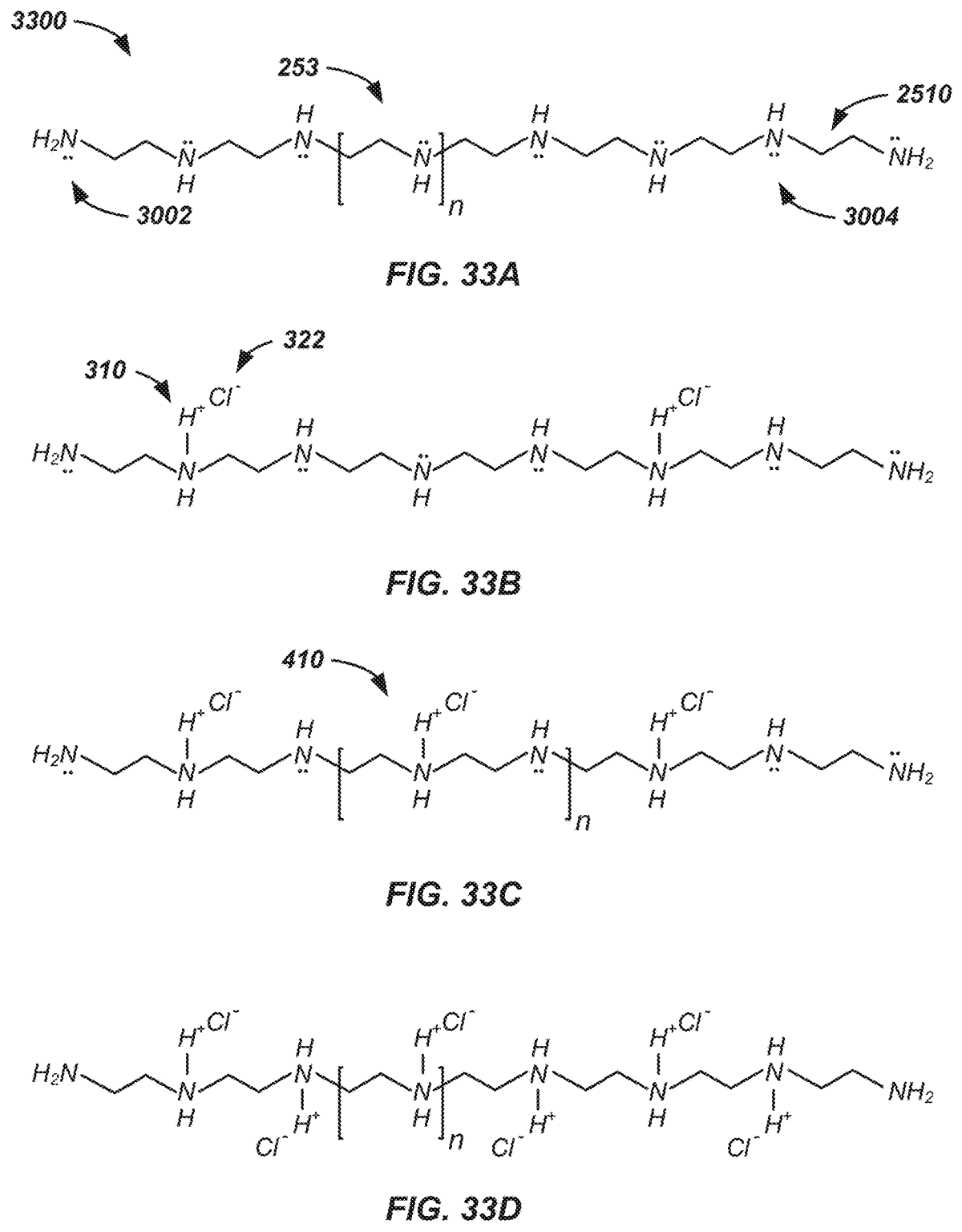

Referring now to FIGS. 33(A-D), linear polyethylenimine 3300, referred to as linear PEI, is sequentially illustrated in a base form, a slightly acidified form, a more acidified form, and an acidified form, respectively. Referring again to FIG. 33A, polyethylenimine 250 is illustrated with primary amines 3002 at the polymer termini and a multitude of secondary amines 3004, such in the repeating monomer 253. Again, the linear polyethylenimine 3300 contains a chemical backbone 2510 of repeating units of carbon-carbon-nitrogen. Referring again to FIG. 33B, the partially acidified polyethylenimine 250 is illustrated as partially protonated 310 with a counterion 320, in the illustrated case a chloride ion 322/chloride counterion. Referring again to FIG. 33C, optionally in small sections of the polyethylenimine 250, a dimer is present of one charged nitrogen monomer unit and one uncharged nitrogen monomer unit 413. Notably, the frequency of the charged nitrogen monomer is every monomer unit, every second, third, fourth monomer unit, and/or at random intervals along the length of the polyethylenimine 250. The polymer is optionally referred to a percent protonated, such as greater than 1, 2, 5, 10, 30, or 50 percent protonated and/or as less than 99, 98, 95, 90, 70, or 50 percent protonated. Referring again to FIG. 33D, a fully protonated version of the polyethylenimine 250 is illustrated. Generally, referring again to FIGS. 33(A-D), as the pH is decreased, the percentage of protonated sites on the polyethylenimine 250 increases and vice-versa.

Figure 34:
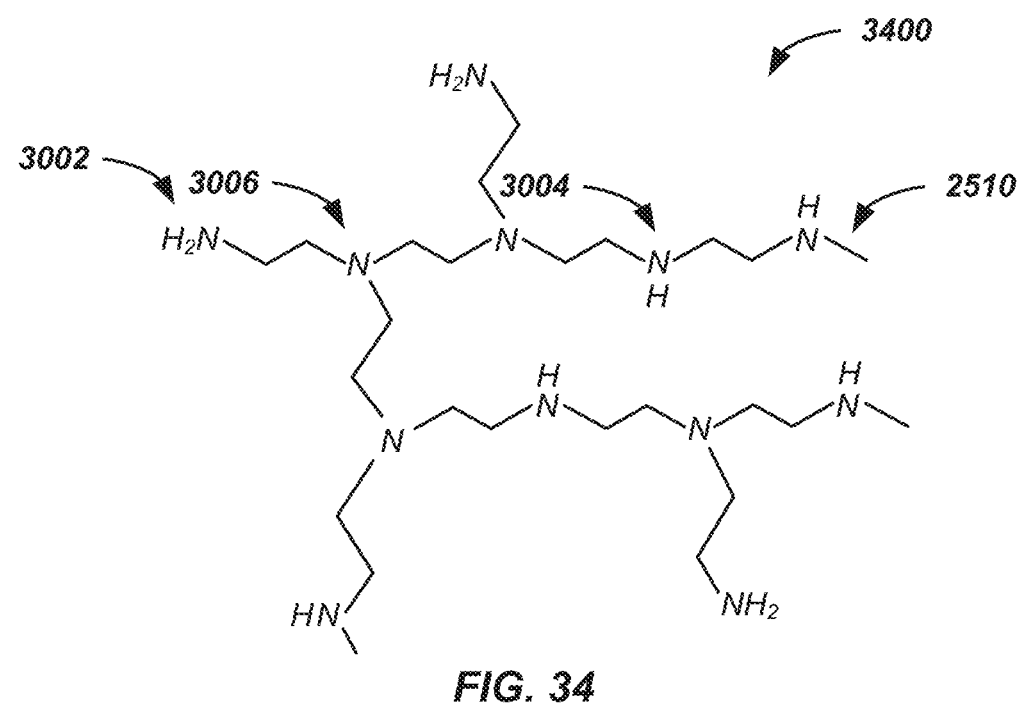

Referring now to FIG. 34, branched polyethylenimine 3400 is illustrated, which is an example of another chemical backbone 2510. The branched polyethylenimine 3400 contains the primary amines 3002 and the secondary amines 3004 of linear polyethylenimine 3300 and contains tertiary amines 3006. As illustrated, at least some of the nitrogens in the tertiary amines are covalently bonded to three carbon-carbon-nitrogen fragments. Again, the linear polyethylenimine 3300 and branched polyethylenimine 3400 contain no quaternary amines 3008, but quaternary amines 3008 are optionally added to a formulation of the polyethylenimines 250 or any polymer 200 to enhance antimicrobial 231, antibacterial 232, antiviral 233, and/or antifungal 234 properties.

Figure 35:
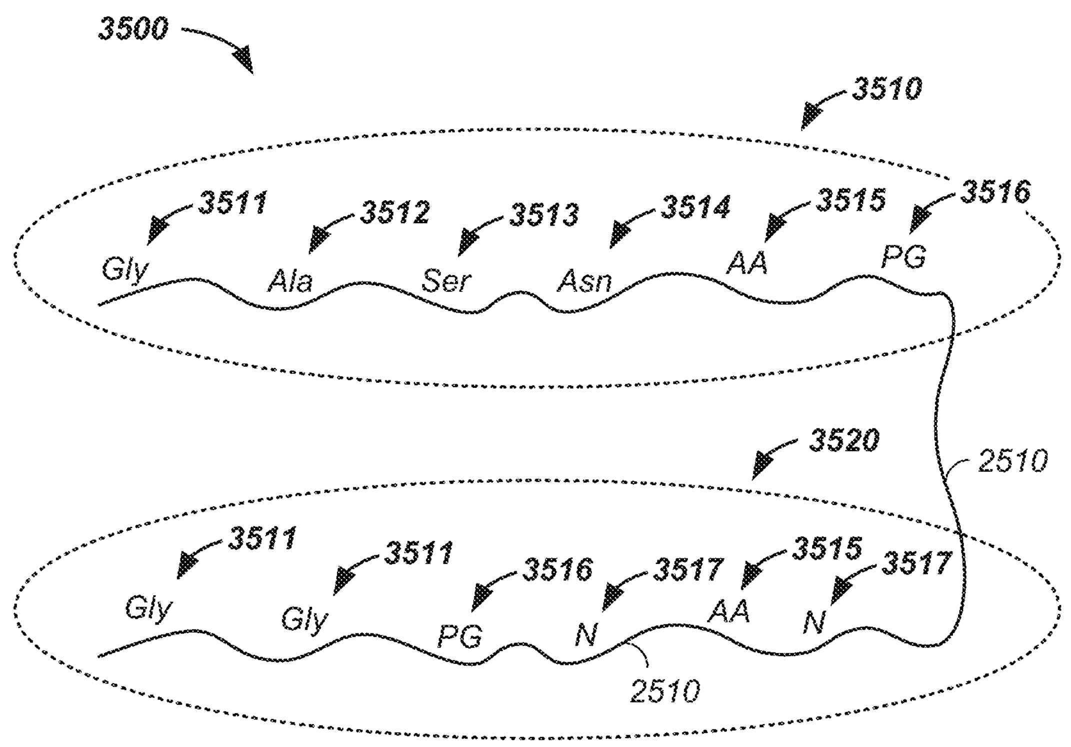
FIG. 35 illustrates a backbone using amino acids.
Figure 36:
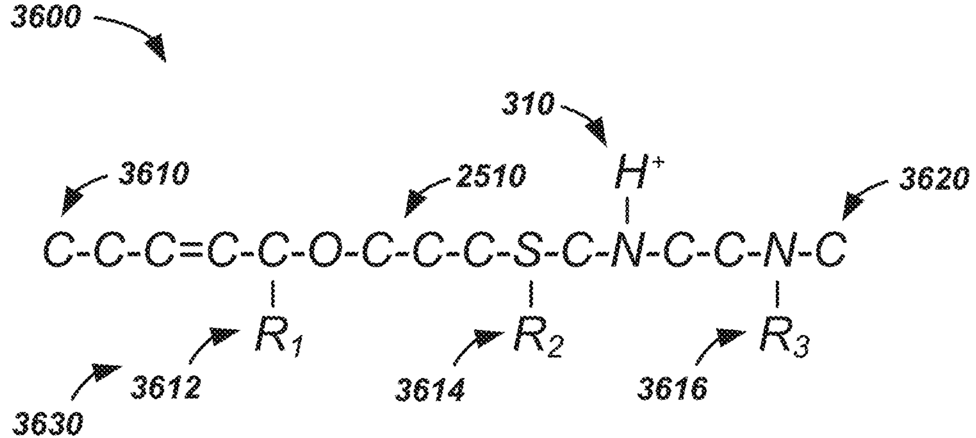
FIG. 36 illustrates a generic backbone structure.

Referring now to FIG. 35 and FIG. 36, for clarity of presentation and without loss of generality, two exemplary chemical backbones 2510 are illustrated.

Example I

Referring now to FIG. 35, a first example of a chemical backbone 3500 is illustrated with amino acids/protein sections in place of the polymer 200. As illustrated, the chemical backbone 2510 has a first optional section 3510 of a set of amino acids, which form the chemical backbone 2510 and/or are covalently bonded, directly or indirectly, to the chemical backbone. As illustrated, the amino acids include one or more of: glycine 3511, alanine 3512, serine 3513, and/or asparagine 3514, which are each protonatable, which yields a chemical backbone 2510 with multiple cationic charges, in a manner related to the multiple cationic charged of the polymer 200/tuned polymer 210. More generally, the first optional section 3510 of the chemical backbone 3500 contains and/or is bonded directly/indirectly to one or more amino acids 3515 and/or protonatable groups 3516. As illustrated, the chemical backbone 2510 has a second optional section 3520 that intermixes one or more nitrogen groups 3517, such as a secondary amine 3004 and/or a tertiary amine 3006, into the chemical backbone 2510 and/or as molecule fragments bonded directly and/or indirectly to the chemical backbone 2510. More generally, the chemical backbone 2510 includes and/or is bonded directly/indirectly with a series of one or more amino acids, protein fragments, RNA fragments, DNA fragments, and/or peptides. Generally, the chemical backbone 2510 contains/carries a plurality of protonatable sites, such as one or more secondary amines 3004; one or more tertiary amines 3006; one or more protonatable amino acids; and/or one or more protonatable sites. Generally, the chemical backbone is of any length of greater than 10, 20, 50, or 100 covalent bonds in series.

Example II

Referring now to FIG. 36, a second example of a chemical backbone 3600 is illustrated with a series of covalent bonds in the chemical backbone 2510 from a first terminus 3610 to a second terminus 3620 of an optional number of n termini in a branched molecule, where n is a positive integer of at least two. Generally, the chemical backbone 2510 contains, directly/indirectly, any number of protonatable groups 310. Generally, the chemical backbone 2510 contains any combination of carbon, oxygen, sulfur, and nitrogen atoms covalently bonded in a series of greater than 5, 10, 15, 20, 50, 100, 500, or 1000 covalent bonds, where any of the covalent bonds are optionally double bonds. The illustrated series of covalently bonded atoms is illustrative in nature only and is non-limiting. The chemical backbone 2510 and/or any side chain/group bonded directly/indirectly to the chemical backbone 2510 contains greater than 3, 4, 5, 10, 20, 50, 100, 200, 500, 1000, 5000, 10,000, or 50,000 protonatable sites, which are tunable in any manner set forth herein for polymer tuning 210. As illustrated, the chemical backbone 2510 optionally contains a set of one or more side chains 3610, such as a first side chain 3612, a second side chain 3614, and a third side chain 3616, where any of the side chains optionally contain, are bonded to, and/or are indirectly bonded to any number of protonatable groups, which are optionally tuned by any manner set forth herein for tuning the polymer 210. Generally, a set of anions are optionally used in place and/or in combination with the set of cations/protonatable groups set forth herein.

Polymer Tuning

Figure 37:
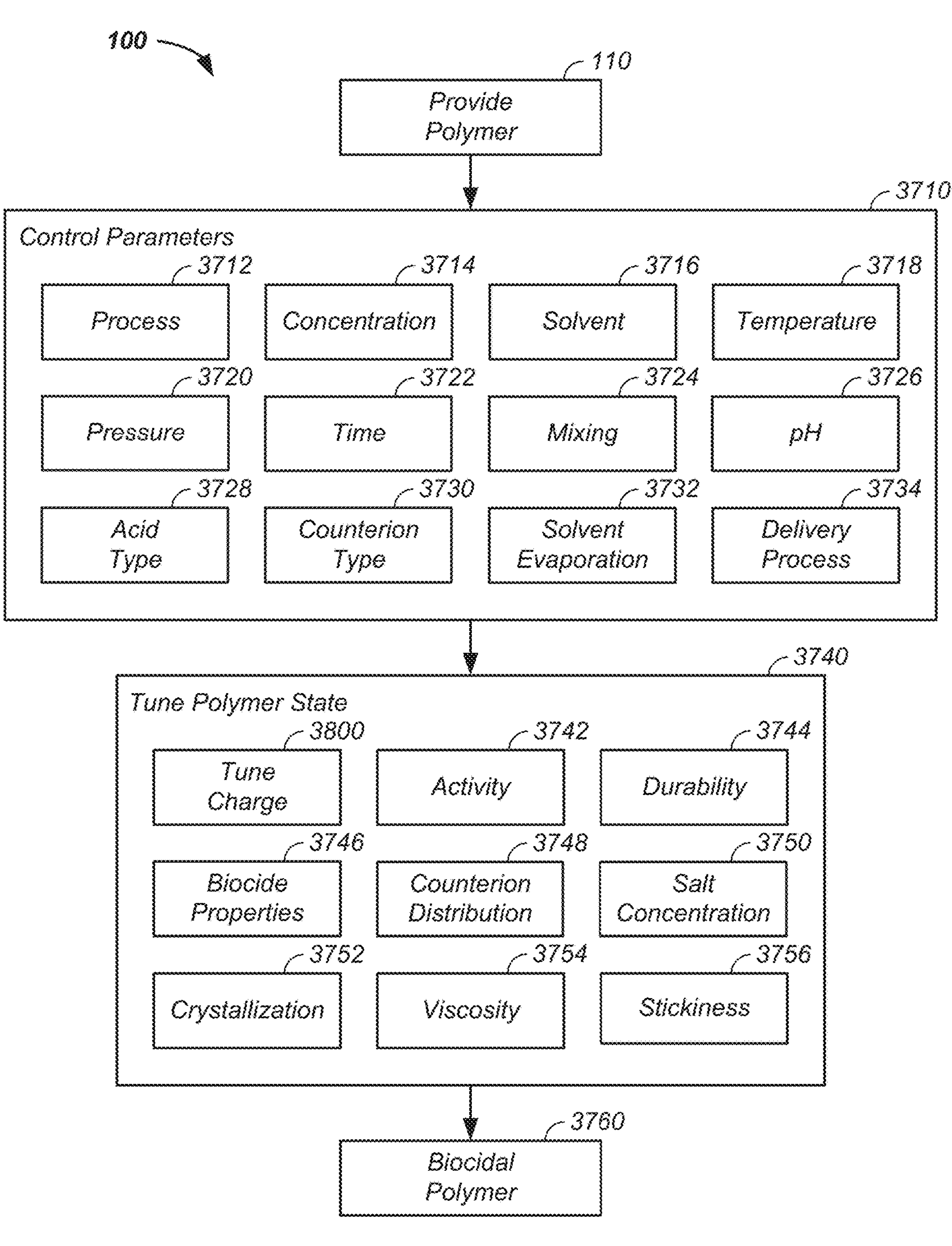
FIG. 37 illustrates tuning a polymer state with controlled parameters.

Referring now to FIG. 37, polymer tuning 100 is further described. As described in FIG. 1, a polymer is provided 110, such as any of the polymer types described, supra. Herein, control parameters 3710 that yield a tuned polymer state 3740, of the polymer tuning 100 process, are described.

Still referring to FIG. 37, control parameters 3710 in polymer tuning includes a process 3712, such as the first general process 600, the second general process yielding a tuned counterion solution 700/formulation, the first alkalization polymer tuning process 1100, the second alkalization polymer tuning process 1200, the third alkalization polymer tuning process 1300, the acidification polymer tuning process 1400, the conjugate base polymer tuning process 1500, and/or any process that yields a tuned polymer state. Generally, the process 3712 optionally includes controlling: concentration 3714 of the polymer, the solvent 3716, temperature 3718, pressure 3720, time of any step 3722, mixing 3724, pH 3726, an acid type 3728, a counterion type 3730, solvent evaporation 3732, a delivery process 3734, and/or any chemical, mechanical, electrical, and/or physical parameter to yield the tuned polymer state 3740.

Still referring to FIG. 37, the tuned polymer state 3740 includes any one or more of: a tuned charge 3800; an activity 3742, such as an activity coefficient, $\gamma$, of a surrounding solvent and/or solution; durability 3744, such as the persistence of an antimicrobial and/or antiviral property through time and/or through a repetitive wet/dry rub process; biocidal properties 3746; a counterion distribution 3738, such as number/concentrations of counterion types/classes; a salt concentration 3750, in solid and/or liquid form; crystallization properties 3752; viscosity 3754, and/or stickiness 3756. Details on the tuned polymer state 3740 are further described, infra. Generally, the provided polymer 110 is tuned 3740, such as through use of the control parameters 3710, to yield a biocidal polymer 3760.

Charge/Charge Effectiveness

Figure 38:
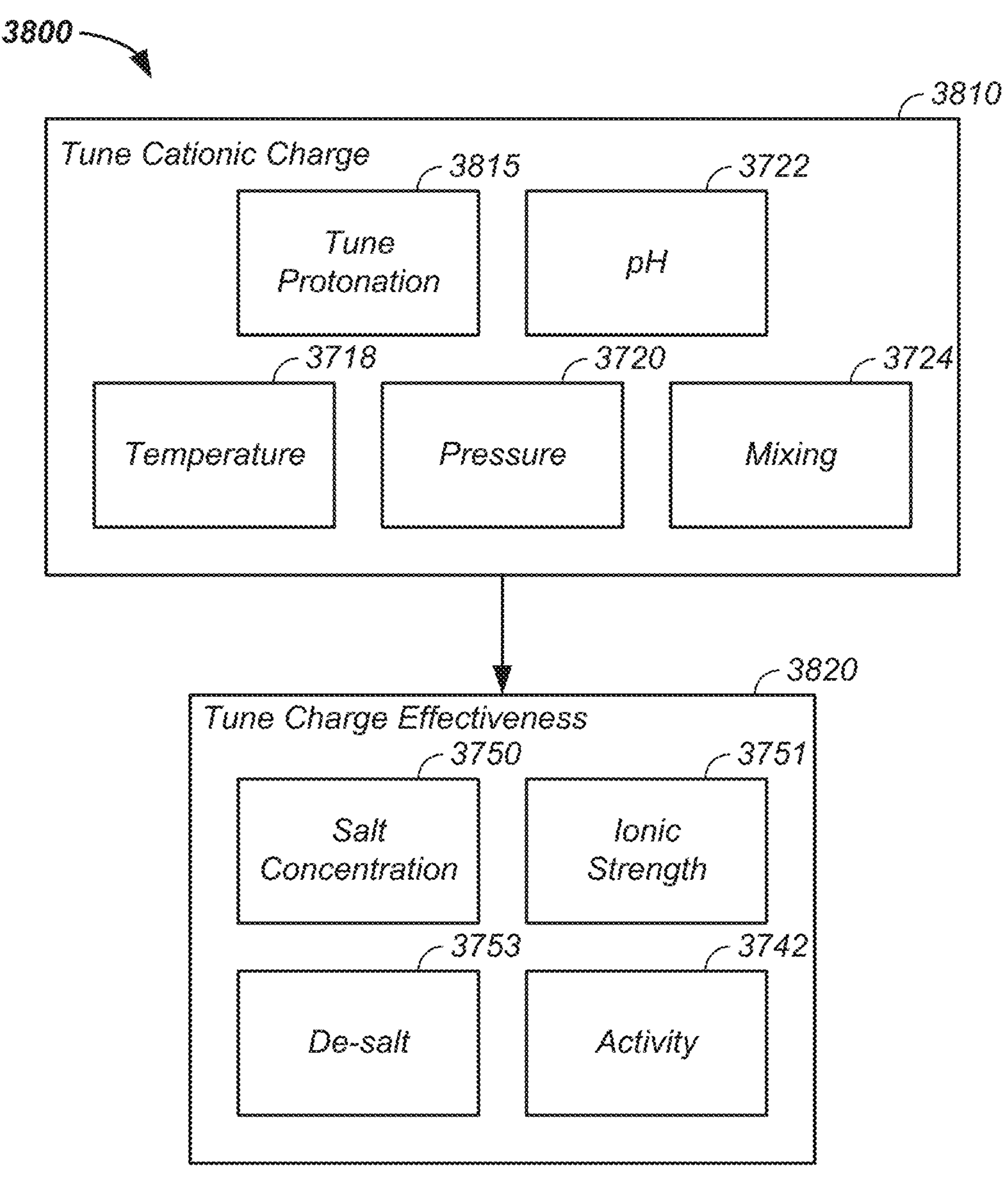
FIG. 38 illustrates tuning cationic charge/charge effectiveness.

Referring still to FIG. 37 and referring now to FIG. 38, polymer tuning 100 is illustrated with tuning charge 3800 of the polymer 200. For clarity of presentation and without loss of generality, a process of tuning cationic charge 3810 is described, where again, the tuning is optionally tuning an anionic charge and/or a zwitterion charge. In tuning cationic charge 3810, several of the control parameters 3710, described supra, are implemented. For example, pH 3722, temperature 3718, pressure 3720, and/or mixing 3724 are controlled to tune protonation 3815 of the polymer. The tuned protonation 3815 and/or the tuned cationic charge 3810 is simultaneously and/or subsequently tuned for charge effectiveness 3820. Charge effectiveness 3820 is dependent on one or more of salt concentration 3750, ionic strength 3751, de-salting 3753, and activity 3742. Tuning cation charge 3810 is further described, infra, in reference to FIGS. 39-41 and tuning charge effectiveness is further described, infra, in reference to FIGS. 42-46.

Charge

It is observed that at a fixed pH, total charge varies on the polymer 200 dependent upon the control parameters 3810 implemented. For instance, when a polymer 200, such as polyethylenimine 250, is treated with concentrated hydrochloric acid for 96 hours instead of 8 hours, a measured percent chlorination on the resulting polymer increases from 38 to 43 percent by weight, which is a protonation increase from 65 to 100 percent or a 54 percent increase in protonation. Without wishing to be bound to any particular theory, two explanation are provided herein.

Figure 39:
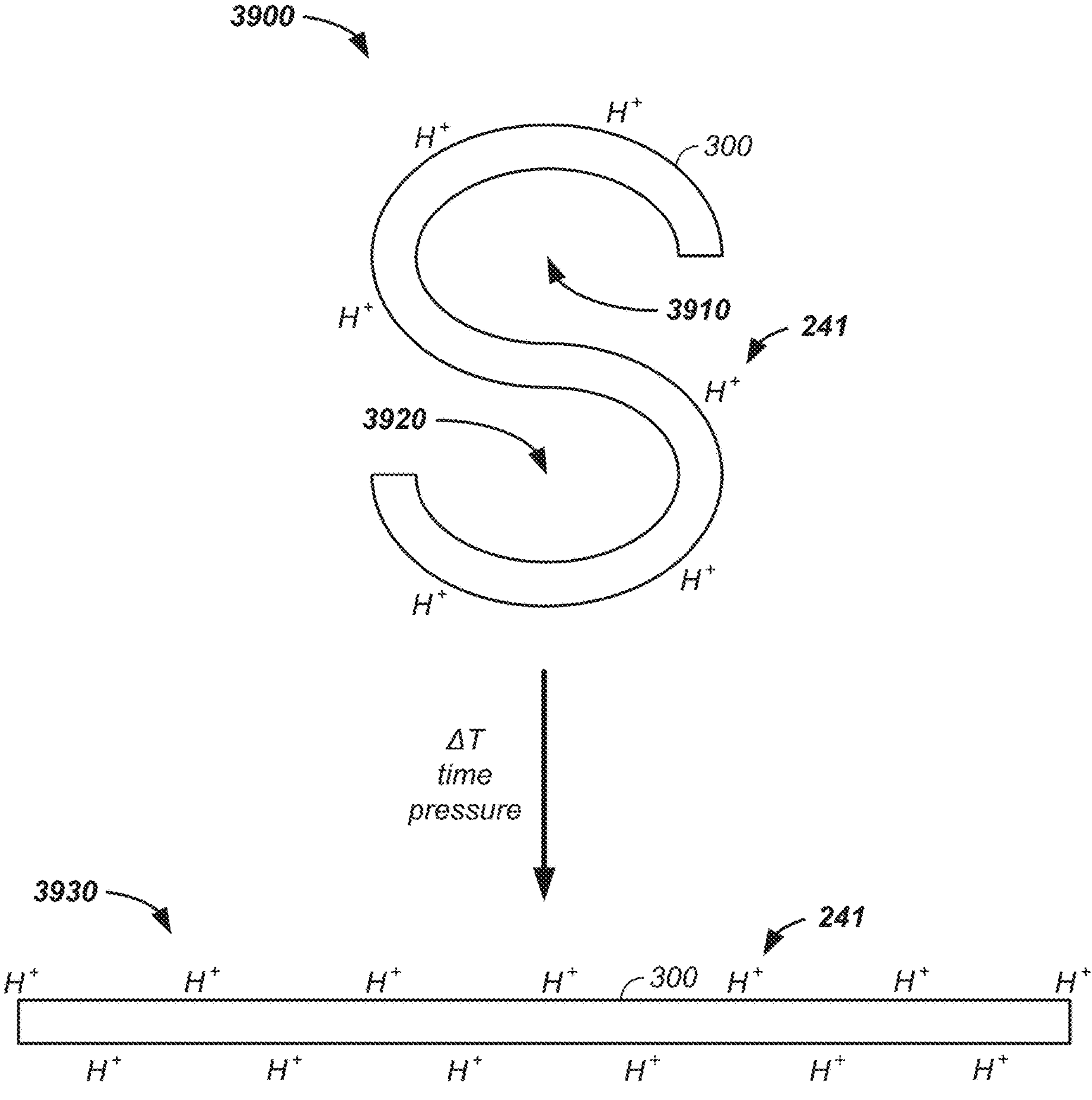
FIG. 39 illustrates protonating a polymer.

A first explanation of increased protonation with reaction time at a temperature of 130 degrees is provided. Referring now to FIG. 39, multiple charges of a polymer at a single pH 3900 are illustrated. In FIG. 39, a cationic polymer 300 is illustrated at a first time with protonated sites 241 and a first region 3910 and a second region 3920 that are not readily accessed for protonation. It is observed, that for a fixed pH of solution, the degree of protonation 241 increases to differing total protonation levels as a function of time/temperature, as described supra. One explanation is that at an elevated temperature, such as at greater than 30, 50, 75, 100, or 125 degrees Celsius, the cationic polymer 300 at least partially unfolds into a more elongated form 3930, which allows the acidic solution to more completely react with the polymer 200 at difficult to access sites, such as a first hindered site 3910 and/or a second hindered site 3920 that are sterically sheltered by the cationic polymer 300 from surrounding solution, to form more cationic sites 241. Notably, once protonated, the additional protonated sites 241 are stable when the temperature of the solution is subsequently reduced. In any event, increasing a reaction time at an elevated temperature in a protonation step of the polymer 200, such as polyethylenimine 250, results in an increase of protonation of the polyethylenimine 250 by 54 percent, such as when protonated with hydrochloric acid at a pH of 1.2, which may be due to increase accessibility of secondary amines on the polyethylenimine 250 with a change in structure/unfolding/unwrapping 3930 of the polyethylenimine 250 at the elevated increased temperature for the longer elapsed time period.

Figure 40A:
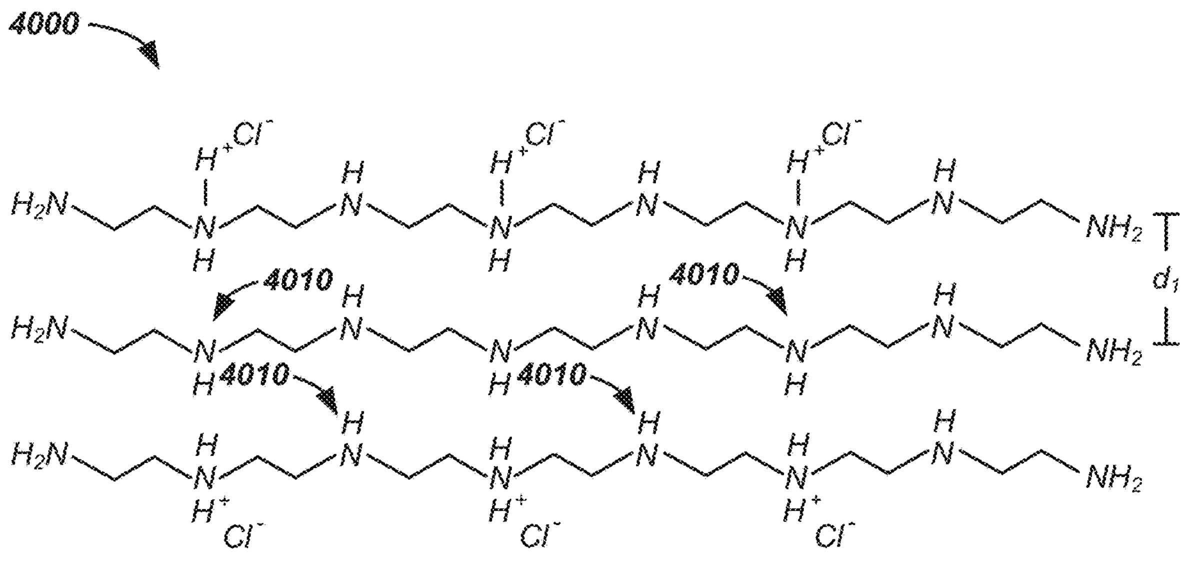
FIG. 40A and FIG. 40B illustrate two polymer protonation states, respectively.
Figure 40B:
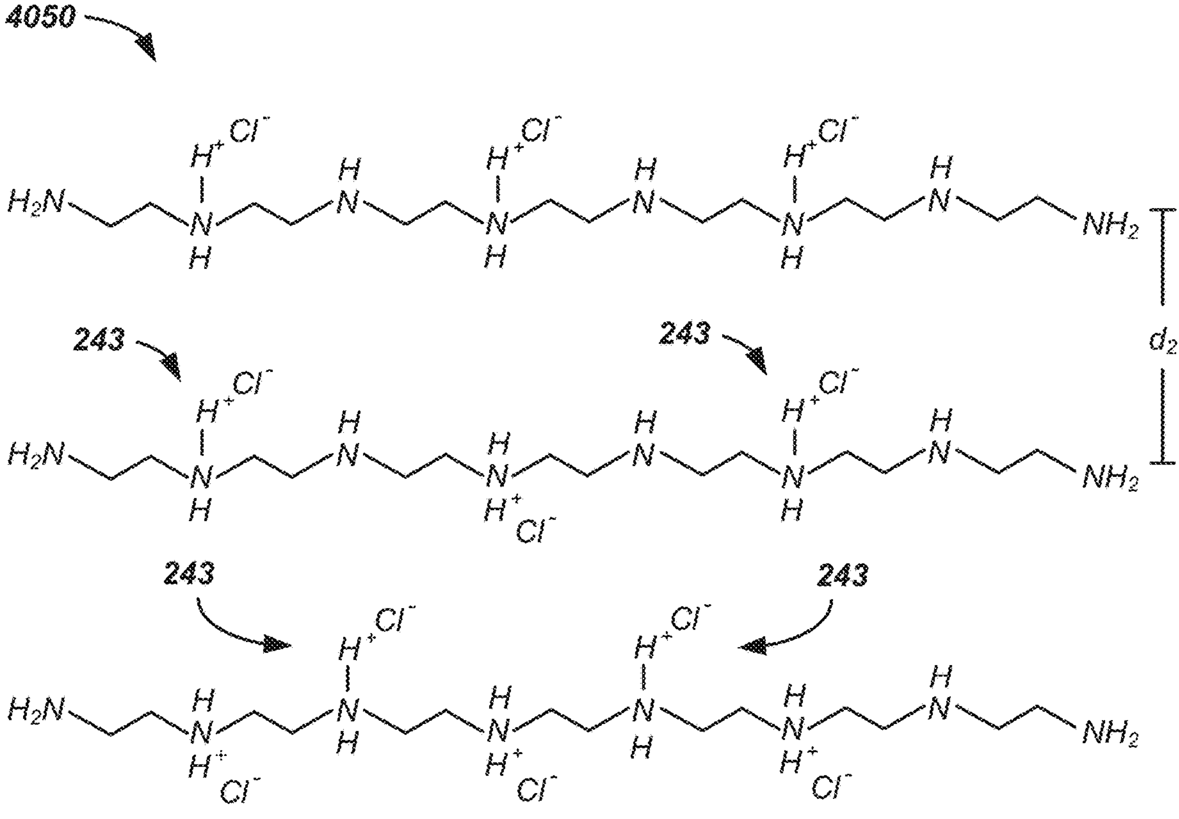

A second explanation of increased protonation with reaction time at a temperature of 130 degrees is provided. Referring now to FIG. 40A, three chains of polyethylenimine 250 are illustrated with a first distance, $d_1$, between chains. The first distance between chains results in a physical obstacle for access to sterically blocked sites 2010 of some of the internal secondary amines, which limits protonation of the sterically blocked sites 2010 by the protonating acid. Referring now to FIG. 40B, the three chains of polyethylenimine 250 are illustrated with an increased temperature, which results in a second distance, $d_2$, between chains, where the second distance is greater than the first distance, such as greater than 1, 2, 5, 10, 25, 50, 100, or 200 percent greater. The increased distance between chains results in increased protonation sites 243 with treatment by the concentrated acid. Again, it is observed that increasing protonation of the polymer 200, such as polyethylenimine 250, results with a longer reaction time at an elevated temperature of 130 degree Celsius, such as when protonated with hydrochloric acid at a pH of 1.2, which may be due to increase accessibility of secondary amines on the polyethylenimine 250 with a change in structure/unfolding/unwrapping of the polyethylenimine 250 at an increased temperature.

Figure 41:
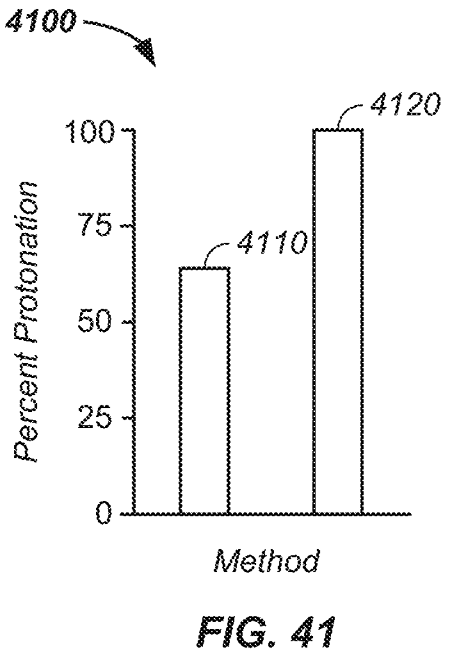
FIG. 41 illustrates first and second levels of protonation at a fixed pH.

Referring now to FIG. 41, the increased protonation 4100 of polyethylenimine 250 from 65 to 100 percent with an increased time, in hydrochloric acid at a pH of 1.2, from 8 hours 4110 to 96 hours 4120 is illustrated. Similarly, changes in stirring, temperature, and/mixing, such as via sonication, alter protonation times.

De-Salting/Activity

Referring now to FIGS. 42-46, the effectiveness of the charged sites on the polymer 200 is further described. When protonating polyethylenimine, a very acidic solution of hydrochloric acid is reacted with the polyethylenimine at an elevated temperature for a period of hours. The net result is not only an acidic solution, but also a solution of very high salt concentration with a very low activity coefficient. Reduction of the salt concentration and/or alternatively forming the polyethylenimine without increasing the salt concentration enhances the effectiveness of interaction of the charged sites of the polyethylenimine interacting with bacteria and/or viruses, as further described herein.

Figure 42:
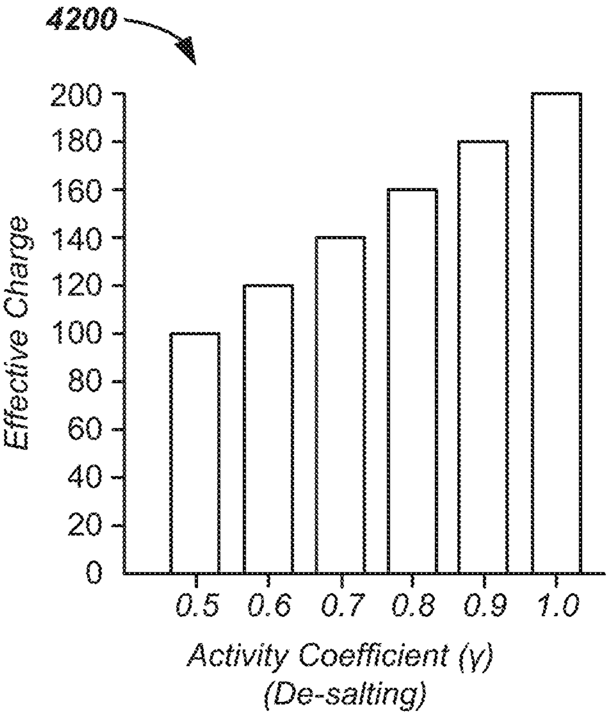
FIG. 42 illustrates effective charge of the polymer as a function of activity.

Referring now to FIG. 42, an effective charge of the polyethylenimine 250 is illustrated with salt removal. As illustrated, an initial effective charge of 100 units is illustrated with an activity coefficient, $\gamma$, of 0.5. As the polyethylenimine solution is desalted, such as by any of the methods described supra, the effective charge of the protonated sites on the polyethylenimine 250 increases. For example, the effective charge increases by 20, 40, 60, 80, and 100 percent as the activity coefficient of the polyethylenimine solution increases to 0.6, 0.7, 0.8, 0.9, and 1.0, respectively, through removal of ions in the solution. Without wishing to be bound to any particular theory, a theory is that as the effective localized charges, protonated sites 310, of the cationic polymer 300 are drawn to negative charges on a virus, where interaction, physically and/or electrically, between the cationic polymer 300 and the virus hinders viral activity, as further described infra.

Virus/Virus Charge

Figure 43A:
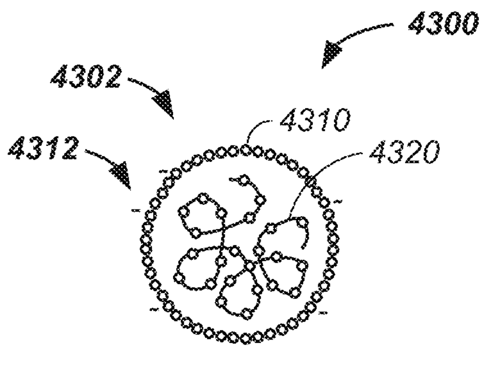
FIG. 43A illustrates a non-enveloped virus and FIG. 43B illustrates an enveloped virus.
Figure 43B:
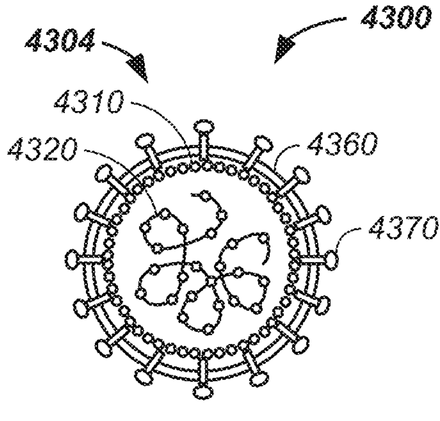

Referring now to FIG. 43A and FIG. 43B, viruses 4300 are illustrated. Particularly, a non-enveloped virus 4302 is illustrated in FIG. 43A and an enveloped virus 4304 is illustrated in FIG. 43B. Examples of non-enveloped viruses 4302 include: hepatitis A, hepatitis E, norovirus, rhinovirus, and astrovirus. Examples of enveloped viruses 4304 include: SARS, MERS, alphaviruses, hepatitis C, and zika virus. The tuned polyethylenimine/tuned polymer 210 is demonstrated as being effective against both non-enveloped viruses 4302 and enveloped viruses 4304, as described in reference to FIGS. 2(A-C), supra.

Still referring to FIG. 43A, generally, a virus 4300 includes an inner region of a nucleic acid 4320, such as an RNA strand, that is circumferentially (spherically) encapsulated within a capsid shell 4310 or a set of capsids/nucleocapsid proteins. The capsid shell 4310 contains positive charges facing the negatively charged areas of the nucleic acid 4320. For instance, arginine and/or lysine, in the capsid shell 4310, each have a positively charged $NH_2$ end that faces inward. However, at pH 7±3, the arginine and/or the lysine also contains a negatively charged COO end, which can face outward. Generally, the virus 4300 has an outer surface that is zwitterionic and/or in many cases has a plurality of local negatively charged locations 4312, which may interact with the positively charged protonated sites 310 of the cationic polymer 300. Possible interactions of the negative charges of the outer surface of the virus 300 interact with the cationic polymer 300 are further described, infra. Referring now to FIG. 43B, features of the non-enveloped virus 4302 are present in the enveloped virus 4304, while the enveloped virus further includes an encapsulating lipid bilayer 4360, such as derived from a host, where the lipid bilayer typically has additional features, such as glycoproteins 4370. Without wishing to be bound to any particular theory, three examples of interactions of charged polymers with viruses are provided, infra.

Example I

Figure 44A:
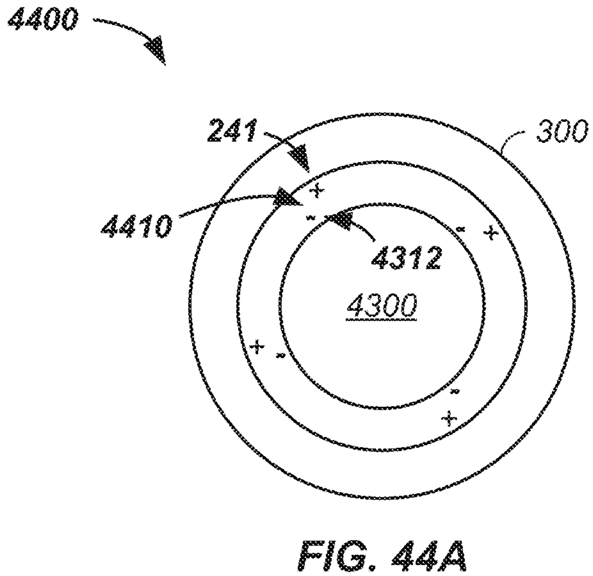
FIG. 44A and FIG. 44B illustrate a wrapped and partially wrapped virus.

Referring now to FIG. 44A, a first example of interaction between a tuned cationic polymer 300 and/or any charged polymer with a virus 4300 is illustrated. As illustrated, the positively charged protonated sites 241 of the polymer 200 are electrically attracted 4410 to the negatively charged locations 4312 of the virus 4300. The electrical attraction 4410 optionally occurs many times as both the polymer 200 and the virus 4300 have multiple charged sites, which in this first example causes the tuned cationic polymer 300 to circumferentially encompass the virus 300, thus blocking interaction of the virus with a host, which effectively inactivates the virus 300.

Example II

Figure 44B:
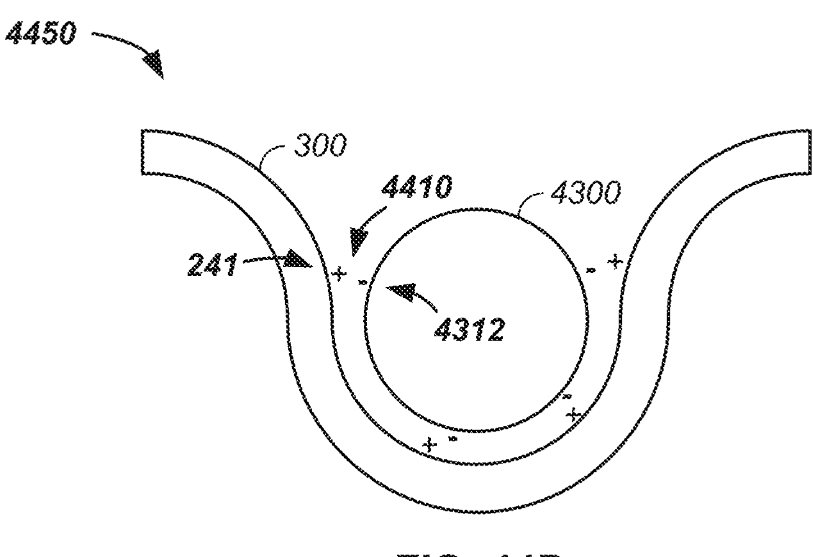

Referring now to FIG. 44B, a second example of interaction between a tuned cationic polymer 300 and/or any charged polymer with a virus 4300 is illustrated. As illustrated, the positively charged protonated sites 241 of the polymer 200 are electrically attracted 4410 to the negatively charged locations 4312 of the virus 4300. The electrical attraction 4410 optionally occurs many times as both the polymer 200 and the virus 4300 have multiple charged sites, which in this second example causes the tuned cationic polymer 300 to be electrically attracted to multiple sites of the virus, such as around greater than 10, 20, 30, 40, 50, 60, or 70 percent of a circumference of the virus 4300.

Example III

Figure 45:
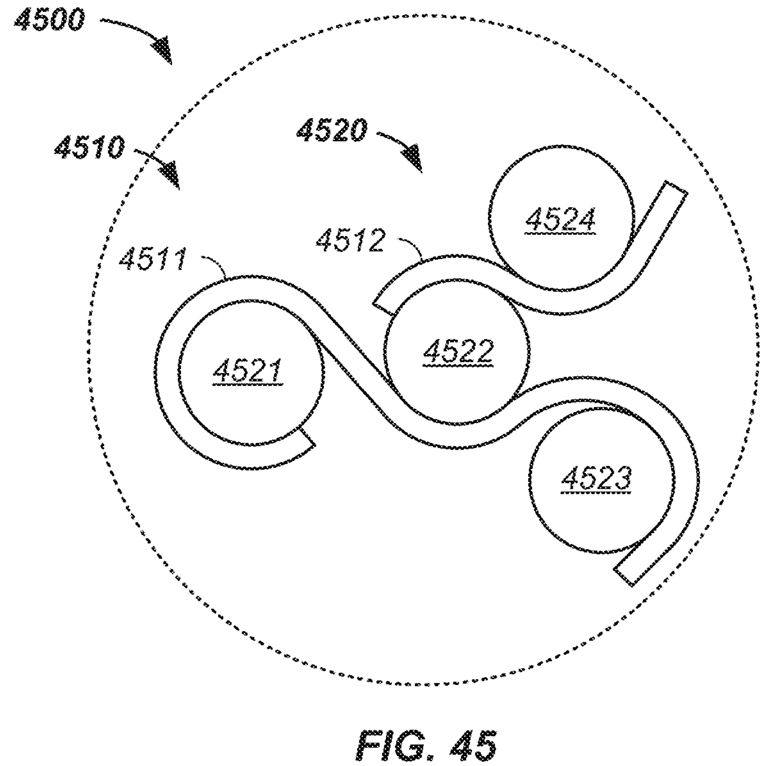
FIG. 45 illustrates polymer conglomerations of viruses.

Referring now to FIG. 45, a third example of interaction between a tuned cationic polymer 300 and/or any charged polymer with multiple viruses 4300 is illustrated. As illustrated, the positively charged protonated sites 241 of the polymer 200 are electrically attracted 4410, as described above, to the negatively charged locations 4312 of more than one virus 4300. The electrical attraction 4410 optionally occurs many times on a single virus 4300. However, as the tuned cationic polymer 300 is long, such as tens, hundreds, or thousands of monomers long, a first cationic polymer 4511 is optionally electrically attracted simultaneously to a set of viruses 4520, such as to a first virus 4521, a second virus 4522, and a third virus 4523.

Similarly, a second cationic polymer 4512, of a set of cationic polymers 4510, is optionally attracted to a common virus attracted to the first cationic polymer 4511, such as the second virus 4522, while simultaneously being attracted to a fourth virus 4524, where the fourth virus 4524 is not interacting with the first cationic polymer 4511. Similarly, any number of cationic polymers optionally interact with any number of viruses to form a virus-polymer conglomerate 4500, such as where the number of cationic polymers in the virus-polymer conglomerate 4500 is greater than 1, 2, 5, 10, 50, 100, 500, 1000, 10,000, or 100,000. The virus-polymer conglomerate 4510 is also optionally referred to herein as a virus globule and/or a virus-polymer globule, which may be large enough to settle out of solution and/or form a solid.

Activity

Figures 46A, 46B:
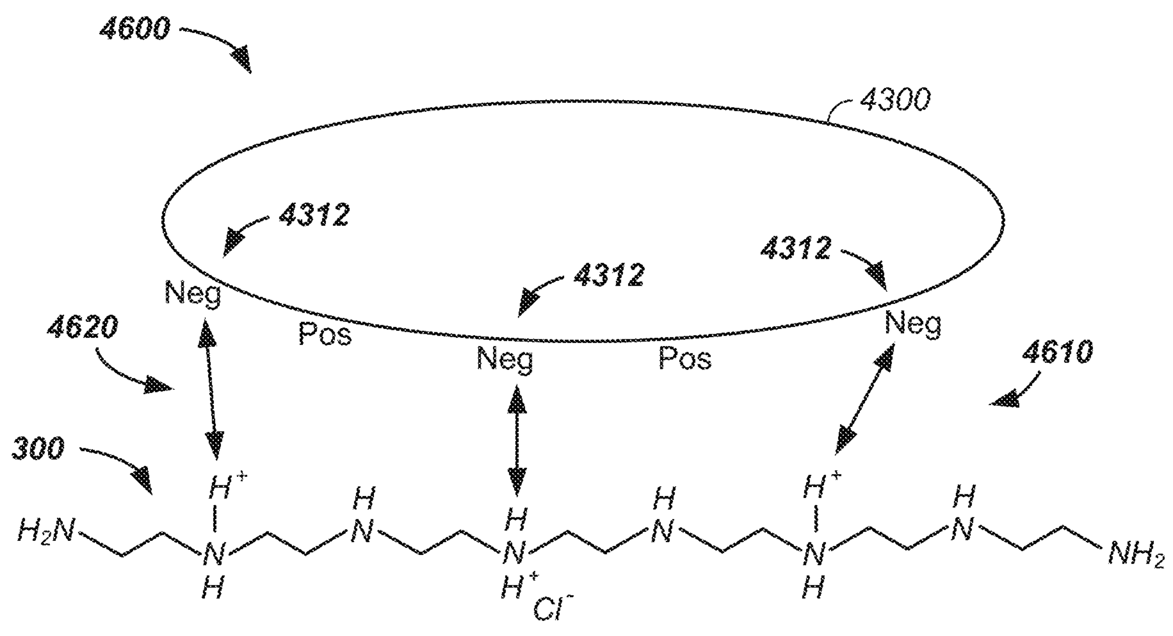
FIG. 46A illustrates high activity attraction between polyethylenimine and a virus and FIG. 46B illustrates attraction between polyethylenimine and a virus at lower activity.

Now that electrically driven virus-protein attractions have been discussed, the importance of the activity, $\gamma$, and/or the activity coefficient, $\gamma$, of a solution containing the tuned cationic polymer 300 is further addressed. Referring now to FIG. 46A, in a first high activity case 4600, a virus 4300 having negatively charged locations 4312 and a tuned cationic polymer 300 having positively charged protonated sites 241 is illustrated with a high activity 4610 and a corresponding large ionic attractive force 4620 between the virus 4300 and the tuned cationic polymer 300. Referring now to FIG. 43B, in a second lower activity case 4650, the virus 4300 and the tuned cationic polymer 300 are again illustrated, but with additional ions in solution, which leads to a lower activity coefficient 4660 and a correspondingly weaker ionic attractive force 4670 between the virus 4300 and the tuned cationic polymer 300. Herein, the high activity is optionally an activity coefficient, for a given protonated site of the polymer, of greater than 0.2, 0.3, 0.4 and optionally and preferably greater than 0.5, 0.6, 0.7, 0.8, 0.9, or 0.95. The greater the activity coefficient, the stronger the large ionic attractive force 4620. Optionally and preferably, the high activity coefficient 4610 is greater than 0.05, 0.1, or 0.2 larger than the low activity coefficient 4660. An example of the low activity coefficient is the activity of the charged polyethylenimine 250 after reaction with a strong acid, such as hydrochloric acid, in a protonation step of protonating the polymer, such as at a pH less than three. An example of the high activity coefficient, is the activity after any de-salting, chloride reduction step, and or a step of using an anion exchange bead, as described supra. Stated again, a higher activity coefficient aids in maintaining an actual ionic attractive force between the polymer 200 and the virus 4300, which is optionally measured as a percent inactivation/percent kill of the virus, such as in the above described government tests. Similarly, increased salt, non-reduced salt, and/or a low activity coefficients, such as in formation of a protonated polymer without reduction of salt, hinders complexing activity/attraction of the charged polymer with the virus 4300.

Liquid/Film Biocide

Referring now to FIGS. 47-50, delivery of a biocide with a controlled total charge is described.

Figure 47:
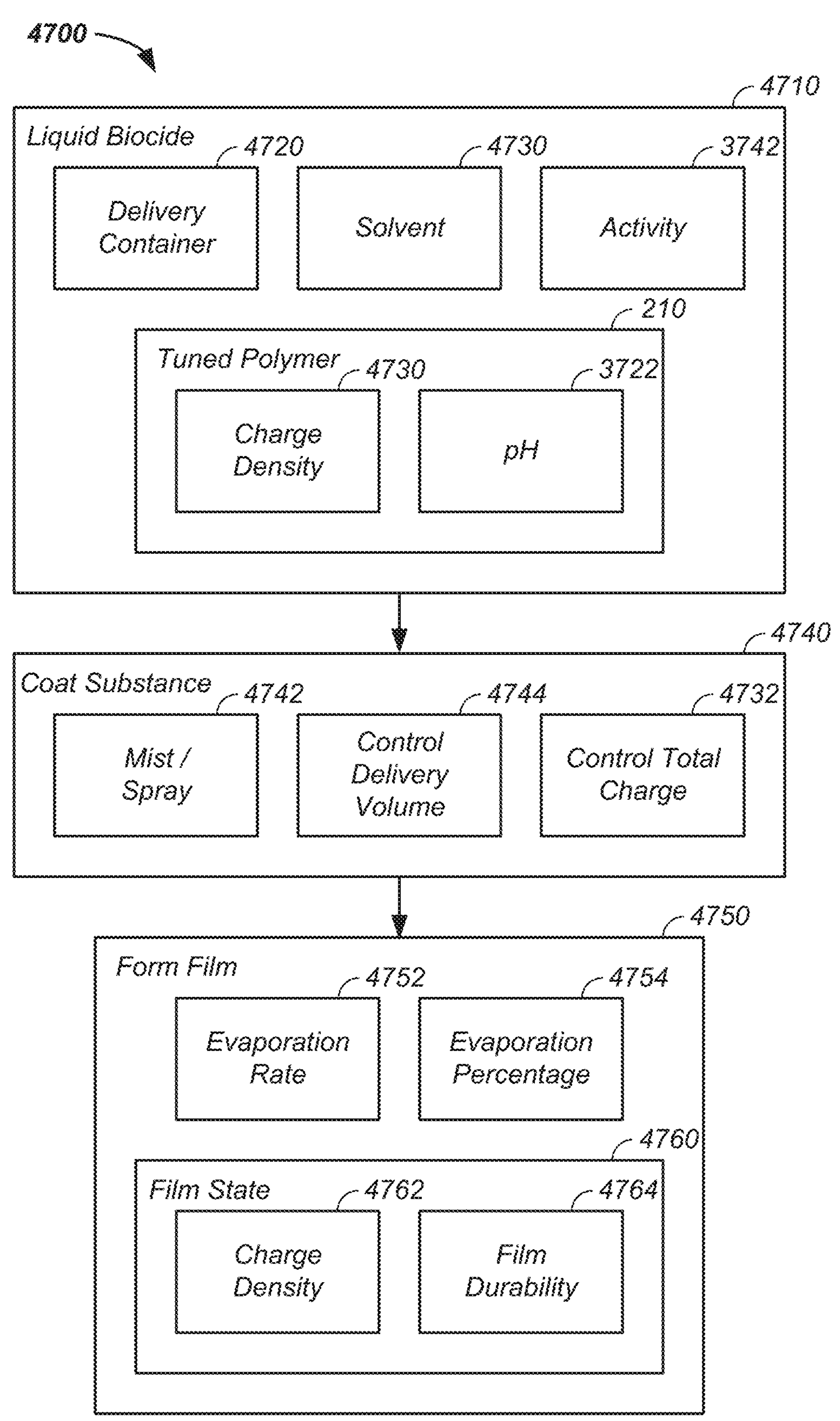
FIG. 47 illustrates charge control of a liquid biocide and/or a biocidal film.

Referring now to FIG. 47, a method of charge control 4700/control of delivery of tuned cationic polymer 300 is illustrated. In this example, provided for clarity of presentation and without loss of generality, a biocide of known charge density is delivered in a solvent with a known volume, which yields a total cationic charge, such as at a pH with an activity, so that a calculable/controlled charge is delivered to a microbe/bacteria/virus/fungus/surface. Generally, a liquid biocide 4710, such as any of the polymers 200 described herein, is contained in a delivery container 4720 along with a solvent 4730. Optionally and preferably, the solvent contains water and/or any organic solvent, such as a solvent that readily evaporates at room temperature and pressure. In one case, an activity 3742/activity coefficient of a polymer-solvent combination is controlled, such as described supra. Optionally and preferably, the tuned polymer 210 is at least one of the polymers 200 in the delivery container 4720. Optionally and preferably, the tuned polymer 210 has a charge density 4730, such as total cationic charge per milliliter of solution and the pH 3722 is known, buffered, and/or controlled.

Still referring to FIG. 47, in a step, the tuned polymer 210 is used in a step of coating a substance 4740, such as with a mist/spray 4742 and/or in any delivery manner, such as with a wipe. Optionally and preferably, the step of coating a substance 4740 delivers a controlled volume 4744, such as within 1, 2, 5, 10, 25, or 50 percent of 1, 2, 5, 10, 15, 20, 25, 50, 100, 250, 500, 1000, 2000, or 5000 μL. Delivery of a controlled volume 4744 is optionally and preferably used to deliver a total charge 4732, such as a total cationic charge per delivery dose.

Still referring to FIG. 47, in a step, the tuned polymer 210 is used to form a film 4750, such as through the coating a substance 4740 step. The step of forming the film 4750 optionally delivers a solvent with a known evaporation rate 4752 and/or a known evaporation percentage 4754 as a function of time and/or temperature to form a film with a film state 4760, such as a charged density 4762, such as a total cationic charge per gram or liter, which is often expressed in total cationic charge/mg and/or total cationic charge/μL. The formed film state 4760 optionally and preferably has a film durability 4764, such as meeting any of the above described durability measures.

Delivery

The tuned polymer 210 is optionally delivered in any manner that: (1) delivers a known volume, total charge, and/or total cationic charge and/or (2) covers a surface or object over a given surface area, such in a delivery manner and/or delivery volume that delivers any of the above described parameters per sq. inch. For clarity of presentation and without loss of generality, examples of delivery methods are provided here.

Example I

Referring now to FIG. 48(A-C), a first treatment method is illustrated. Referring still to FIG. 48A, a spray bottle 4800 is illustrated for delivery of the tuned polymer 210, such as in a formulation solution. The spray bottle 4800 includes a container 4720. Contents 4820 of the container 4720 include at least a solvent 4730 and the tuned cationic polymer 302, which is optionally suspended and/or dissolved in the solvent 4730. Contents 4820 optionally include any number of formulation components, such as a buffer, scent, an inactive ingredient, an emulsifier, a stabilizer, a thickener, and/or an antioxidant. Generally, any dispenser 4840 is used to dispense the contents 4820 of the container 4720, such as into the air and/or onto a substrate as a spray/mist/liquid/foam. Common dispensers 4840 include trigger spray dispensers, pump spray dispensers, aerosol spray dispensers, airless spray dispensers, and/or foam spray dispensers. As illustrated, the dispenser 4840 includes a nozzle 4844 and a trigger pump 4842. Referring now to FIG. 48B, the container 4720 is pressurized, such as with a compressed gas 4740/expansion fluid, and is operated with a spray nozzle 4840. Referring now to FIG. 48C, the dispenser is a wipe 4860, which dispenses the tuned cationic polymer 302 onto a surface/substrate. The wipe 4860 optionally and preferably contains the solvent 4730, which optionally and preferably rapidly evaporates after application to the surface, such as greater than 50, 75, or 90 percent evaporation in less than 60, 30, 20, or 10 seconds.

Still referring to FIG. 48A and FIG. 48B, optionally and preferably the charge density, referring to the total cationic charge, of the contents 4820 is 0.001 to 0.999 meq/g. Optionally and preferably, the total cationic charge of the contents 4820 is greater than 0.001, 0.005, 0.01, 0.02, or 0.03 meq/g or meq/mL and less than 100, 50, 25, 10, 7, 5, 3, 1, 0.9, 0.8, 0.5, 0.2, 0.1, 0.07, or 0.05 meq/g or meq/mL. For reference, Lysol™ (Parsippany, New Jersey, United States) has a charge of 0.003 meq/mL, but the charges in Lysol™ are from toxic quaternary ammonium molecules as opposed to the relatively non-toxic polymers described herein.

Still referring to FIG. 48A and FIG. 48B, optionally and preferably, a charge, referring to the total cationic charge, of the contents 4820 is controlled per application, dose, delivery time, and/or delivery volume. A preferable dose of total cationic charge of the contents is optionally and preferably within 10, 20, 50, or 100 percent of 1.45 C/mL or 1.45 C/g. Optionally, the total cationic charge of the contents per dose is greater than 0.05, 0.1, 0.5, or 1 C/mL or C/g and less than 50, 20, 10, 5, 4, 3, or 2 C/mL or C/g.

Example II

Figure 49:
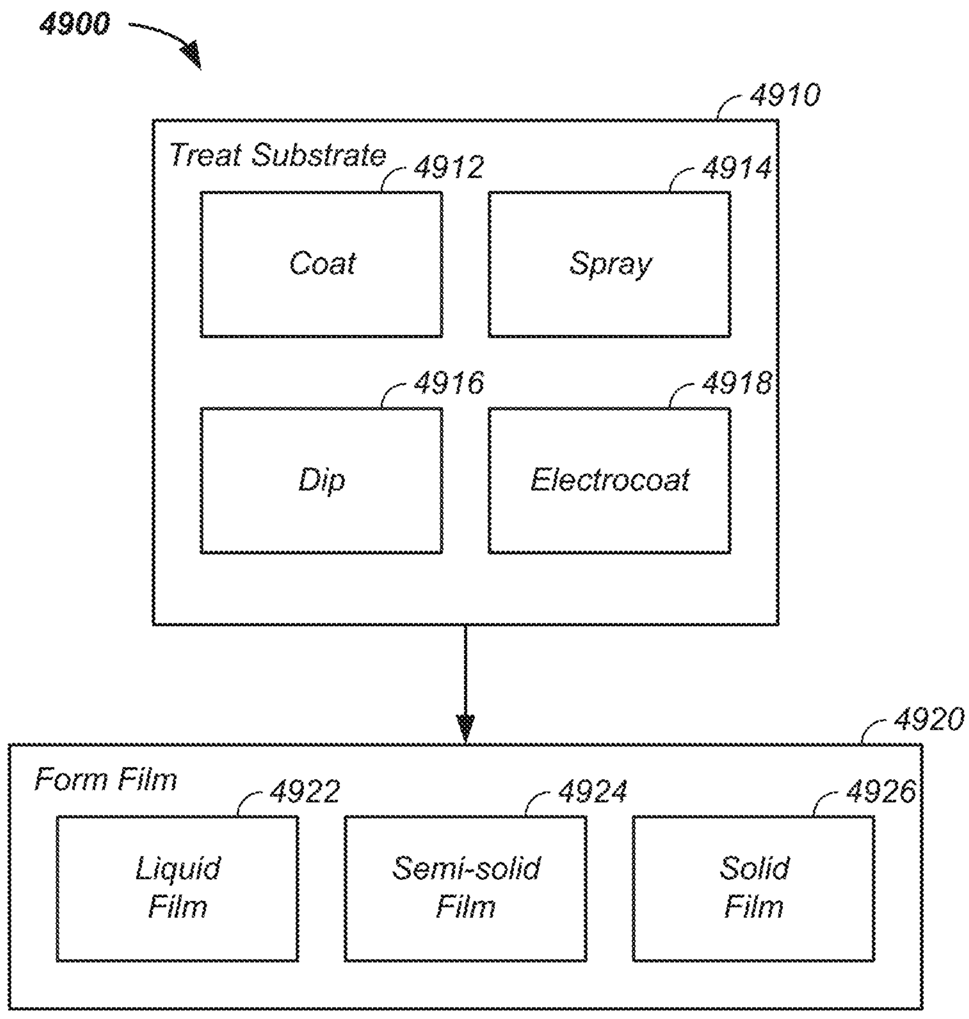
FIG. 49 illustrates treating a substrate with a biocide.

Referring now to FIG. 49, a second treatment method 4900 is illustrated. Generally, a substrate is treated 4910 with a method, such as coating 4912, spraying 4914, dipping 4916, and/or electrocoating 4918, to form a film 4920, such as a liquid film 4922, which optionally at least partially evaporates to form a semi-solid film 4924 and/or a solid film 4926. Herein, a semi-solid film has properties of both solids and liquids, such as viscosity and the ability to flow under stress while still maintaining some structural integrity. A semi-solid film offers a versatile and adaptable material for a wide range of applications where a balance between the properties of liquids and solids is desired.

Example III

Figures 50A, 50B:
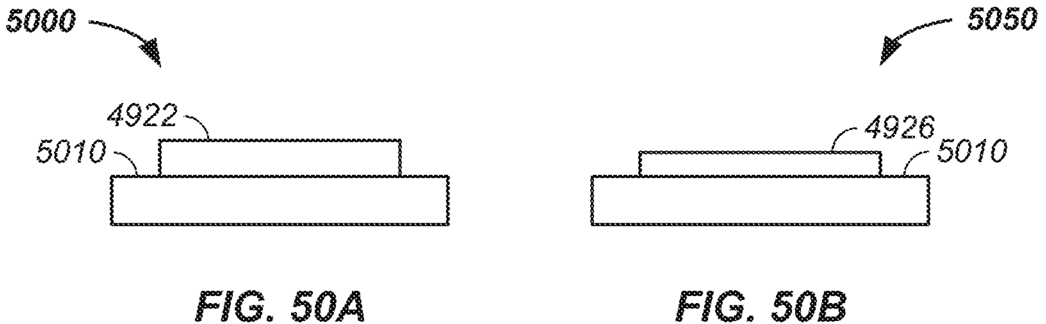
FIG. 50A and FIG. 50B illustrates liquid and solid films, respectively.

Referring now to FIG. 50A and FIG. 50B, a third treatment method 5000 is illustrated where a liquid film 4922 and a solid film 4926, respectively, are formed on a substrate 5010. Herein, a substrate is optionally and preferably any material or surface upon which the tuned cationic polymer 302 is applied or deposited.

Still yet another embodiment includes any combination and/or permutation of any of the elements described herein.

Herein, any number, such as 1, 2, 3, 4, 5, is optionally more than the number, less than the number, or within 1, 2, 5, 10, 20, or 50 percent of the number.

The particular implementations shown and described are illustrative of the invention and its best mode and are not intended to otherwise limit the scope of the present invention in any way. Indeed, for the sake of brevity, conventional manufacturing, connection, preparation, and other functional aspects of the system may not be described in detail. Furthermore, the connecting lines shown in the various figures are intended to represent exemplary functional relationships and/or physical couplings between the various elements. Many alternative or additional functional relationships or physical connections may be present in a practical system.

In the foregoing description, the invention has been described with reference to specific exemplary embodiments; however, it will be appreciated that various modifications and changes may be made without departing from the scope of the present invention as set forth herein. The description and figures are to be regarded in an illustrative manner, rather than a restrictive one and all such modifications are intended to be included within the scope of the present invention. Accordingly, the scope of the invention should be determined by the generic embodiments described herein and their legal equivalents rather than by merely the specific examples described above. For example, the steps recited in any method or process embodiment may be executed in any order and are not limited to the explicit order presented in the specific examples. Additionally, the components and/or elements recited in any apparatus embodiment may be assembled or otherwise operationally configured in a variety of permutations to produce substantially the same result as the present invention and are accordingly not limited to the specific configuration recited in the specific examples.

Benefits, other advantages and solutions to problems have been described above with regard to particular embodiments; however, any benefit, advantage, solution to problems or any element that may cause any particular benefit, advantage or solution to occur or to become more pronounced are not to be construed as critical, required or essential features or components.

As used herein, the terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

Although the invention has been described herein with reference to certain preferred embodiments, one skilled in the art will readily appreciate that other applications may be substituted for those set forth herein without departing from the spirit and scope of the present invention. Accordingly, the invention should only be limited by the Claims included below.

The invention claimed is:

1. A method for dispensing a biocide, comprising the steps of:

packaging contents in a container, said contents comprising said biocide and a solvent, said biocide comprising a protonated polymer comprising repeating charged units, said contents comprising a total cationic charge density in a range of greater than 0.01 to less than 0.05 meq/g, at least ten percent of said total cationic charge density from charges of non-quaternary amines of said protonated polymer; and dispensing said biocide from said container.

2. The method of claim 1, further comprising the steps of:

formulating, prior to said step of packaging, said protonated polymer with protonated polyethylenimine, said protonated polyethylenimine comprising at least ten percent of said protonated polymer by mass; and incorporating into said biocide a quaternary ammonium salt.

3. The method of claim 2, said step of dispensing further comprising the step of:

delivering a dose of said contents from said container, said dose comprising a total cationic charge, said protonated polyethylenimine comprising at least twenty percent of said total cationic charge.

4. The method of claim 3, said step of dispensing further comprising the step of:

treating a substrate with said biocide, said step of treating inactivating greater than fifty percent of non-enveloped viruses on said substrate in less than ten minutes.

5. The method of claim 1, said step of packaging further comprising the step of:

incorporating a polyethylenimine into said container as a component of said protonated polymer.

6. The method of claim 5, further comprising the steps of:

protonating said polyethylenimine with hydrochloric acid in a solution;

removing at least ten percent of chlorides added to said solution in said step of protonating; and performing said steps of protonating and removing prior to said step of packaging.

7. The method of claim 5, further comprising the steps of:

protonating said polyethylenimine with hydrochloric acid in a solution, said step of protonating further comprising the step of:

yielding chloride counterions to protonated secondary amine sites of said polyethylenimine; and reducing a concentration of said chloride counterions by at least ten percent to a concentration of to less than 900 ppm; and performing said step of protonating prior to said step of packaging.

8. The method of claim 1, further comprising the step of:

protonating at least five percent of nitrogens of said protonated polymer prior to said step of packaging.

9. The method of claim 8, further comprising the step of:

formulating said protonated polymer with counterions, less than fifty percent of said counterions comprising chloride.

10. The method of claim 1, further comprising the step of:

formulating said protonated polymer with a polymer backbone chain comprising at least two carbons and at least one nitrogen per monomer of said protonated polymer.

11. The method of claim 10, further comprising the step of:

controlling an activity coefficient, $\gamma$, of a protonated site of said protonated polymer, to a value greater than 0.7.

12. The method of claim 11, said step of dispensing further comprising the step of:

delivering protonated polyethylenimine from said container, wherein a total cationic charge of a total concentration of said protonated polyethylenimine in said container represents at least fifty percent of said total cationic charge density in said container.

13. The method of claim 1, further comprising the steps of:

prior to step of packaging:

protonating at least ten percent of all nitrogens in a first mass of said protonated polymer with hydrochloric acid, said step of protonating yielding chloride counterions to repeating protonated sites of said protonated polymer; and exchanging at least ten percent of said chloride ions for non-chloride counterions with an anion exchange material.

14. The method of claim 13, further comprising the step of:

formulating said protonated polymer with at least ten percent protonated polyethylenimine by mass.

15. The method of claim 1, further comprising the steps of:

prior to step of packaging:

protonating at least ten percent of all nitrogens in a first mass of said protonated polymer with hydrochloric acid, said step of protonating yielding a total mass of said protonated polymer and chloride; and reducing a chloride mass of said total mass by at least ten percent.

16. The method of claim 15, further comprising the step of:

formulating said protonated polymer with a protonated polyethylenimine, said protonated polyethylenimine comprising at least ten percent of said protonated polymer by mass.

17. The method of claim 16, said step of dispensing further comprising the step of:

delivering a total cationic charge in a range of 0.05 to 0.95 C/mL per delivery dose from said container.

18. The method of claim 1, further comprising the steps of:

formulating, prior to said step of packaging, said protonated polymer with polyethylenimine, said polyethylenimine comprising at least ten percent of said protonated polymer by mass;

protonating said polyethylenimine with hydrochloric acid in a solution, said step of protonating further comprising the step of:

yielding chloride counterions to protonated secondary amine sites of said polyethylenimine; and reducing a concentration of said chloride counterions by at least ten percent to a concentration of to less than 900 ppm;

performing said step of protonating prior to said step of packaging;

controlling an activity coefficient, $\gamma$, of a protonated site of said protonated polymer, to a value greater than 0.7;

delivering a dose of said contents from said container, said dose comprising a total cationic charge, said polyethylenimine comprising at least twenty percent of said total cationic charge; and treating a substrate with said biocide, said step of treating inactivating greater than fifty percent of non-enveloped viruses on said substrate in less than ten minutes.

19. The method of claim 1, further comprising the steps of:

raising a pH of a solution of said protonated polymer to greater than five;

performing said step of raising prior to said step of packaging;

removing, after said step of raising said pH of said solution to greater than five, greater than ten percent of chloride anions in said solution; and reducing, after said step of removing, said pH of said solution by at least one-half of a pH unit.

* * * * *